United States Patent

Kawasaki et al.

Patent Number: 5,451,695
Date of Patent: Sep. 19, 1995

[54] POLYMERIZABLE MONOMER USEFUL FOR THE PREPARATION OF HIGH HARDNESS TRANSPARENT RESINS

[75] Inventors: Noboru Kawasaki; Katsuyoshi Sasagawa, both of Yokohama; Toshiyuki Suzuki, Kamakura; Kenichi Fujii, Yokohama, all of Japan

[73] Assignee: Mitsui Toatsu Chemicals, Inc., Tokyo, Japan

[21] Appl. No.: 368,867

[22] Filed: Jan. 5, 1995

Related U.S. Application Data

[62] Division of Ser. No. 1,617, Jan. 8, 1993, Pat. No. 5,393,607.

[30] Foreign Application Priority Data

Jan. 13, 1992 [JP] Japan ................... 4-003876
May 27, 1992 [JP] Japan ................... 4-135103

[51] Int. Cl.$^6$ ............................ C07C 125/06
[52] U.S. Cl. ........................ 560/33; 526/301
[58] Field of Search ................. 526/301; 560/33

[56] References Cited

U.S. PATENT DOCUMENTS

| | | | |
|---|---|---|---|
| 3,933,964 | 1/1976 | Brooks . | |
| 4,980,497 | 12/1990 | Sasagawa et al. | 560/33 |
| 5,084,538 | 1/1992 | Suzuki et al. | 526/301 |
| 5,104,953 | 4/1992 | Sasagawa et al. | 526/301 |

FOREIGN PATENT DOCUMENTS

| | | |
|---|---|---|
| 345748 | 12/1989 | European Pat. Off. . |
| 351534 | 1/1990 | European Pat. Off. . |
| 385456 | 9/1990 | European Pat. Off. . |
| 385457 | 9/1990 | European Pat. Off. . |
| 53-2576 | 1/1978 | Japan . |
| 63-252738 | 10/1988 | Japan . |
| 2-84406 | 3/1990 | Japan . |
| 3-14804 | 1/1991 | Japan . |
| 3-47817 | 2/1991 | Japan . |
| 3-72513 | 3/1991 | Japan . |
| 3-179015 | 8/1991 | Japan . |
| 3-287634 | 12/1991 | Japan . |
| 4-266927 | 9/1992 | Japan . |

*Primary Examiner*—Veronica P. Hoke
*Attorney, Agent, or Firm*—Burns, Doane, Swecker & Mathis

[57] ABSTRACT

A polymerizable monomer has the formula,

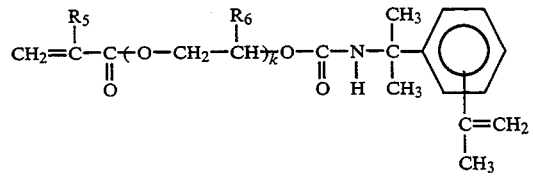

where $R_5$ and $R_6$ are similar or dissimilar and are selected from group consisting of hydrogen and methyl, k is an integer of 2–10, and the isopropenyl substituent on the aromatic ring is in the p-position or m-position.

The polymerizable monomer can be used to prepare a high hardness transparent resin which in turn can be used to prepare a laminated transparent plastic material.

7 Claims, No Drawings

POLYMERIZABLE MONOMER USEFUL FOR THE PREPARATION OF HIGH HARDNESS TRANSPARENT RESINS

This application is a divisional of application Ser. No. 08/001,617, filed Jan. 8, 1993, now U.S. Pat. No. 5,393,607.

BACKGROUND OF THE INVENTION

1. Field of the Invention

The present invention relates to a polymerizable monomer useful as a starting material for producing high hardness transparent resins. The high hardness transparent resins can be used to prepare laminated transparent plastic material. The laminated transparent plastic material may be used as a transparent material for a glazing material such as outside windows of vehicles, rail way trains, airplanes or the like required to have good visibility, protecting function and safety, windows of the partition plates in the vehicles, airplanes or the like, outside windows of various buildings and edifices, and parts of roofs, ceilings and walls through which light is introduced thereinto, or as a protective cover for measuring instruments or various machines and apparatuses.

2. Description of Related Art

Inorganic glass is excellent not only in transparency, but also in various other physicals properties, and therefore, it is widely used as a transparent material.

However, inorganic glass is easily broken and the shape of the broken piece is dangerous so that it has been problematic from the standpoint of safety. Moreover, various lightweight materials have been recently demanded, and therefore there is a strong tendency that inorganic glass as a transparent material is replaced by transparent resins and composite resin.

Heretofore, transparent thermoplastic resin shaped articles, in particular, those of polymethyl methacrylate resin, polycarbonate resins and the like, have been used for various purposes since these molded articles are excellent in transparency, mechanical properties, in particular, impact resistance, further, workability and productivity, and have also good appearance. Examples of applications of transparent thermoplastic resin molded articles include glazing materials, for example, windows for buildings such as educational or cultural facilities, sports facilities, railway station buildings and the like, a part of roofs, protecting walls such as shelter for superhighway and the like, and water tanks for aquariums.

In addition, transparent thermoplastic resin shaped articles are used as protective covers for liquid crystal apparatuses and lighting apparatuses, and display appratuses such as those for computers, and further, signboards and indicating boards.

However, these resins are linear polymers and therefore, do not always have sufficient surface hardness, stiffness, heat resistance and chemical resistance. For purposes of improving these physical properties, silicone resins and acrylic resins are generally used for hard coating treatment, but in this case the solvents should be selected from very limited types of solvents from the standpoints of chemical resistance.

Further, according to the present level of coating technique, the thickness of the coating film is at most about 0.1 mm.

Therefore, the surface hardness and chemical-resistance of such resins can be fairly improved, but in view of the available maximum thickness of the coating film as mentioned above, it can not be expected to improve so far as heat resistance and stiffness. And when molded products of such resins are used as various members, thick molded products are required to prevent the members from deforming due to outer pressure or wind pressure.

As a transparent resin excellent in surface hardness and having an improved impact strength, diethylene glycol diallyl carbonate resins are widely known, but the volume shrinkage is as high as 14% and a long time is required until the polymerization is completed and moreover, the impact strength is still insufficient.

As mentioned above, there have not yet been found resins which can be satisfactorily used as a transparent material such as glazing materials.

In order to solve the above-mentioned problems in prior art, there are proposed various laminated resins as shown below.

(1) A laminated resin composed of a polymer or copolymer of monomer components containing a polymerizable monomer of (meth)acrylic acid esters as a substrate and a polymerizable monomer or prepolymer of (meth) acrylic acid ester capable of giving a more flexibility applied to the surface of the substrate or poured in between two sheets of the substrates to laminate the two substrates (Japanese Patent Application Laid-open No. Sho 53-2576);

(2) A laminated resin composed of a polyurethane layer and an acrylic polymer layer, the two layers being independent from each other and simultaneously being penetrated into each other (Japanese Patent Application Laid-open No. Sho 63-252738);

(3) A laminated resin composed of a polycarbonate resin molded product and a cured film of a ladder type silicone type oligomer formed on the surface of the polycarbonate resin molded product with an intervening (meth)acrylic acid ester copolymer (Japanese Patent Application Laid-open No. Hei 3-287634);

(4) As a laminated resin intending to improve weatherability which is further demanded for resins used as a transparent material, a laminated resin produced by laminating a thermoplastic resin of high weatherability with a substrate of acrylic resin (Japanese Patent Application Laid-open No. Hei 3-30945).

These techniques have some drawbacks as to some physical properties. Technique (1) above can improve impact resistance while the surface hardness is not satisfactory. When the sheet of technique (2) above is used alone, the stiffness is not sufficiently assured and the surface hardness is not always sufficient. Technique (3) can improve the surface hardness while the stiffness is not satisfactory. Technique (4) gives a relatively excellent impact resistance and an improved weatherability while the stiffness and surface hardness are not satisfactory.

(5) There are proposed laminated resins produced by laminating a polymethyl (meth)acrylate resin to a polycarbonate resin molded product excellent in impact resistance so as to impart heat resistance and weatherability (U.S. Pat. Nos. 3,810,815, U.S. Pat. No. 3,933,964), but so far an improvement in surface hardness and stiffness can not be expected. In view of the foregoing, there have not yet been found novel materials for transparent resin molded products which possess satisfactory characteristics widely usable in industry, for example, as glazing materials.

SUMMARY OF THE INVENTION

An object of the present invention is to provide a laminated transparent plastic material.

Another object of the present invention is to provide a novel polymerizable monomer.

A further object of the present invention is to provide a laminated transparent plastic material capable of exhibiting at least partly high surface hardness, excellent scratch resistance, stiffness, impact resistance, heat resistance, chemical resistance and weatherability.

Still another object of the present invention is to provide a novel polymerizable monomer useful for producing the laminated transparent plastic material.

According to one aspect of the present invention, there is provided a laminated transparent plastic material which comprises a transparent resin material having a total visible light transmittance of at least 85% and a high hardness transparent resin layer of at least 0.2 mm thick having a pencil hardness of at least 4H, Rockwell M scale hardness of at least 100, and a total visible light transmittance of at least 85% overlying the surface of the transparent resin material, the laminated transparent plastic material having a bending modulus of elasticity of at least 350 kgf/mm.

According to another aspect of the present invention, there is provided a polymerizable monomer of the formula (23),

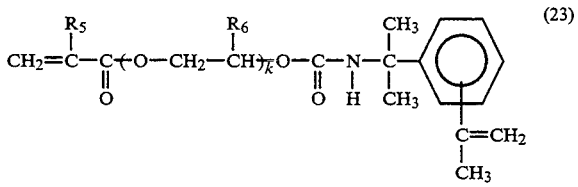

where $R_5$ and $R_6$ are similar or dissimilar and are selected from group consisting of hydrogen and methyl, k is an integer of 2–10, and the isopropenyl substituent on the aromatic ring is in the p-position or m-position.

DESCRIPTION OF THE PREFERRED EMBODIMENT

The present inventors have conducted research to overcome the problems of the prior art and discovered that a laminated transparent plastic material comprising a combination of a particular transparent resin and a particular high hardness transparent resin layer laminated to the particular transparent resin.

The laminated transparent plastic material according to the present invention may exhibit at least partly, for example, a high impact resistance (measured by JIS K-7111) such as 7 kgf cm/cm² or higher, a high bending modulus of elasticity such as 350 kgf/mm², and further high surface hardness, scratch resistance, chemical resistance and heat resistance.

The transparent resin material used in the present invention is that having a total visible light transmittance of at least 85% when measured according to ASTM D-1003.

On the other hand, the high hardness transparent resin and the high hardness transparent resin molded product (hereinafter generally called "high hardness transparent resin") have a total visible light transmittance of at least 85% (ASTM D-1003), a pencil hardness of at least 4H according to JIS K-5400, Rockwell M scale hardness of at least 100, preferably 100–140 according to ASTM D-786.

The thickness of the high hardness transparent resin in the laminated transparent plastic material is at least 0.2 mm thick, and is preferably 0.5–3 mm though it varies depending on the thickness of the transparent resin material.

The laminated transparent plastic material may be produced by setting a transparent resin material having or not having a mutual dissolution protecting layer in a mold for casting polymerization, pouring a monomer for a high hardness transparent resin into the remaining vacant space in the mold, then polymerizing the monomer to form the high hardness transparent resin layer of at least 0.2 mm thick laminated to the above-mentioned transparent resin material, or by laminating a high hardness transparent resin layer of at least 0.2 mm thick to a transparent resin material as mentioned above by providing an adhesive layer, for example, an adhesive resin layer, between these two members.

The mutual dissolution protecting layer is an additional polymer layer capable of preventing the transparent resin material from dissolving into the monomer for the high hardness transparent resin.

The mutual dissolution protecting layer is a resin layer intervening between the transparent resin material and the high hardness transparent resin layer.

When laminating the high hardness transparent resin to the transparent resin material by a casting polymerization method, there occurs a mutual dissolution at the interface between these resins during polymerization depending on the combination the resin materials and thereby, the interface portion becomes opaque.

In order to prevent such phenomenon, the mutual dissolution protecting layer is provided between the resins.

The adhesive layer is a layer composed of an adhesive resin used for laminating the two resin members by adhering them to each other such that the adhesive layer intervenes between the two resin members.

Examplary suitable resins as the transparent resin material include: polymethyl methacrylate resins, polycarbonate resins, polystyrene resins, polyester resins, polyacetal resins, polysulfone resins, polyether sulfone resins, polyvinyl chloride resins, polyvinylidene chloride resins, epoxy resins, unsaturated polyester resins, polyurethane resins, diallylphthalate resins, diethylene glycol bisallyl carbonate resins, and acetyl cellulose resins.

Exemplary suitable resins for a mutual dissolution protecting layer include: polymethacrylate resins, silicone thermosetting resins, acrylic thermosetting resins, and acrylic photo-curable resins.

Exemplary suitable resins for an adhesive layer include: polyvinyl butyrate resins, melamine resins, epoxy resins, acrylic thermosetting resins, unsaturated polyester resins, polyurethane resins, polyvinyl acetate resins, and polyvinyl chloride resins.

The high hardness transparent resin used in the present invention may be a resin having at least one structure unit selected from the group consisting of the following structure units of the following formulas (1) and (2),

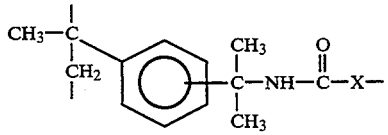

where X is oxygen or sulfur,

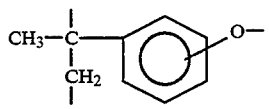

In particular, the following resin—a to resin—j may be used.

Resin—a:

A resin producible by polymerizing a monomer (A) having both a functional group of the following formula (3), (3)

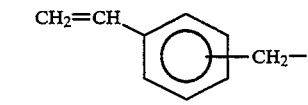

one molecule.

Resin—b:

A resin producible by copolymerizing the monomer (A) as above and a monomer (B) having at least one functional group selected from the group consisting of

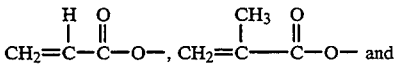

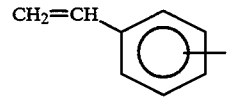

and the number of the functional groups, m, being an integer of 1-6.

The resin—a and resin—b may be resins having the following structure units of the formula (11) and/or the formula (12),

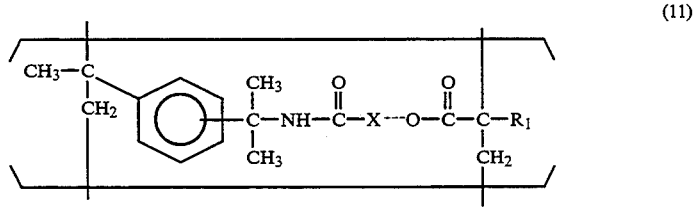

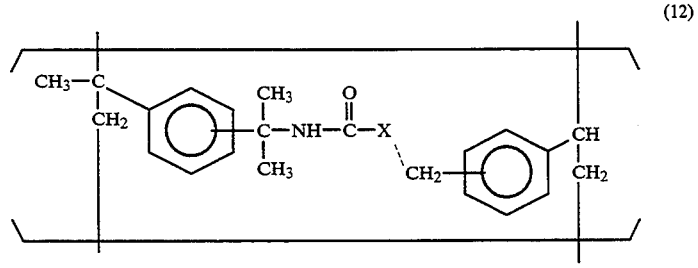

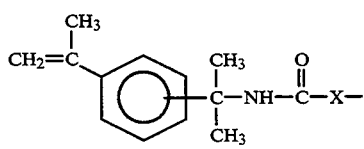

where X is selected from the group consisting of oxygen and sulfur, and one functional group selected from the group consisting of function group of the formula (4),

where $R_1$ is selected from the group consisting of hydrogen and methyl, and a functional group of the formula (5), where X is selected from the group consisting of oxygen and sulfur and $R_1$ is selected from the group consisting of hydrogen and methyl.

Resin—c:

A resin producible by copolymerizing the monomer (A) as above and a monomer (C) having at least two —SH groups in one molecule.

Resin—d:

A resin producible by copolymerizing the monomer (A), the monomer (S) and monomer (C) as above.

Resin—e:

A resin producible by copolymerizing the monomer (B) as above and a monomer (D) of the formula (6),

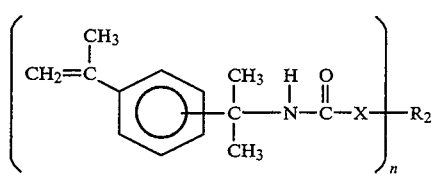

(6)

where X is selected from the group consisting of oxygen and sulfur, $R_2$ is selected from the group consisting of a saturated aliphatic residue having or not having at least one member selected from the group consisting of a halogen atom, an oxygen atom, an alicyclic ring, an heterocyclic ring and an aromatic ring, an alicyclic residue, and a heterocyclic residue, n is integer of 1-4, when n=1, X is oxygen or sulfur, when n≦2, X's are all oxygen or all sulfur, one or two X's are oxygen while the other X or X's are sulfur, or one X is sulfur while the other X or X's are oxygen, such that (n+m) is an integer of at least 3.

The resin-e may be a resin having a structure unit of the formula (13) and/or a structure unit of the formula (14),

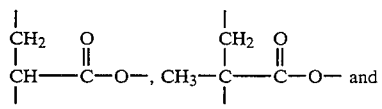

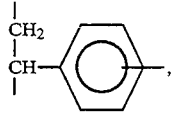

n is an integer of 1-4, m is an integer of 1-6, (n+m) is an integer of at least 3, when n=1, X is oxygen or sulfur, when n≦2, X or X's are all oxygen or all sulfur, one or two X's are oxygen while the other X or X's are sulfur, or one X is sulfur while the other X or X's are oxygen.

Resin-f:

A resin producible by copolymerizing the monomer (C) as above and a combination of the monomer (D) and the monomer (B) as above such that (n +m) is an integer of at least 3.

Resin-g:

A resin producible by polymerizing a monomer (E)

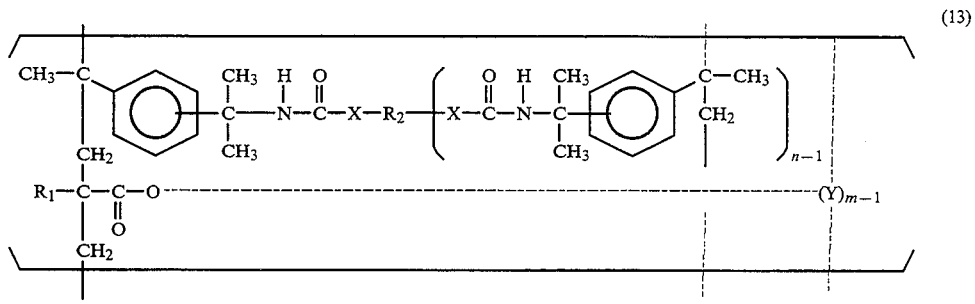

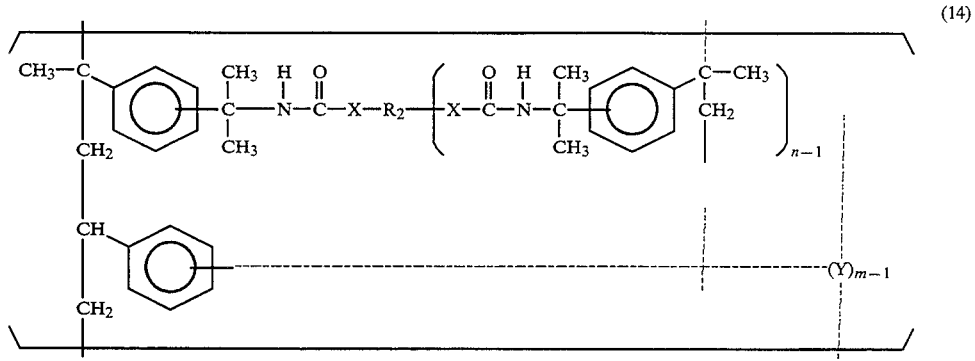

where X is selected from the group consisting of oxygen and sulfur, $R_2$ is selected from the group consisting of a saturated aliphatic residue having or not having at least one member selected from the group consisting of a halogen atom, an oxygen atom, an alicyclic ring, an heterocyclic ring and an aromatic ring, an alicyclic residue, and a heterocyclic residue, $R_1$ is selected from the group consisting of hydrogen and methyl, Y is selected from the group consisting of having a functional group of the formula (7),

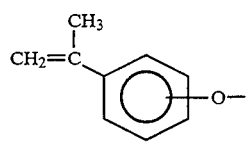

and a functional group selected from the group consisting of a functional group of the formula (8),

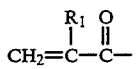
(8)

where $R_1$ is selected from the group consisting of hydrogen and methyl and the functional group of the formula (5) as above in one molecule Resin-h:

A resin producible by copolymerizing the monomer (E) and the monomer (B) as above. The resin-g and the resin-h may be resins having the structure unit of the formula (15) and/or the structure unit of the formula (16),

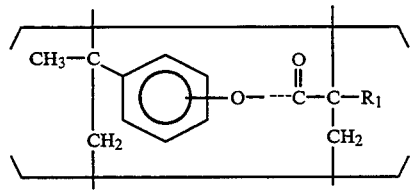
(15)

(16)

A resin producible by copolymerizing the monomer (B) as above and a monomer (F) of the formula (9),

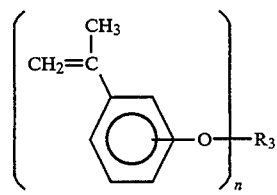
(9)

in which $R_3$ is selected from the group consisting of a saturated aliphatic residue, an alicyclic residue, an aliphatic residue having at least one of an alicyclic group, a heterocyclic ring, an aromatic ring and a hetero atom, where each of the residues may lave a functional group selected from the group consisting of —C(=O)—NH—, —C(=S)—NH—, —C(=O)—O—, and —C(=O)— where the left hand bond of each of the formulas attaches to the isopropenylphenoxy group, and —C(=O)—, n is an integer of 1–4, such that (n+m) is an integer of at least 3.

The resin-i may be a resin having a structure unit of the formula (17) and/or a structure unit of the formula (18),

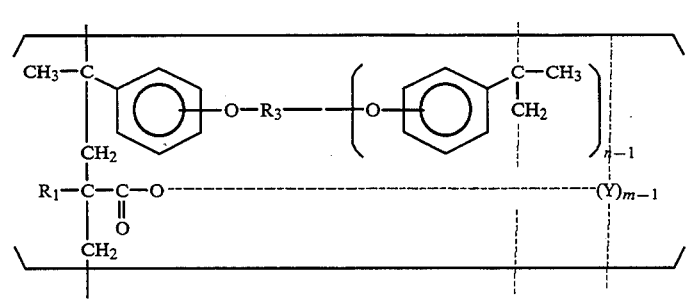
(17)

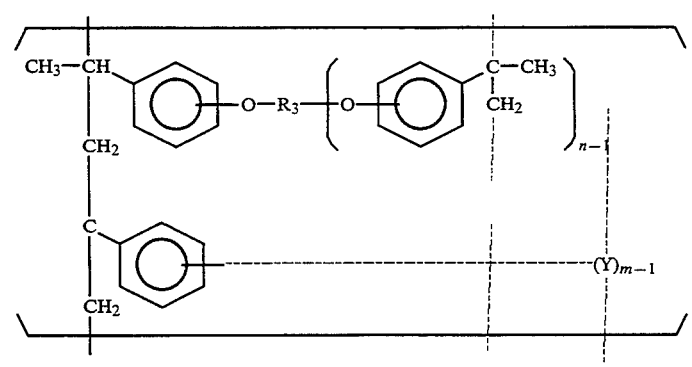
(18)

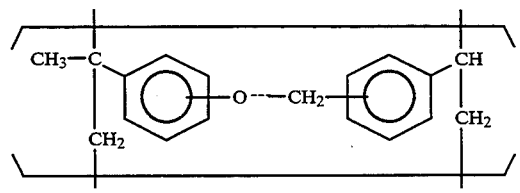

where $R_1$ is selected from the group consisting of hydrogen and methyl.

Resin i:

in which $R_3$ is selected from the group consisting of a saturated aliphatic residue, an alicyclic residue, an aliphatic residue having at least one of an alicyclic group, a heterocyclic ring, an aromatic ring and a hetero atom, where each of the residues may have a functional group selected from the group consisting of —C(=O)—, NH—, —C(=S)—NH—, —C(=O)—O— and —C(=O)— where the left hand bond of each of the formulas attaches to the isopropenylphenoxy group, and —C(=O)—, n is an integer of 1–4, such that (n+m) in an integer of at least 3. and —C(=O)—, $R_1$ is selected from the group consisting of hydrogen and methyl, Y is selected from the group consisting of

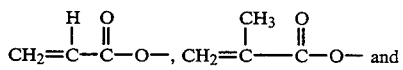

and

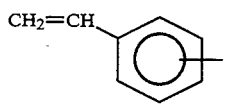

n is an integer of 1–4, m is an integer of 1–6, and (n+m) is an integer of at least 3.

Resin-j:

A resin producible by copolymerizing the monomer (B) as above and a monomer (G) of the formula (10), where X is selected from the group consisting of oxygen and sulfur, and $R_4$ is selected from the group consisting of an aliphatic residue having or not having an oxygen atom, an alicyclic ring, a heterocyclic ring or an aromatic ring, and an alicyclic residue, 1 is zero or one, i and j are integers of one or more, when 1 is zero, i=j=one, when 1 is one, (i+j) is 4 or less, when j is one, X is oxygen or sulfur, when j≦2, X's are all oxygen or all sulfur, one X is oxygen and the other X or X's are sulfur, or one X is sulfur and the other X or X's are oxygen.

And further, the resin-j may be a resin having a structure unit or units selected from at least one of formulas (19) and (20), at least one of formulas (21) and (22), and a combination of at least one of formulas (19) and (20) and at least one of formulas (21) and (22),

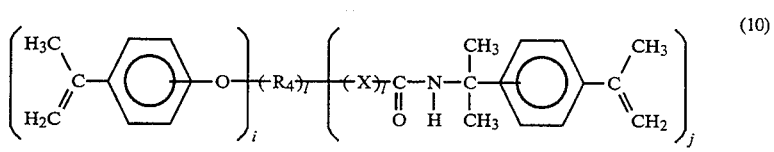

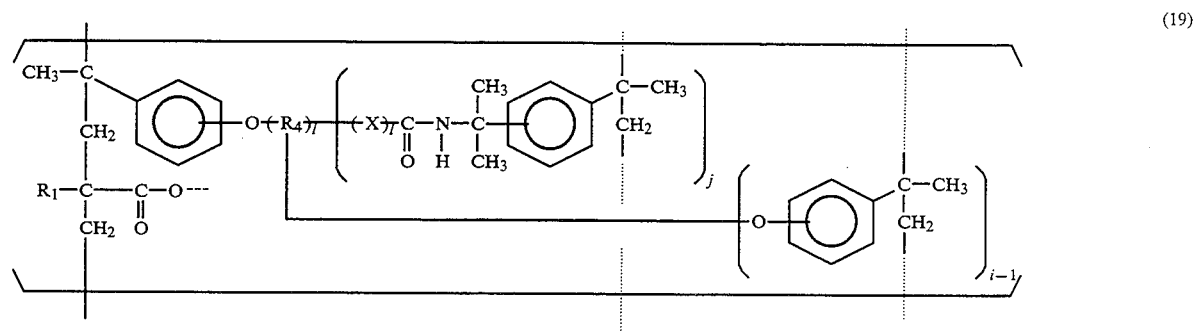

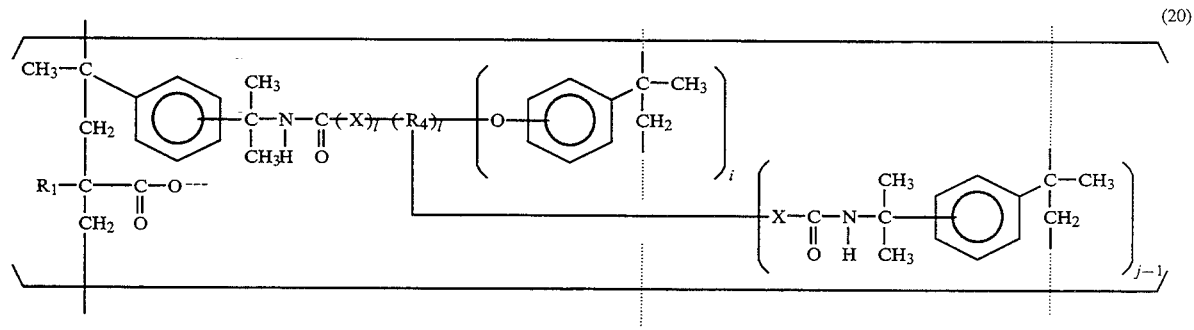

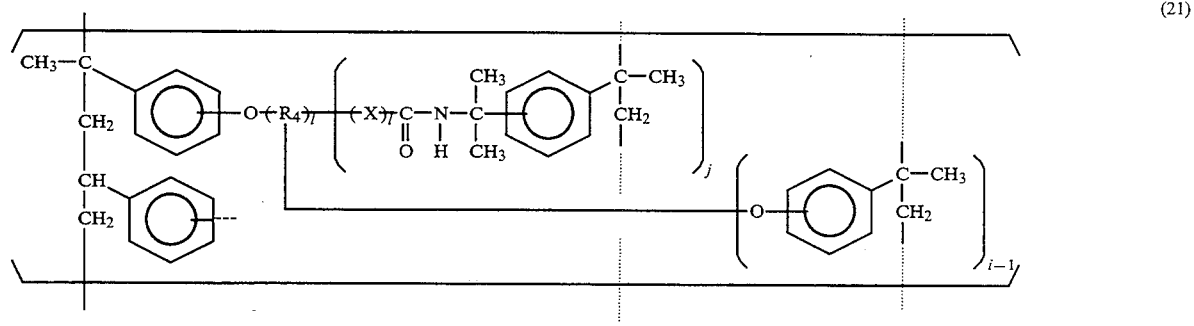

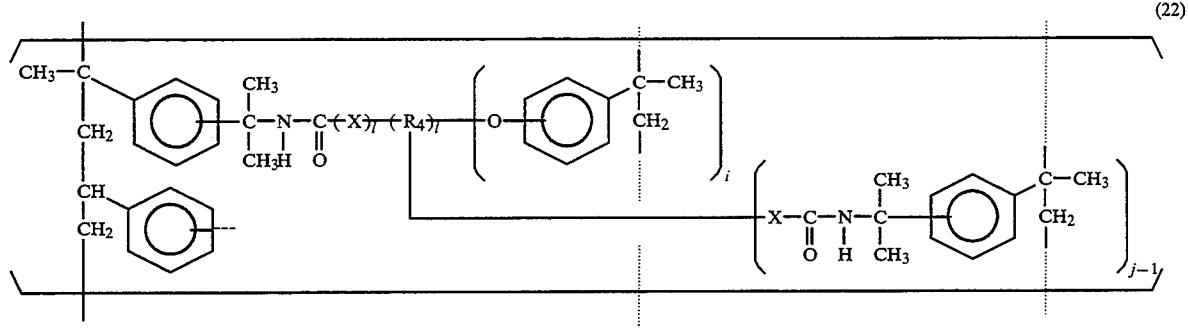

(22)

where X is selected from the group consisting of oxygen and sulfur, R₄ is selected from the group consisting of an aliphatic residue having or not having an oxygen atom, an alicyclic ring, a heterocyclic ring or an aromatic ring, and an alicyclic residue, $R_1$ is selected from the group consisting of hydrogen and methyl, l is a number of zero or one, i and j are integers of one or more, when l is zero, i=j=one, when l is one, (i+j) is 4 or less, when j is one, X is oxygen or sulfur, when j≦2, X's are all oxygen or all sulfur, one X is oxygen and the other X or X's are sulfur, or one X is sulfur and the other X or X's are oxygen.

In the following, the above-mentioned monomer, i.e. resin-a–resin-j, are explained.

Monomer (A) has both a functional group of the following formula (3),

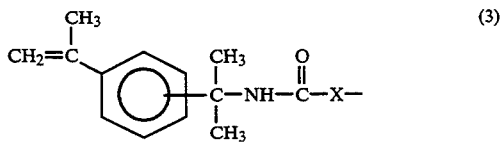

where X is selected from the group consisting of oxygen and sulfur, and one functional group selected from the group consisting of a functional group of the formula (4),

where $R_1$ is selected from the group consisting of hydrogen and methyl, and a functional group of the formula (5),

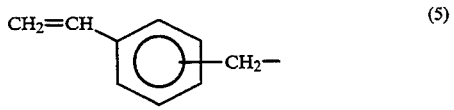

in one molecule.

The monomer (A) may be prepared by reacting isopropenyl-α,α-dimethylbenzylisocyanate with a compound (P) having at least any functional group of hydroxyl and mercapto, and further the functional group (4) or the functional group (5) in one molecule.

Examples of the compounds (P) include:

(1) Compounds producible by ring-opening of epoxy groups or thiirane groups with acrylic acid or methacrylic acid such as hydroxyethyl acrylate, hydroxyethyl methacrylate, hydroxypropyl acrylate, hydroxypropyl methacrylate, 1,4-butyleneglycol monoacrylate, 1,4-butyleneglycol monomethacrylate, glycerol-1,2-diacrylate, glycerol-1,2-dimethacrylate, glycerol-1,3-diacrylate, glycerol-1,3-dimethacrylate, glycerol-1-acrylate-3-methacrylate, and the like;

(2) Compounds producible by ring-opening of phenylglycidyl ethers with acrylic acid or methacrylic acid such as 3-phenoxy-2-hydroxypropyl acrylate, 3-phenoxy-2-hydroxypropyl methacrylate, 2,4-dibromophenoxy-2-hydroxypropyl acrylate, 2,4-dibromophenoxy-2-hydroxypropyl methacrylate, and the like;

(3) Compounds producible by ring-opening of bisphenol A-diglycidyl ethers with acrylic acid or methacrylic acid;

(4) pentaerythritol triacrylate, pentaerythritol trimethacrylate and the like;

(5) vinylbenzyl alcohol, vinylthiobenzyl alcohol and the like; and (6) bis(acryloyloxyethyl)isocyanurate, bis(methacryloyloxyethyl)isocyanurate, and the like.

These compounds may be used for preparing the carbamic acid esters or thiocarbamic acid esters. This preparation is attained by the reaction of the isocyanate groups of isopropenyl-α,α-dimethylbenzylisocyanate with the hydroxyl group or mercapto group of compound P.

In order to facilitate the synthetic reaction, there may be added to the reaction mixture tin compounds such as dibutyltin dilaurate, dimethyltin chloride and the like, or amines such as morphorine, dimethylaminobenzene and the like.

For the purposes of preventing coloration in the later radical reaction, it is preferable to select a tin compound.

When solvents are used in the reaction, the solvents are distilled off after the synthetic reaction and a monomer (A) may be obtained with or without purification, Exemplary suitable monomers (A) include: N-(3-isopropenyl-α,α-dimethylbenzyl)-2-acryloyloxyethyl carbamate, N-(3-isopropenyl-α,α-dimethylbenzyl)-2-methacryloyloxyethyl carbamate, N-(4-isopropenyl-α,α-dimethylbenzyl)-2-acryloyloxyethyl carbamate, N-(4-isopropenyl-α,α-dimethylbenzyl)-2-methacryloyloxyethyl carbamate, N-(3-isopropenyl-α,α-dimethylbenzyl)-1-acryloyloxypropan-2-yl carbamate, N-(3-isopropenyl-α,α-dimethylbenzyl)-1-methacryloyloxypropan-2-yl carbamate N-(4-isopropenyl-α,α-dimethylbenzyl)-1-acryloyloxypropan-2-yl carbamate, N-(3-isopropenyl-α,α-dimethylbenzyl)-1,3-diacryloyloxypropan-2-yl carbamate, N-(3-isopropenyl-α,α-dimethylbenzyl)-1,3-dimethacryloyloxypropan-2-yl carbamate, N-(3-isopropenyl-α,α-dimethylbenzyl)-1-acryloyloxy-3-methacryloyloxypropan-2-yl carbamate, N-(4-isopropenyl-α,α-dimethylbenzyl)-1,3-diacryloyloxypropan-2-yl carbamate, N-(3-isopropenyl-α,α-dimethylbenzyl)-2,2-diacryloyloxymethyl-3-acryloyloxypropyl carbamate, N-(4-isopropenyl-α,α-dimethylbenzyl)-2,2-dimethacryloyloxymethyl-3-methacryloyloxypropyl carbamate and the like.

When isocyanate compounds are reacted with mercapto groups, there can be produced the above mentioned compounds except that the "carbamate" is changed to "thiocarbamate".

Monomer (B) has at least one functional group selected from the group consisting of

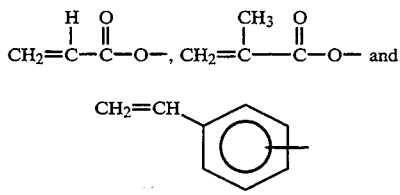

and the number of the functional groups, m, is an integer of 1–6.

Monomer (B) may be derivatives of acrylic acid esters, methacrylic acid esters or styrene.

Example of monomer (B) where m is 1 include: methyl acrylate, methyl methacrylate, ethyl acrylate, ethyl methacrylate, propyl acrylate, propyl methacrylate, isopropyl acrylate, isopropyl methacrylate, cyclohexyl acrylate, cyclohexyl methacrylate, benzyl acrylate, benzyl methacrylate, methoxyethyl acrylate, methoxyethyl methacrylate, ethoxyethyl acrylate, ethoxyethyl methacrylate, 2-hydroxyethyl acrylate, 2-hydroxyethyl methacrylate, 2-hydroxypropyl acrylate, 2-hydroxypropyl methacrylate, 1,4-butyleneglycol monoacrylate, 1,4-butyleneglycol monomethacrylate, glycidyl acrylate, glycidyl methacrylate, styrene, methylstyrene, chlorostyrene, bromostyrene, chloromethyl styrene, methoxystyrene, and the like.

Examples of monomer (B) where m is 2 or more include: ethylene glycol diacrylate, ethylene glycol dimethacrylate, diethylene glycol diacrylate, diethylene glycol dimethacrylate, propylene glycol diacrylate, propylene glycol dimethacrylate, dipropylene glycol diacrylate, dipropylene glycol dimethacrylate, 2,2-bis(-4,acryloxyethoxyphenyl)propane, 2,2-bis(4-methacryloxyethoxyphenyl)propane, 2,2-bis(4-acryloxydiethoxyphenyl)propane, 2,2-bis(4-methacryloxydiethoxyphenyl)propane, 2,2-bis(4-acryloxypropyloxyphenyl)propane, 2,2-bis(4-methacryloxypropyloxyphenyl)propane, 1,3-butanediol diacrylate, 1,3-butanediol dimethacrylate, 1,4-butanediol diacrylate, 1,4-butanediol dimethacrylate, 1,6-hexanediol diacrylate, 1,6-hexanediol dimethacrylate, neopentyl glycol diacrylate, neopentyl glycol dimethacrylate, hydroxypivalic acid neopentyl glycol ester diacrylate, spiroglycol diacrylate, spiroglycol dimethacrylate, epoxy acrylate, epoxy methacrylate, 2-propenoic acid [2-(1,1-dimethyl-2-((1-oxo-2-propenyl) oxy)ethyl)-5-ethyl-1,3-dioxane-5-yl]methyl ester, trimethylolpropane triacrylate, trimethylolpropane trimethacrylate, pentaerythritol triacrylate, pentaerythritol trimethacrylate, bis(acryloyloxyethyl)hydroxyethyl isocyanurate, bis(methacryloyloxyethyl)hydroxyethyl isocyanurate, tris(acryloyloxyethyl)isocyanurate, tris(methacryloyloxyethyl)isocyanurate, pentaerythritol tetraacrylate pentaerythritol tetramethacrylate, dipentaerythritol hexaacrylate, dipentaerythritol hexamethacrylate, methyl tri(acryloyloxyethoxy)silane, glycerol diacrylate glycerol dimethacrylate, dibromoneopentyl glycol diacrylate, dibromoneopentyl glycol dimethacrylate, divinylbenzene, urethane acrylates, 1,1,3,3,5,5-hexa(acryloyloxy)cyclotriphosphozene, 1,1,3,3,5,5-hexa(methacryloyloxy)cyclotriphophozene, 1,1,3,3,5,5-hexa(acrylolethylenedioxy)cyclotriphosphozene, 1,1,3,3,5,5-hexa(methacryloylethylenedioxy)cyclotriphosphozene, and the like.

Examples of monomer (C) having at least two —SH groups in one molecule include: aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,2,1]hepta-exo-cis-2,3-dithiol, 1,1-bis(mercaptomethyl)cyclohexane, thiomalic acid bis(2-mercaptoethyl ester), 2,3-dimercaptosuccinic acid (2-mercaptoethyl ester), 2,3-dimercapto-1-propanol(2-mercaptoacetate), 2,3-dimercapto-1-propanol(3-mercaptopropionate), diethylene glycol bis(2-mercaptoacetate), diethylene glycol bis(3-mercaptopropionate), 1,2-dimercaptopropylmethylether, 2,3-dimercaptopropylmethylether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate), pentaerythritol tetrakis(3-mercaptopropionate), and the like; aromatic polythiols such as 1,2-dimercaptobenzene, 1,3-dimercaptobenzene, 1,4-dimercaptobenzene, 1,2-bis(mercaptomethyl)benzene 1,3-bis(mercaptomethyl)benzene, 1,4-bis(mercaptomethyl)benzene, 1,2-bis(mercaptoethyl)benzene, 1,3-bis(-mercaptoethyl)benzene, 1,4-bis(mercaptoethyl)benzene, 1,2-bis(mercaptomethyleneoxy)benzene, 1,3-bis(-mercaptomethyleneoxy)benzene, 1,4-bis(mercaptomethyleneoxy)benzene, 1,2-bis(mercaptoethyleneoxy)benzene, 1,3-bis(mercaptoethyleneoxy)benzene, 1,4-bis(-mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(-mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5,-tetramercaptobenzene, 1,2,3,4-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 4,4'-dimercaptobibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3- dithiol, 4,5-dimethylbenzene-1,3-dithiol, 9,10-anthracenedimethanethiol, 1,3-di(p-methoxyphenyl)-propane-2,2-dithiol, 1,3-diphenylpropane-2,2-dithiol, phenylmethane-1,1-dithiol, 2,4-di(p-mercaptophenyl)-pentane, and the like; polythiols containing a heterocyclic ring such as 2-methylamino-4,6-dithiol-sym-triazine, 2-ethylamino-4,6-dithiol-sym-triazine, 2-amino-4,6-dithiol-sym-triazine, 2-morpholino-4,6-dithiol-sym-triazine, 2-cyclohexylamino-4,6-dithiol-sym-triazine, 2-methoxy-4,6-dithiol-sym-triazIne, 2-phenoxy-4,6-dithiol-sym-triazine, 2-thiobenzeneoxy-4,6-dithiol-sym-triazine, 2-thiobutyloxy-4,6-dithiol-sym-triazine, and the like; aromatic polythiols containing sulfur atoms other than mercapto group such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene, and the like, and the above-mentioned aromatic polythiols of which the aromatic nucleus is alkylated; bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercapto-1,4-dithiane, bis(mercaptomethyl)disulfide, bis(mercaptoethyl)disulfide, bis(mercaptopropyl)disulfide, and the like, and thioglycolic acid or mercaptopropionic acid esters of the above-mentioned compounds; aliphatic polythiol containing sulfur atoms other than mercapto groups such as hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxypropylsulfide bis(2-mercaptoacetate), hydroxypropylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropionate), hydroxypropyldisulfide bis(2-mercaptoacetate), hydroxypropyldisulfide bis(3-mercaptopropionate), 2-mercaptoethylether bis(2-mercaptoacetate), 2-mercaptoethylether bis(3-mercaptopropionate), 1,4-dithiane-2,5-diol bis(2-mercaptopropionate), thiodiglycolate bis(2-mercaptoethyl), thiodipropionate bis(2-mercaptoethyl), 4,4-thiodibutyrate bis(2-mercaptoethyl), dithiodiglycolate bis(2-mercaptoethyl), dithiodipropionate bis(2-mercaptoethtl), 4,4-dithiodibutyrate bis(2-mercaptoethyl), thiodiglycolate bis(2,3-dimercaptopropyl), thiodipropionate bis(2,3-dimercaptopropyl), dithioglycolate bis(2,3-dimercaptopropyl), dithiodipropionate bis(2,3-dimercaptopropyl), and the like; and heterocyclic compounds containing sulfur atom other than mercapto group such as 3,4-thiophenedithiol, 2,5-dimercapto-1,3,4-thiadiazole and the like.

Monomer (D) is a monomer of the formula (6),

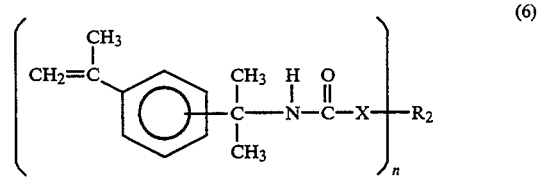

where X is selected from the group consisting of oxygen and sulfur, $R_2$ is selected from the group consisting of a saturated aliphatic residue having or not having at least one member selected from the group consisting of a halogen atom, an oxygen atom, an alicyclic ring, an heterocyclic ring and an aromatic ring, an alicyclic residue, and a heterocyclic residue, n is an integer of 1–4, when n=1, X is oxygen or sulfur, when n≧2, X's are all oxygen or all sulfur, one or two X's are oxygen while the other X or X's are sulfur, or one X is sulfur while the other X or X's are oxygen, such that (n+m) is an integer of at least 3, The monomer (D) may be carbamic acid ester or carbamic acid thioester compounds which can be prepared by reacting isopropenyl α,α-dimethylbenzyl isocyanate with a compound having a residue selected from a saturated aliphatic residue having or not having halogen atom, oxygen atom, alcyclic ring, heterocyclic ring and aromatic ring, an alicyclic residue, and a heterocyclic residue, and 1–4 OH groups or SH groups, that is, the isocyanate group in the former being reacted with the OH group(s) or SH group(s) in the latter.

In the formula (6), when n=2 or more, the compound may be such that X's are all oxygen or sulfur, or may be such that one or two X's are oxygen and the other X or X's are sulfur, or one X is sulfur and the other X's are oxygen.

The molecular weight of the residue —$R_2$ is, in general, preferably low though this condition varies depending of the steric strength of the structure, and more preferably it is 15–500.

The above-mentioned latter compounds having the particular residue(s) and 1–4 OH or SH for preparing the monomer (D) may be, for example, the following compounds. methanol, ethanol, propanol, butanol, pentanol, hexanol, heptanol, octanol, cyclopentanol, cyclohexanol, cycloheptanol, cyclooctanol, 2,2,2-trichloroethanol, 2,2,2-trifluoroethanol, 1,3-dichloro-2-propanol, 2,3-dichloro-1-propanol, 2,3-dibromo-1-propanol, 1-chloro-2-propanol, 3-chloro-1-propanol, 2-chloroethanol, 2-bromoethanol, methanethiol, ethanethiol, propanethiol, butanethiol, pentanethiol, hexanethiol, heptanethiol, octanethiol, cyclohexanethiol, benzyl alcohol, ethyleneglycol, 1,3-propanediol, 1,4-butanediol, 1,4-butenediol, 1,5-pentanediol, 1,6-hexanediol, 1,2-propanediol, 1,3-butanediol, 2,3-butanediol, 2,5-hexanediol, diethylene glycol, neopentyl glycol, 3-methyl-1,5-pentanediol, dipropylene glycol, triethylene glycol, 1,2-butanediol, 2-ethyl-1,3-hexanediol, spiroglycol, 1,4-cyclohexanediol, tricyclo[5,2,1,0$^{2,6}$]decane-4,8-dimethanol, 3-chloro-1,2-propanediol, 3-bromo-1,2-propanediol, 2,3-dibromo-1,4-butanediol, dibromoneopentylglycol, bisphenol A (2-hydroxyethyl)ether, bisphenol F (2-hydroxyethyl)ether, bisphenol S (2-hydroxyethyl)ether, biphenol(2-hydroxyethyl)ether, tetrabromo bisphenol A (2-hydroxyethyl)ether, benzene dimethanol, ethanedithiol, propanedithiol, butanedithiol, pentanedithiol, hexanedithiol, propanetrithiol, cyclohexanedithiol, ethylene glycol bis(2-mercaptoacetate), ethylene glycol bis(3-mercaptopropionate), bis(mercaptomethyl)benzene, 2-hydroxy ethyl disulfide, 2-mercaptoethanol, 1-mercapto-2-propanol, glycerol, trimethylolethane, trimethylolpropane, 1,2,4-butanetriol, 1,2,6-hexanetriol, 1,3,5-tris(2-hydroxyethyl)cyanuric acid, pentaerythritol, threitol, 3-mercapto-1,2-propanediol, pentaerythritol tetrakis(2-mercaptoacetate), pentaerythritol tetrakis(3-mercaptopropionate), and the like.

By using the above-mentioned compounds, carbamic acid ester comounds or thiocarbamic acid ester compounds may be prepared by reacting the isocyanate group of isopropenyl-α,α-dimethylbenzylisocyanate with the —OH group or —SH group.

In this preparation, for the purpose of accelerating the synthetic reaction, there may be added tin compounds such as dibutyltin dilaurate, dimethyltin dichloride and the like or amines such as morphorine, dimethylaminobenzene and the like. In order to prevent coloration in the later radical reaction, tin compounds are preferable.

When a solvent is used in the reaction, it is distilled off after the synthetic reaction. If necessary, the product is purified, and the monomer (D) is obtained.

Examples of monomer (D) are the following compounds of formulas (24), (25) and (26).

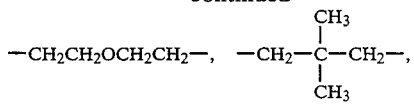

(24)

where N=1,
R$_2$=—CH$_3$, —C$_2$H$_5$, —C$_3$H$_7$, —C$_4$H$_9$, —C$_5$H$_{11}$, —C$_6$H$_{13}$, —CH$_2$CCl$_3$, —CH$_2$CF$_3$,

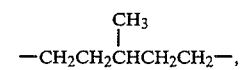

the substituent on the aromatic ring is at m- or p-position.

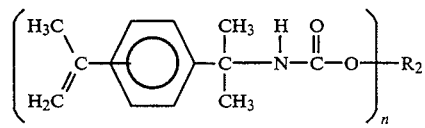

(25)

where n = 2,

R$_2$ = —(CH$_2$)$_i$— (i = 2-6), —CH(CH$_2$)$_i$— (i = 1, 2),
                        |
                        CH$_3$

—CH—(CH$_2$)$_i$—CH— (i = 0, 2),
 |              |
 CH$_3$         CH$_3$

-continued

—CH$_2$CH$_2$OCH$_2$CH$_2$—, —CH$_2$—C(CH$_3$)$_2$—CH$_2$—,

—CH$_2$CH$_2$CH(CH$_3$)CH$_2$CH$_2$—,

—(iso-C$_3$H$_6$)—O—(iso-C$_3$H$_6$)—,

—CH$_2$CH$_2$OCH$_2$CH$_2$OCH$_2$CH$_2$—,

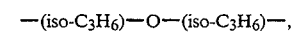

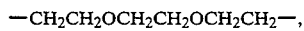

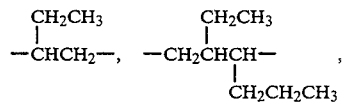

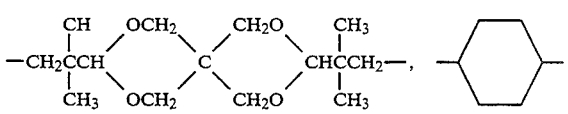

the substituent on the aromatic ring is at m- or p-position.

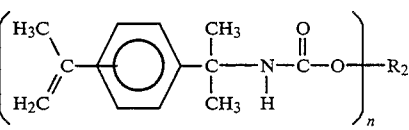

(26)

where n = 3,

R$_2$ = —CH$_2$CHCH$_2$—,  —CH$_2$CCH$_2$—,
                              |
                              CH$_3$
                              |
                              CH$_2$—

—CH$_3$CCH$_2$—,  —CH$_2$CH$_2$CHCH$_2$—,
     |
     C$_2$H$_5$
     |
     CH$_2$—

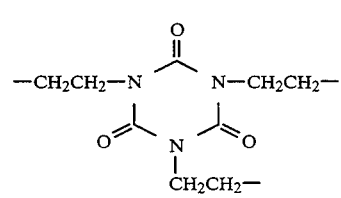

substituent on the aromatic ring is at m- or p-position.

Further examples of monomer (D) are as shown below.

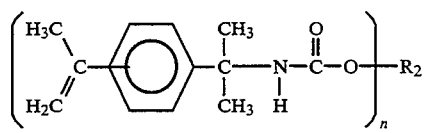

where n = 4,

R₂ = —CH₂CHCHCH₂—,

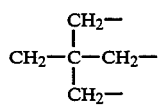

the substituent on the aromatic ring is at m-position or p-position.

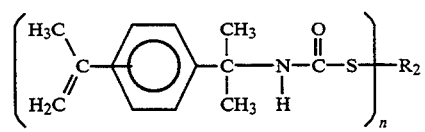

where n = 2,

R₂ = —(CH₂)ᵢ— (i = 2–6),

—CH₂COCH₂CH₂OCCH₂—,
     ‖           ‖
     O           O

—CH₂CH₂COCH₂CH₂OCCH₂CH₂—
       ‖           ‖
       O           O the substituent on the aromatic ring is at m-position or p-position.

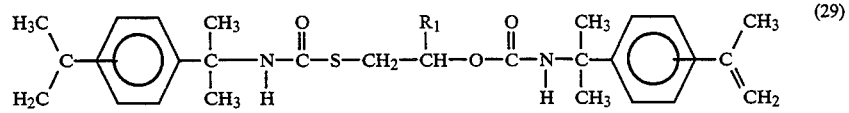

where R₁ is hydrogen or methyl, and the substituent on the aromatic ring is at m-position or p-position. Examples of the monomer (E) having functional group (7),

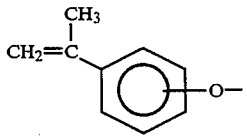

and a functional group (8) or (5)

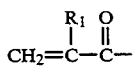

R₁ = hydrogen or methyl

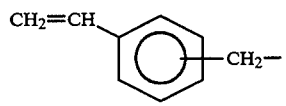

in one molecule are as shown below.

(1) Compounds produced by reacting isopropenylphenol with acrylic acid, methacrylic acid or acid chloride thereof, (2) Compounds produced by reacting isopropenylphenol with a compound having both at least one of the above-mentioned functional groups (8) and (5) and at least one of functional groups capable of reacting with the phenolic hydroxyl group of isopropenyl phenol such as —COOH, —COCl, haloalkyl, —SO₃R (R=alkyl or aryl), —NCO, —NCS, epoxy and the like.

(3) Compounds produced by reacting isopropenylphenol with a compound having both at least one functional group capable of reacting with the phenolic hydroxyl group of isopropenylphenol and at least one functional group capable of reacting with —COOH or —COCl group of (meth)acrylic acid or acid chloride thereof such as —OH, —NH₂, haloalkyl and the like, and then reacting the resulting compound with (meth)acrylic acid or acid chloride thereof, and (4) Compounds produced by reacting a compound having at least one epoxy group with isopropenylphenol to open the ring and reacting the resulting product with (meth) acrylic acid or its acid chloride.

The compounds used in (2) above for reacting with isopropenylphenol includes: 2-carboxyethylacrylate, 2-carboxyethyl methacrylate, carboxyphenyl acrylate, carboxyphenyl methacrylate, 2-bromoethyl acrylate, 2-bromoethyl methacrylate, chloromethyl styrene, 2-isocyanate ethylacrylate, 2-isocyanate ethyl methacrylate, glycidyl acrylate, glycidyl methacrylate, and the like.

The monomer (E) may be produced by using the abovementioned compounds and the following known reaction process can be used: esterification reaction of the phenolic hydroxyl group of isopropenyl phenol with —COOH or —COCl group of the above-mentioned compounds; etherification reaction with haloalkyl, —SO₃R (R is alkyl or aryl); urethane forming reaction with —NCO group, —NCS group; and ring-opening reaction with epoxy group, and the like.

In (3) above, the compound produced by reacting isopropenylphenol with a compound having both at least one functional group capable of reacting with the phenolic hydroxyl group of isopropenylphenol and at least one functional group capable of reacting with —COOH or —COCl group of (meth)acrylic acid or acid chloride thereof such as —OH, —NH₂, haloalkyl and the like is, for example, an etherification reaction product having at least one haloalkyl produced by reacting a compound having two or more haloalkyl in one molecule with isopropenylphenol, for example, an etherification reaction product of isopropenylphenol with 1,2-dibromoethane, 1,3-dibromopropane, 1,4-dibromobutane, 1,5-dibromopentane, bromo chloroethane, 1-bromo-3-chloropropane, 1-bromo-4-chlorobutane, 1-bromo-5-chloropentane, and the like, and having at least one haloalkyl group; an etherification reaction product produced by reacting a compound having at least one haloalkyl and at least one —OH group in one molecule with isopropenylphenol, for example, an etherification reaction product produced by the reaction of ethylene bromohydrin, ethylene chlorohydrin 1,3-dibromo-2-propanol, 2,3-dibromo-1-propanol, 1,3-dichloro-2-propanol, 3-bromo-1,2-propanediol, 3-chloro-1,2-propanediol, 1-bromo-2-propanol, 3-bromo-1-propanol, 1-chloro-2-propanol, 3-chloro-1-propanol, 4-chloro-1-butanol, and the like, with isopropenylphenol; and an esterification reaction product produced by the reaction of a compound having, in one molecule, at least one of —COOH, —COCl and —COBr and at least one of haloalkyl with isopropenylphenol, for example, an esterification reaction product produced by the reaction of 3-bromopropionyl chloride, 3-chloropropionyl chloride, 4-bromobutyryl chloride, 4-chlorobutyryl chloride, and the like with isopropenylphenol.

Monomer (E) may be produced by the esterification reaction of the above-mentioned product with (meth)acrylic acid or acid chloride thereof according to a conventional procedure.

The compound having at least one epoxy group in (4) above is, for example, ethylene oxide, propylene oxide, 1,2-butylene oxide, styrene oxide, cyclohexene oxide, epichlorohydrin, epibromohydrin, glycidol, epoxy phenoxy propane, glycidyl acrylate, glycidyl methacrylate, glycidyl isopropyl ether, allylglycidyl ether, ethylene glycol diglycidyl ether, 1,4-butanediol diglycidyl ether, neopentyl glycol diglycidyl ether, bisphenol A type epoxy resin, bisphenol F type epoxy resin, bisphenol S type epoxy resin, diglycidyl phthalate, diglycidyl p-hydroxybenzoate, vinylcyclohexene oxide, N,N-diglycidylaniline, tetraglycidyl diaminodiphenylmethane, triglycidyl p-aminophenol, diglycidyl hydantoin, triglycidyl isocyanurate, and the like The above mentioned compounds are subjected to a ring-opening reaction by using isopropenylphenol, and the hydroxyl group of the resulting product is subjected to an conventional esterification reaction with —COOH group of (meth)acrylic acid or —COCl group of acid chloride of said acid, and the monomer (E) can be obtained.

Examples of monomer (E) include the compounds of the following formulas (30), (31) and (32).

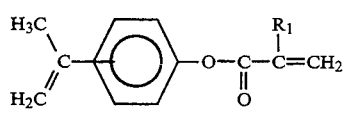 (30)

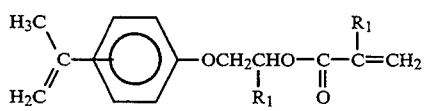 (31)

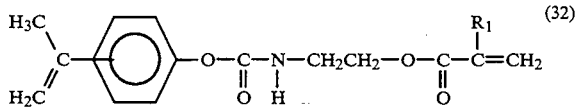 (32)

($R_1$=H or methyl).

Momomer (F) is represented by the formula (9),

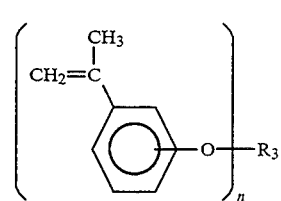 (9)

in which $R_3$ is selected from the group consisting of a saturated aliphatic residue, an alicyclic residue, an aliphatic residue having at least one of an alicyclic group, a heterocyclic ring, an aromatic ring and a hetero atom, where each of the residues may have a functional group selected from the group consisting of —C(=O)—NH—, —C(=S)—NH—, —C(=O)—O—, and —C(=O)— where the left hand bond of each of the formulas attaches to the isopropenylphenoxy group, and —C(=O)—, n is an integer of 1–4.

Monomer (F) is a compound which may be produced by reacting isopropenylphenol with a compound having 1–4 functional groups capable of reacting with phenolic hydroxyl group of isopropenylphenol selected from —NCO, —NCS, —COOH, —COCl, —COBr, haloalkyl, —SO$_3$R'(R'=alkyl or aryl) and

and aliphatic residue, alicyclic residue and aliphatic residue containing at least one of alicyclic group, heterocyclic ring, aromatic ring and hetero atom; or reacting isopropenylphenol with phosgene.

More particularly, monomer (F) is, for example, carbamic acid ester compound or carbamic acid thioester compound produced by the reaction of —NCO group or —NCS group with the phenolic hydroxyl group of isopropenylphenol; ester compound produced by the reaction of —COOH group, —COCl group, —COBr group with the phenolic hydroxyl group; carbonate compound produced by the reaction of —COCl group, phosgene with the phenolic hydroxyl group; and ether compound produced by the reaction of haloalkyl, —SO$_3$R' group (R'=alkyl or aryl), or

group.

The organic group $R_3$ in the formula (9) is preferably of low molecular weight though it varies depending on the steric strength of the structure, and the molecular weight of the residue portion is preferably 15–500. The above-mentioned compounds which can be used for producing monomer (F) by reacting with the phenolic hydroxyl group of isopropenylphenol are, for example: methylisocyanate, ethylisocyanate, propylisocyanate, butylisocyanate, cyclohexylisocyanate, methylisothiocyanate, ethylisothiocyanate, propylisothiocyanate, butylisothiocyanate, cyclohexylisothiocyanate, hexamethylenediisocyanate, 1-methylcyclohexane-2,4-diisocyanate, 1,2-dimethylcyclohexan-ω,ω'-diisocyanate, isophoronediisocyanate, dicyclohexylmethane-4,4-diisocyanate, lysine diisocyanate, xylylenediisocyanate, phenylene bis(isopropylisocyanate), 1,6,11-undecane triisocyanate, 1,8-diisocyanate-4-isocyanate methyloctane, lysine ester triisocyanate, 1,3,6-hexamethylene triisocyanate, bicycloheptane triisocyanate, hexamethylene diisothiocyanate, cyclohexane diisothiocyanate, and the like; acetic acid, propionic acid, butyric acid, valeric acid, caproic acid, caprylic acid, phenyl acetic acid, malonic acid, succinic acid, itaconic acid, maleic acid, fumaric acid, glutaric acid, glutaconic acid, adipic acid, pimelic acid, suberic acid, azelaic acid, sebacic acid, cyclopropane dicarboxylic acid, cyclobutane dicarboxylic acid, pinic acid, homopinic acid, cyclopentane dicarboxylic acid, cyclohexane dicarboxylic acid, phenylenediacetic acid, oxydiacetic acid, oxaadipic acid, thiodiacetic acid, thiodipropionic acid, dithiodiacetic acid, dithiopropionic acid, acid chlorides thereof, acid bromides thereof, and the like; diethylene glycol dichloroformate, and the like; iodomethane, bromomethane, chloromethane, iodoethane, bromoethane, chloroethane, iodopropane, bromopropane, chloropropane, iodobutane, bromobutane, chlorobutane, iodopentane, bromopentane, chloropentane, iodohexane, bromohexane, chlorohexane, iodoheptane, bromoheptane, chloroheptane, iodooctane, bromooctane, chlorooctane, iodocyclopentane, bromocyclopentane, chlrocyclopentane, iodocyclohexane, bromocyclohexane, chlorocyclohexane, benzyl chloride, dimethyl sulfate, diethyl sulfate, methyl p-toluenesulfonate, ethyl p-toluenesulfonate, diiodoethane, dibromoethane, dichloroethane, diiodopropane, dibromopropane, dichloropropane, diiodobutane, dibromobutane, dichlorobutane, diiodopentane, dibromopentane, dichloropentane, diiodohexane, dibromohexane, dichlorohexane, bromochloroethane, bromochloropropane, chloroiodopropane, bromochlorobutane, bromochloropentane, bromochlorohexane, α,α'-dibromoxylene, α,α'-dichloroxylene, and the like. The monomer (F) may be prepared by reacting isopropenylphenol with the above-mentioned compounds having the particular functional group reactive with the phenolic hydroxyl group of isopropenylphenol and the particular residues according to a conventional reaction procedure.

When a solvent is used, it is distilled off after the reaction, and if necessary, the product is purified.

Examples of monomer (F) include, the following compounds of the formulas (33)–(38)

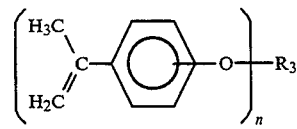
(33)

n=1, R₃=—CH₃, —C₂H₅, —C₃H₇, —C₄H₉, —C₅H₁₁, —C₆H₁₃,

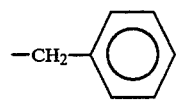

where the substituent on the aromatic ring is at o-, m-, or p-position.

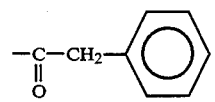
(34)

n = 1, R = —C—CH₃, —C—C₂H₅, —C—C₃H₇,
         ‖        ‖        ‖
         O        O        O

—C—C₄H₉, —C—C₅H₁₁, —C—C₈H₁₃,
 ‖         ‖          ‖
 O         O          O

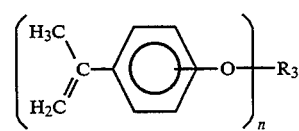

where the substituent on the aromatic ring is at o-, m-, or p-position.

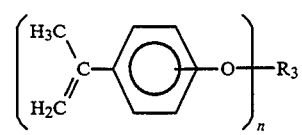
(35)

n = 1, R₃ = —C—N—CH₃, —C—N—C₂H₅,
            ‖ |        ‖ |
            O H        O H

—C—N—C₃H₇, —C—N—C₄H₉, 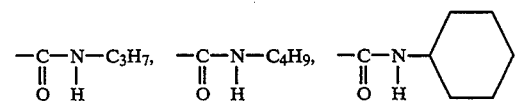
 ‖ |        ‖ |
 O H        O H where the substituent on the aromatic ring is at o-, m-, or p-position.

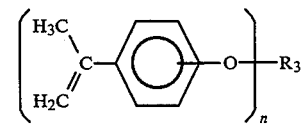
(36)

n=2, R₃=—(CH₂)₂—, —(CH₂)₃—, —(CH₂)₄—, —(CH₂)₅—, —(CH₂)₆— where the substituent on the aromatic ring is at o-, m-, or p-position.

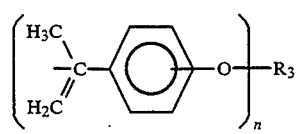
(37)

n = 2, R₃ = —C—CH₂—C—,
            ‖      ‖
            O      O

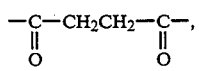

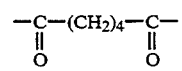

where the substituent on the aromatic ring is at o-, m-, or p-position.

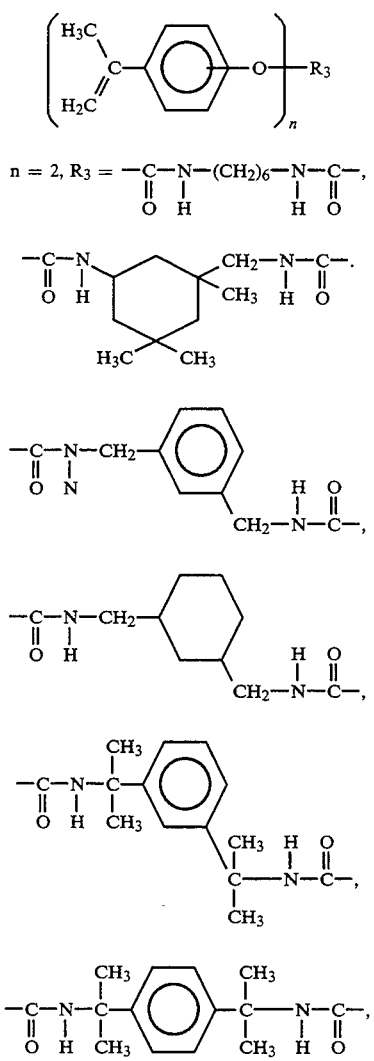

where the substituent on the aromatic ring is at o-, m-, or p-position.

Momomer (G) is a compound represented by the formula (10),

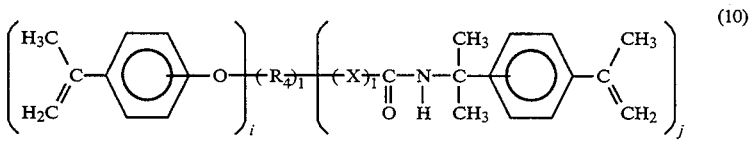

where X is selected from the group consisting of oxygen and sulfur, and $R_4$ is selected from the group consisting of an aliphatic residue having or not having an oxygen atom, an alicyclic ring, a heterocyclic ring or an aromatic ring, and an alicyclic residue, 1 is a number of zero or one, i and j are integers of one or more, when 1 is zero, i=j=one, when 1 is one, (i+j) is 4 or less, when j is one, X is oxygen or sulfur, when j≦2, X's are all oxygen or all sulfur, one X is oxygen and the other X or X's are sulfur, or one X is sulfur and the other X or X's are oxygen.

In particular, examples of the monomer (G) may be the following compounds:

(1) a compound producible by a carbamic acid esterification reaction of the phenolic hydroxyl group of isopropenylphenol with the isocyanate group of isopropenyl-α,α-dimethylbenzylisocyanate;

(2) a compound producible by subjecting a compound having an aliphatic residue having or not having oxygen atom, alicyclic ring, heterocyclic ring or aromatic ring, or alicyclic residue with 1-2 epoxy groups or thiirane groups to a ring-opening reaction using isopropenylphenol, and reacting the resulting —OH group or —SH group formed by the ring opening reaction with the isocyanate group of isopropenyl-α,α-dimethylbenzylisocyanate to effect a carbamic acid esterification reaction or a thiocarbamic acid esterification;

(3) a compound producible by subjecting a compound having an aliphatic residue having or not having oxygen atom, alicyclic ring, heterocyclic ring or aromatic ring, or alicyclic residue with both at least one haloalkyl group capable of reacting with a phenolic hydroxyl group of isopropenylphenol and at least one of —OH group and —SH group to an etherification reaction with the phenolic hydroxyl group of isopropenylphenol, and then reacting the —OH group and/or —SH group with the isocyanate group of isopropenyl-α,α-dimethylbenzylisocyanate to effect a carbamic acid esterification reaction and/or thiocarbamic acid esterification reaction.

The molecular weight of the residue $R_4$ in the formula (10) is generally preferably low though this depends on the steric strength of the structure, and the molecular weight is preferably 25-500.

The above-mentioned compounds having an aliphatic residue having or not having oxygen atom, alicyclic ring, heterocyclic ring or aromatic ring, or alicyclic residue with 1-2 epoxy or thiirane groups include: ethylene oxide, propylene oxide, 2,3-epoxy butane, 3,4-epoxy butane, 2,3-epoxy pentane, 1,2-epoxy hexane, epoxy cyclohexane, epoxy cycloheptane, epoxy cyclooctane, styrene oxide, 2-phenyl-1,2-epoxy propane, tetramethylethylene oxide, epichlorohydrin, epibromohydrin, glycidol, 1,2-epoxy-3-phenoxy propane, glycidyl isopropyl ether, ethylene sulfide, propylene sulfide, isobutene sulfide, 2,3-butylene sulfide, styrene sulfide, ethylene glycol diglycidyl ether, butanediol diglycidyl ether, neopentyl glycol diglycidyl ether, spiro glycol diglycidyl ether, trimethylol propane triglycidyl ether, bisphenol A type epoxy resin, tetrabromo bisphenol A type epoxy resin, bisphenol F type epoxy resin, bisphenol S type epoxy resin, alicyclic diepoxy acetal, alicyclic diepoxy adipate, alicyclic diepoxy carboxylate, vinylcyclohexene dioxide, diglycidyl phthalate, diglycidyl tetrahydrophthalate, diglycidyl hexahydrophthalate, diglycidyl p-oxybenzoate, diglycidyl malonate, diglycidyl succinate, diglycidyl glutarate, diglycidyl adipate, N,N-diglycidyl aniline, diglycidyl hydantoin, and the like.

The above-mentioned compounds having an aliphatic residue having or not having oxygen atom, alicyclic ring, heterocyclic ring or aromatic ring, or alicyclic residue with both at least one haloalkyl group capable of reacting with a phenolic hydroxyl group of isopropenylphenol and at least one of —OH group and —SH group include: iodoethanol, bromoethanol, bromopropanol, 3-bromo-1,2-propanediol, bromohexanol, chloroethanol, chloropropanol, 3-chloro-1,2-propanediol, chlorobutanol, chlorohexanol, 1,4-dibromo-2,3-butanediol, 2,3-dibromo-1,4-butanediol, 1,4-dibromo-2-butanol, 1,3-dibromo-2-propanol, 2,3-dibromo propanol, 1,3-dichloro-2-propanol, dibromoneopentyl glycol, chloropropanethiol, and the like.

The monomer (G) may be produced by using the abovementioned compounds and effecting the procedures in (1), (2) and (3) above following the conventional carbamic acid esterification, thiocarbamic acid esterification, etherification and ring-opening reaction of epoxy or thiirane group.

When a solvent is used, the solvent is distilled off after the synthetic reaction. If necessary, purification is effected and the monomer (G) is obtained.

Examples of monomer (G) include the compounds of the formulas (39) and (40),

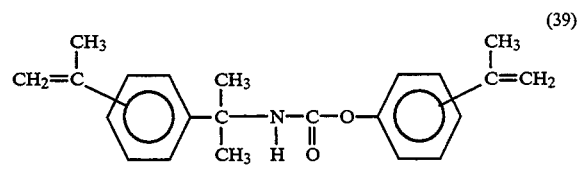

(39)

where the substituents on the aromatic ring of isopropenyldimethylbenzyl group are oriented in m- or p-position, and the substituents on the aromatic ring of isopropenylphenoxy group are oriented in p-, m-, or o-position.

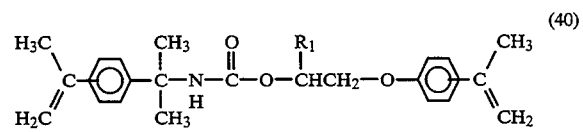

(40)

where $R_1$ is hydrogen or methyl, the position of the substituents on an aromatic ring are oriented in m- or p-position for isopropenyl-α,α-dimethylbenzyl and p-, m- or o-position for isopropenylphenoxy group.

The high hardness transparent resins in the present invention may be produced by polymerizing and curing the above-mentioned monomers.

Monomer (A) can be cured alone, and therefore, resins can be prepared by the homopolymerization of monomer (A).

When monomer (A) is polymerized with monomer (B), resin-b can be produced. In this copolymerization, the ratio of monomer (A) to monomer (B) can not be absolutely determined since the desirable ratio varies depending on the kinds of functional groups in the monomers and structures of the monomers. However, in general, it is preferable to carry out the copolymerization such that 1 equivalent of isopropenylphenyl group of monomer (A) and 0.5–10 equivalents of total of $CH_2=CH-C(=O)-$, $CH_2=C(CH_3)-C(=O)-O-$,

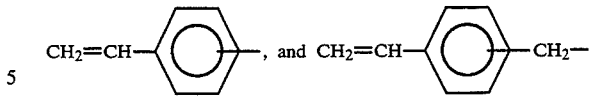

in monomers (A) and (B) are used.

When monomer (A) is copolymerized with monomer (C), resin-c can be produced which is better than resin-b as to impact resistance.

When monomers (A), (B) and (C) are polymerized, resin-d can be produced which exhibits a better impact resistance than resin-c.

The ratio of monomers in this copolymerization can not be absolutely determined since it varies depending on the kinds of the functional groups of monomers and structures of monomers involved.

With respect to the ratio of isopropenylphenyl group of monomer (A), —SH group of monomer (C), and the following groups of monomers (A) and (B), $CH_2=CH-C(=O)-O-$, $CH_2=C(CH_3)-C(=O)-O-$,

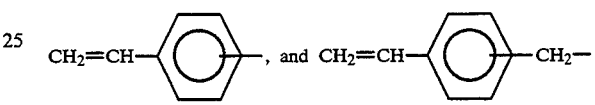

through the ratio can not be absolutely determined since it varies depending on the kinds of functional groups and structures of monomers, when the ratio of —SH group is low, the impact resistance can not be sufficiently improved. On the contrary, when the ratio of —SH group is high, the resulting polymer becomes rubbery and the surface hardness and stiffness are lowered to a great extent.

When the ratio of the "following groups of monomers (A) and (B) "above is low, a polymer can not be obtained while when said ratio is too high, the control of polymerization becomes difficult.

In copolymerization, the ratio is usually 0.1–5 equivalents, preferably, 0.3–1.5 equivalents per one equivalent of isopropenylphenyl group, and further, the total of said "following groups of monomers (A) and (B)" is usually 0.3–10 equivalents, preferably 0.5–6 equivalents.

Monomer (D) does not polymerize alone. When monomer (D) is copolymerized with monomer (B), resin-e is obtained.

The ratio of monomer (D) to monomer (B) in copolymerization follows the ratio of monomer (A) to monomer (B).

When monomers (D), (B) and (C) are copolymerized, resin-f can be obtained which has an improved impact resistance as compared with resin-e.

The ratio of the monomers in this copolymerization follows that of monomers (A), (B) and (C).

Monomer (E) can be polymerized and cured alone, and therefore, homopolymerization of monomer (E) gives resin-g.

When monomer (E) is copolymerized with monomer (B), resin-h can be obtained. The ratio of monomer (E) to monomer (B) follows that of monomer (A) to monomer (B).

Monomer (F) and monomer (G) can not be polymerized each alone.

When these monomers are copolymerized with monomer (B), there are prepared resin-i and resin-j, respectively.

The ratio of monomer (F) or monomer (G) to monomer (B) follows that of monomer (A) to monomer (B).

When the monomers capable of producing two or more kinds of resins are mixed and polymerized and cured, two or more resins in the above-mentioned high hardness transparent resin groups can be obtained.

In order to produce a laminated transparent plastic material of the present invention by using the high hardness transparent resin, the monomer for the resin is poured into a vacant space between a transparent resin material set in a casting polymerization mold and the said mold, and the polymerization is effected, or the monomer is poured into the vacant space of the casting polymerization mold and the resulting high hardness transparent resin molded product is adhered to a transparent resin material by using an adhesive.

The polymerization of the present invention is a radical polymerization and the polymerization method may be not only heat polymerization, but polymerization by using ultraviolet light or gamma rays. Further, there may be used a combination of polymerization methods. Heat polymerization method is particularly preferable.

The radical polymerization initiator is not particularly limited, but may be known peroxides such as benzoyl peroxide, p-chlorobenzoyl peroxide, diisopropyl peroxycarbonate, di-2-ethylhexyl peroxycarbonate, t-butyl peroxypivalate, and the like, and azo compounds such as azobisisobutyronitrile and the like. The amount to be used is usually 0.01–5% by weight.

The photosensitizer for ultraviolet light curing is not particularly limited, but there may be used known benzoin compounds such as benzoin methyl ether, benzoin ethyl ether, benzoin propyl ether, benzoin isobutyl ether, 2-hydroxy-2-benzoinpropane, azobisisobutyronitrile, benzil, thioxanthone, diphenyl disulfide and the like.

The amount used is usually 0.01–5% by weight. When radiation such as gamma rays and the like is used, a polymerization initiator is not always necessary.

Heat polymerization is usually effected at a heating temperature of 50°–200° C. and the polymerization time is 1–5 hours. And optimum conditions are selected for polymerization to produce a high hardness transparent resin alone, and for lamination of a transparent resin material to a high hardness transparent resin.

To monomer liquid or liquid mixture of monomers may be added in advance an additive such as ultraviolet absorber, antioxidant, coloration inhibitor, fluorescent dye, and near infrared ray absorber or other reactive monomer.

The mixture liquid thus prepared is ready for a monomer for polymerization, if necessary, after defoaming treatment.

Lamination of the resins, i.e. the process for producing the laminated transparent plastic material of the present invention is explained below.

Casting polymerization method is carried out by setting a transparent resin material in a mold for casting polymerization, and a monomer for the high hardness transparent resin is poured into the remaining vacant space of the mold followed by polymerization for producing the laminated transparent plastic material.

The mold for casting polymerization comprises a gasket at a periphery of one side of the mold material, and a spacer provided at the inside adjacent portions so as to form a space between a transparent resin material and the surface of the mold inner surface. Thus the high hardness transparent resin layer of a desired thickness can be formed on the transparent resin material.

The two mold material members of such structure are integrated such that the both gasket surfaces can be tightly brought into contact, and the peripheral portion is fixed with a fastening tool such as clips. In this case, the peripheral portion through which the monomer is poured into the mold is not fixed such that a part of gasket can be opened for accepting the monomer.

When the high hardness transparent resin is laminated to only one surface of the transparent resin material, it is only necessary to mount a spacer on only one surface of the mold.

As material for the mold, there may be used ordinary metals such as iron, copper, aluminum, alloys such as brass, and further, glass, glass reinforced plastics, carbon fiber reinforced plastics or such like composite resins.

In short, a material having a smooth surface and inert to the monomer for the high hardness transparent resin poured into a mold, for example, corrosion of the mold by a monomer, denaturing of the monomer caused by a dissolved component from the mold, or penetration of the monomer into the mold material does not occur.

In the case of heat polymerization, the mold material should not be denatured by the heat or the dimension stability adversely affected by heat.

The gasket should have chemical resistance and heat resistance, and sufficiently resist penetration of a monomer, and further it should have a proper softness.

For example, as resin materials, there may be mentioned polyvinyl resin, or silicone resin in the form of a tube or sheet.

The thickness of a gasket is usually selected to be slightly thicker than that of the desired laminated transparent plastic material taking into a slight shrinkage of the high hardness transparent resin upon curing.

As to the spacer material, it may be that of the same property and shape as the gasket, but other ordinary resin sheets also can be used. The shape of the mold should correspond to that of the desired laminated transparent plastic material.

According to the method of the polymerization of the present invention, the lamination can be effected for a material having curvature as well as a material of a plane type. Therefore, the shape of mold can be freely designed or selected in conformity with the desired laminated transparent plastic material.

In the case of producing such a laminated transparent plastic material having a curvature, it is necessary to first prepare a transparent resin material with a curvature as a substrate.

This transparent resin material can be easily prepared, for example, by placing a transparent resin material between two mold members, setting the mold in a hot air oven, and then heating at about Tg of the transparent resin material for 1–2 hours.

In the preparation of this laminated transparent plastic material, an internal release agent or external release agent is used in the case of necessary.

The transparent resin material may be selected from polymethyl methacrylate resin, polycarbonate resin, polystyrene resin, polyester resin, polyacetal resin, polysulfone resin, polyethersulfone resin, polyvinyl chloride resin, polyvinyldene chloride resin, epoxy resin, unsaturated polyester resin, polyurethane resin, diallyl phthalate resin, and diethylene glycol bisallyl carbonate resin.

The size of the transparent resin material should correspond to that of the desired laminated transparent plastic material. However, when the thickness is too thin, form stability in polymerization is so poor that the thickness is preferably 0.2 mm or more.

In the case of using a mutual dissolution protecting layer, the resin material of the mutual dissolution protecting layer may be selected from polymethyl methacrylate resin, silicone thermosetting resin, acrylic thermosetting resin, and acrylic photo-curable resin.

The shape of the resin becoming said protecting layer may be a sheet, or a liquid primer composed of the above-mentioned resin dissolved in an appropriate solvent, or the like.

The method of laminating the protecting layer to the transparent resin material is to bring a film or sheet protecting layer into close contact with the surface of the transparent resin material followed by ordinary heat fusion and adhering.

On the other hand, in the case of liquid primer, a transparent resin material is soaked in the liquid primer, taken out from the liquid primer, and the solvent is removed, and then heat curing is effected.

Depending on the type of resin, a photo-curing method can be applied.

The thickness of the mutual dissolution protecting layer is to be such that the opacity at the laminating interface between the transparent resin material and the high hardness transparent resin can be prevented. Any more thickness than that necessary to attain the above-mentioned purpose is not necessary.

The thickness of 2 $\mu$m–100 $\mu$m is usually sufficient though it varies depending on the combination of the two resins.

In the case of lamination of a transparent resin material and a high hardness transparent resin molded product by using an adhesive layer, the resin for the adhesive layer may be selected from the above-mentioned polyvinyl butyral resin, melamine resin, epoxy resin, acrylic thermosetting resin, unsaturated polyester resin, polyurethane resin, polyvinyl acetate resin, polyvinyl chloride resin, and the like.

Such adhesive resin is applied to a surface of one of the transparent resin material and the high hardness transparent resin molded product, or to a surface of each of the material and the molded product. Then, by facing them with the adhesive therebetween, the adhering is effected.

The adhering is usually carried out by placing the materials in an autoclave to defoam under reduced pressure, and then heat and pressure are applied thereto though the procedure varies depending on the resin of adhesive. The heating temperature is usually 40° C.–120° C. and the pressure 5 kgf/cm$^2$ –10 kgf/cm$^2$.

The high hardness transparent resin molded product used in the adhering may be produced in accordance with the method for casting polymerization of the previously mentioned laminated transparent plastic material.

That is, polymerization is effected by pouring a monomer for the high hardness transparent resin into a vacant space in a casting polymerization mold provided with a gasket corresponding to the thickness of the desired high hardness transparent resin molded product followed by effecting polymerization.

As explained above, the process for producing the laminated transparent plastic material according to the present invention can be easily effected without any complicated steps.

Physical properties of resins required for various materials such as, for example, glazing materials which is one of the contemplated application of the laminated transparent plastic material, are high surface hardness, scratch resistance, stiffness as well as impact resistance all in combination as far as mechanical properties are concerned.

In ordinary transparent resins, impact resistance is incompatible with surface hardness as to strength factors, but the compatibility of these contradictory properties is required in the field of glazing materials.

When one resin of high impact resistance and the other resin of high surface hardness are mixed, that is, at the stage of monomer, the monomers corresponding to these polymers, repectively are blended, or at the polymer base, these polymers are blended, the resulting properties are usually such that the properties are rather mutually deteriorated. Such phenomena are already known in the art.

In view of the recent development of a hard coat technique, it has been contemplated to improve the surface hardness by applying a hard coat technique to a resin molded product having high impact resistance, and the surface hardness appears to be fairly improved, but the thickness of the coat film is limited from the technical point of view.

As a result, it can not be expected to improve the stiffness as mentioned above.

The present inventors have conducted research to satisfy both impact resistance and surface hardness which are, in general, incompatible, and found that a resin molded product can be obtained which can have the properties of both resins in combination by laminating the high hardness transparent resin previously proposed by the present inventors to a transparent resin molded product. As a result, there is provided a laminated transparent plastic material having high impact resistance and surface hardness, and further, chemical resistance and heat resistance in combination, and still further bending modulus of elasticity of 350 kgf/mm$^2$ or more.

The reason why the thickness of the high hardness transparent resin layer of the laminated transparent plastic material is 0.2 mm or more is that when said layer is less than 0.2 mm in thickness, the bending modulus of elasticity can not be 350 kgf/mm$^2$ or more and the high stiffness of said high hardness transparent resin can not be imparted to the laminated transparent plastic material.

The above-mentioned high hardness transparent resins proposed by the present inventors are disclosed in Japanese Patent Application Laid-open Nos. Hei 2-84406, Hei 3-14804, Hei 3-47817, Hei 3-72513, Hei 3-179015, and Hei 4-266927.

Preferable laminated transparent plastic material is composed of a transparent resin material such as polymethyl methacrylate resin molded product, polycarbonate resin molded product, and polycarbonate resin having a polymethyl methacrylate resin or acrylic photo-curable resin as the mutual dissolution protecting layer and the high hardness transparent resin, for example, resin-a, -b, or -d layer overlying said transparent resin material and prepared by the casting polymerization method.

Another aspect of the present invention is concerned with a novel polymerizable monomer. This polymerizable monomer is useful for producing the high hardness transparent resin in the present invention. Therefore, this polymerizable monomer may be applicable in the technical field of the high hardness transparent resins previously proposed by the present inventors and useful in the present invention.

The present inventors have conducted research to impart more flexibility to the previously proposed high hardness transparent resins for the purpose of improving impact resistance, and found a new polymerizable monomer having the following formula (23),

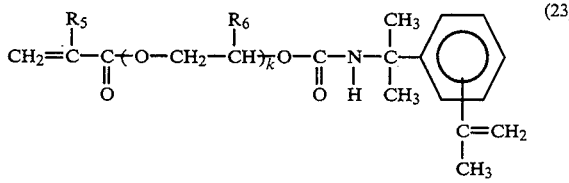

where $R_5$ and $R_6$ are similar or dissimilar and are selected from group consisting of hydrogen and methyl, k is an integer of 2–10, and the isopropenyl substituent on the aromatic ring is in the p-position or m-position.

This polymerizable monomer may be prepared by the following procedure.

To one mole of a compound of the following formula

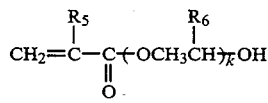

where $R_5$, $R_6$ and k are as defined above, such as polyethylene glycol monoacrylate, polyethylene glycol monomethacrylate, polypropylene glycol monoacrylate, and polypropylene glycol monomethacrylate, was added 0.8–1.1 mole of 3-isopropenyl-α,α-dimethylbenzylisocyanate or 4-isopropenyl-α,α-dimethylbenzylisocyanate, preferably 0.95–1.05 mole thereof.

Then, the reaction is carried out at 20–80° C., preferably 30°–60° C. in the absence of a catalyst, or in the presence of a urethane forming accelerating catalyst such as dibutyltin diisocyanate in an amount of 0.001–5% by weight, preferably 0.05–1% by weight.

After completion of the reaction, the reaction fluid is purified by column chromatography to give the polymerizable monomer of the present invention.

The present invention is now more particularly described with reference to the following examples which are for the purpose of illustration only and are intended to imply no limitation thereon.

Various resin molded products used in the examples are as shown below.

(1) Polymethyl methacrylate resin molded product (hereinafter called "RMP-1"): Commercially available "SUMIPEX" (trade name, manufactured by Sumitomo Chemical Co.)

(2) Polycarbonate resin molded product (hereinafter called RMP-2"): Commercially available "Iupilon Sheet NF-2000-U "(trade name, manufactured by Mitsubishi Gas Chemical Co.)

(3) Polycarbonate resin molded product having a polymethyl methacrylate resin as a mutual dissolution protecting layer (hereinafter called "RMP-3"): Commercially available "Iupilon Sheet- L-55"(trade name, manufactured by Mitsubishi Gas Chemical Co.)

(4) Polyvinyl chloride resin molded product (hereinafter called "RMP-4"): Commercially available from Adeka-Agus Co.

(5) Epoxy resin molded product (* 1) (hereinafter called "RMP-5")

(6) Polyester resin molded product (* 2) (hereinafter called "RMP-6")

(7) Diallylphthalate resin molded product (* 3) (hereinafter called "RMP-7")

(8) Polyurethane resin molded product (* 4) (hereinafter called "RMP-8")

(9) Polyacetal resin molded product (* 5) (hereinafter call "RMP-9")

(10) Unsaturated polyester resin molded product (* 6) (hereinafter called "RMP-10")

1 Preparation: 250 Parts of diglycidyl ether of bisphenol A (Epikote 828, trade name, manufactured by Yuka Shell Epoxy Co.), 200 parts of methyl endo-methylene tetrahydrophthalic anhydride and 2.5 parts of a tertiary amine (accelerator) are mixed and the resulting mixture is poured into a casting polymerization mold. The mold is then set in a hot air oven and heated at 100° C. for 2 hours and further at 150° C. for 4 hours to polymerize.

2 Preparation: Pellets of polyethylene terephthalate resin (Sunpet, trade name, manufactured by Asahi Kasei K.K.) are placed in a casting polymerization mold and the mold is set in an autoclave to fuse and integrate the pellets at a pressure of 5 kgf/cm² and at 130° C. for 2 hours.

*3 Preparation: 180 Parts of diallylisophthalate manufactured by Osaka Soda K.K. and 198 parts of diethylene glycol bis(allylcarbonate) (MR - 3, trade name, manufactured by Mitsui Toatsu Chemicals, Inc.) are mixed. To the resulting mixture is added 11 parts of isopropenyl peroxide as a radical polymerization initiator.

The resulting monomer is poured into a casting polymerization mold and then the mold is set in a hot air oven and heated from room temperature to 80° C. over 24 hours to effect polymerization.

*4 Preparation:

To 400 parts of a monomer for a sulfur-containing polyurethane resin (MR-6, trade name, manufactured by Mitsui Toatsu Chemicals, Inc.) is added 0.04 part of dibutyltin dichloride as a urethane forming reaction catalyst and the resulting monomer is poured into a casting polymerization mold and then the mold is set in a hot air oven and heated from 40° C. to 120° C. for 24 hours to effect polymerization.

*5 Preparation: Pellets of a polyacetal resin (Tenac, trade name, manufactured by Asahi Kasei K.K.) are placed in a casting polymerization mold, and the mold is set in an autoclave, pressurized to 5 kgf/cm² and heated at 160° C. for 2 hours to heat-melt and integrate the pellets.

*6 Preparation: To 400 parts of a monomer for an unsaturated polyester resin (Estar C Type, trade name, manufactured by Mitsui Toatsu Chemicals, Inc.) is added 8 parts of benzoyl peroxide as a radical polymerization initiator, and the monomer is poured into a casting polymerization mold and the mold is placed in a hot air oven and heated from 40° C. to 100° C. over 4 hours to effect polymerization. Characteristics of the laminated transparent plastic materials obtained by examples were evaluated as shown below.
Appearance:
(1) A sample was observed by naked eyes. When neither crack nor surface roughness was found, the sample was designated by a sign "○".
(2) Total visible light transmittance %: Measured according to ASTMD-1003.
(3) Surface hardness:
  i) Pencil hardness: Measured by means of a pencil scratching test machine for coating according to JIS-k-5401
  ii) Vickers hardness: Measured by means of a minute hardness tester of Terasawa type manufactured by Tohyoh Seiki Seisakusho K.K.
  iii) Rockwell M scale hardness: Measured according to ASTM D-786.
(4) Impact resistance: Measured by means of a Charpy impact test for rigid plastics according to JIS-K-7111 without notch unless otherwise specified.
(5) Bending modulus of elasticity: Measured according to JIS-K-7203.
(6) Heat resistance: The polymer sample was placed in a hot air drier at 120° C. for 4 hours and then taken out from the drier. When neither coloration nor strain on the surface of the sample was found by observation with naked eyes, the sample was designated by a sign "○".
(7) Chemical resistance: After soaked in each of isopropanol and toluene at room temperature for 24 hours, two tests were effected by writing on the surface with a pencil of HB hardness. When no trace remained, the sample was designated by a sign "○".
(8) Workability: When a sample could be ground by a lens polishing machine for spectacle lens, the sample was designated by a sign "○".

In the following, parts are by weight unless otherwise specified.

EXAMPLE 1

To 253.6 parts of 3-isopropenyl-$\alpha,\alpha$-dimethylbenzylisocyanate was added 0.64 part of dibutyltin dilaurate as a reaction catalyst, and 146.4 parts of 2-hydroxyethyl acrylate was gradually added to the resulting mixture while the reaction temperature was kept at 60° C. After completion of the addition, a urethane forming reaction was carried out at the same temperature as above, for 2 hours.

As a result, there was obtained colorless, syruplike N-(3-isopropenyl-$\alpha,\alpha$-dimethylbenzyl)-2-acryloyloxyethyl carbamate. To the resulting product was added 2.53 parts of t-butylperoxy-2-ethylhexanoate as a radical polymerization initiator and after sufficient stirring, defoaming was effected.

The resulting monomer was polymerized in a mold. The mold for polymerization was composed of two plane glass plates, each having a thickness of 5 mm and a length of a side of 400 mm, and a silicone rubber gasket.

A polymethyl methacrylate resin molded product (RMP-1) of 3 mm thick having a length of the side of 380 mm was placed at the middle portion between the two glass plates in the mold by using spacers such that each of the two facing distance between the inner surface of the glass plate and the surface of the resin molded product facing thereto was 1 mm, and all parts were finally fixed.

The monomer was poured into the mold for polymerization, and then the mold was placed in a hot air oven and the temperature was raised from 60° C. to 170° C. over 3 hours to carry out the polymerization. After cooling, the mold was taken from the oven and there was obtained a colorless laminated transparent plastic material.

EXAMPLE 2

To 227.2 parts of 3-isopropenyl-$\alpha,\alpha$-dimethylbenzylisocyanate was added 0.56 parts of dibutyltin dilaurate as a reaction catalyst, and 105.1 parts of 2-hydroxyethyl acrylate was gradually added to the resulting mixture and then 67.7 parts of pentaerythritol triacrylate was gradually added to the mixture while the reaction temperature was kept at 60° C.

Then, a urethane forming reaction was carried out at the same temperature for two hours.

To an acrylate mixture of the resulting urethane compound was added 2.27 parts of t-butylperoxy-2-ethylhexanoate and the mixture was stirred sufficiently followed, by defoaming.

The resulting monomer was used for carrying out the polymerization in a way similar to the procedure of Example 1.

EXAMPLE 3

To 202.4 parts of 3-isopropenyl-$\alpha,\alpha$-dimethylbenzylisocyanate and 197.6 parts of glycerol-1,3-diacrylate was added 0.88 part of dibutyltin dilaurate as a reaction catalyst, and a urethane forming reaction was carried out for 2 hours at a reaction temperature of 60° C. to obtain a colorless syrup-like N-(3-isopropenyl-$\alpha,\alpha$-dimethylbenzyl)-1,3-diacryloyloxypropan-2-yl carbamate.

Then, to this product were added 0.4 part of lauroyl peroxide and 2.0 parts of benzoyl peroxide as radical polymerization initiators and the mixture was stirred sufficiently, followed by defoaming.

The resulting monomer was used for polymerization following the procedure of Example 1.

EXAMPLE 4

To 105.1 parts of trimethylolpropane triacrylate and 186.9 parts of 3-isopropenyl-$\alpha,\alpha$-dimethylbenzylisocyanate was added 1.33 part of dibutyltin dilaurate as a reaction catalyst, and then 108.0 parts of 2-hydroxyethyl acrylate was gradually added at a reaction temperature of 60° C. Then, a urethane forming reaction was carried out at the same temperature for 2 hours.

Then, to an acrylate mixture of the resulting urethane compound was added 4.64 parts of t-butylperoxy-2-ethylhexanoate and the mixture was stirred sufficiently, followed by defoaming. The resulting monomer was subjected to polymerization following the procedure of Example 1.

EXAMPLE 5

To 193.9 parts of 3-isopropenyl-$\alpha,\alpha$-dimethylbenzylisocyanate and 206.1 parts of glycerol-1-acrylate-3-methacrylate was added 2.03 parts of dibutyltin dilaurate as a reaction catalyst, and a urethane forming reaction was effected at 60° C. for one hour to give colorless syrup-like N-(3-isopropenyl-$\alpha,\alpha$-dimethylbenzyl)-1-acryloyloxy-3-methacryloyloxypropan-2-yl carbamate.

Then, to this product were added 0.4 part of lauroyl peroxide and 2.0 parts of benzoyl peroxide as radical polymerization initiators and the mixture was stirred sufficiently, followed by defoaming.

The resulting monomer was poured into a mold for polymerization as used in Example 1 and the mold was placed in a hot air oven. The polymerization was carried out at 60° C. for one hour and at 160° C. for further 2 hours.

After cooling, the mold was taken from the oven and there was obtained a colorless molded product (a laminated plastic material).

EXAMPLE 6

To 200.5 parts of 4-isopropenyl-α,α-dimethylbenzylisocyanate and 199.5 parts of glycerol-1,3-diacrylate was added 2.08 parts of dibutyltin dilaurate as a reaction catalyst, and a urethane forming reaction was effected at 60° C. for one hour to give colorless syrup-like N-(4-isopropenyl-α,α-dimethylbenzyl)-1,3-diacryloyloxypropan-2-yl carbamate.

To this product were added 0.4 parts of lauroyl peroxide and 2.0 parts of benzoyl peroxide as radical polymerization initiators and the mixture was sufficiently stirred, followed by defoaming.

The resulting monomer was poured into a mold for polymerization as used in Example 1, and a polymerization was effected following the procedure of Example 5 to give a colorless transparent molded product.

EXAMPLE 7

To 182.4 parts of 3-isopropenyl-α,α-dimethylbenzylisocyanate and 18.7 parts of ethylene glycol was added 0.08 part of dibutyltin dilaurate as a reaction catalyst, and a urethane forming reaction was carried out for 0.5 hour at 40° C.

Then, to the resulting reaction fluid was added 39.2 parts of 2-hydroxymethyl acrylate, and a urethane forming reaction was effected for 2 hours at 50° C.

Further, to the resulting reaction fluid was added 159.7 parts of pentaerythritol tetraacrylate and the mixture was sufficiently stirred. To the resulting acrylate mixture of the urethane compound was added 0.4 part of t-butylperoxy-2-ethylhexanoate as a radical polymerization initiator and the resulting mixture was stirred sufficiently, followed by defoaming.

The resulting monomer was subjected to a polymerization following the procedure of Example 1, and further polymerization was effected for 30 min. at 180° C.

EXAMPLE 8

To 201 parts of 4-isopropenyl-α,α-dimethylbenzylisocyanate was added 0.5 part of dibutyltin dilaurate, and the temperature was raised to 60° C. while 222 parts of 3-phenoxy-2-hydroxypropyl acrylate was gradually added, to effect a urethane forming reaction.

As a result, there was obtained a viscous urethane compound which exhibited substantially no absorption of isocyanato group in infrared absorption spectrum.

To the resulting urethane compound were added 200 parts of methyl acrylate and 3.0 parts of t-butylperoxy-2-ethylhexanoate and the mixture was stirred sufficiently, and then a preliminary polymerization was carried out by stirring keeping the temperature at 50° C. until the viscosity of the reaction fluid became 150 c.p., followed by defoaming under reduced pressure.

The resulting liquid matter was subjected to a polymerization following the procedure of Example 1.

EXAMPLE 9

To 300 parts of styrene and 201 parts of 4-isopropenyl-α,α-dimethylbenzylisocyanate was added 1.0 part of dibutyltin dilaurate. A urethane forming reaction was carried out by adding gradually 514 parts of bisphenol A bis(2-hydroxymethacryloyloxypropylether) to the mixture prepared as above, and there was obtained a viscous styrene mixture of a urethane compound which had substantially no absorption of isocyanato group in infrared absorption spectrum.

To this product was added 5.0 parts of t-butylperoxy-2-ethylhexanoate and the mixture was stirred sufficiently, followed by defoaming under reduced pressure. The resulting liquid matter was used to effect a polymerization according to the procedure of Example 1.

EXAMPLE 10

A monomer containing a radical polymerization initiator prepared according to the same formula as in Example 1 was poured into a mold for polymerization.

The mold for polymerization was composed of two glass plates, each having a thickness of 5 mm, a curvature of 0.02 and a diameter of 300 mm, and a silicone gasket.

A polymethyl methacrylate resin molded product (RMP-1) of 3 mm thick having a curvature of 0.02 and a diameter of 280 mm was placed at the middle portion between the two glass plates in the mold by using spacers such that each of the two facing distances between the inner surface of the glass plate and the surface of the resin molded product facing thereto was 1 mm, and all parts were finally fixed.

The mold charged with the monomer was placed in a hot air oven and polymerized under the conditions of Example 1.

EXAMPLE 11

The procedure of Example 3 was repeated for polymerizing the monomer containing the radical polymerization initiator prepared by the same formula as in Example 3 except that the polymethyl methacrylate resin molded product (RMP-1) was replaced with a polycarbonate resin molded product (RMP-2).

EXAMPLE 12

The procedure of Example 11 was repeated to effect a polymerization except that a monomer containing a radical polymerization initiator prepared by the formula as shown in Example 7 was used.

EXAMPLE 13

Into a mold similar to that in Example 10 except that the polymethyl methacrylate resin molded product (RMP-1) was replaced with a polycarbonate resin molded product (RMP-2) was poured a monomer containing a radical polymerization initiator prepared according to the formula as shown in Example 11, and the mold thus charged was set in a-hot air oven to effect the same polymerization as in Example 11. As a result, a colorless transparent molded product was obtained.

EXAMPLE 14

A monomer containing a radical polymerization initiator prepared according to the formula as shown in Example 12 was poured into a mold similar to that in Example 13. The mold thus charged was set in a hot air oven to effect the same polymerization as in Example 12 to obtain a colorless transparent molded product.

EXAMPLE 15

A monomer containing a radical polymerization initiator prepared according to the formula of Example 2 was poured into a mold which was the same as in Example 1 except that the polymethyl methacrylate resin molded product (RMP-1) was replaced with a polycarbonate resin molded product having a mutual dissolution protecting layer composed of polymethyl methacrylate resin (RMP-3).

The mold thus charged was set in a hot air oven, and polymerization was effected for 3 hours by heating with raising the temperature from 60° C. to 170° C. As a result, a colorless transparent molded product was obtained.

EXAMPLE 16

A monomer containing a radical polymerization initiator prepared according to the formula of Example 4 was poured into a mold as shown in Example 15, and then the mold was set in a hot air oven to effect polymerization at 55° C. for 1 hour and then at 160° C. for 2 hours.

As a result, a colorless transparent molded product was obtained.

EXAMPLE 17

A monomer containing a radical polymerization initiator prepared according to the formula as shown in Example 6 was poured into a mold as shown in Example 15. Then the mold was set in a hot air oven, and polymerization was effected at 60° C. for 1 hour and then at 160° C. for 2 hours to obtain a colorless transparent molded product.

EXAMPLE 18

A monomer containing a radical polymerization initiator prepared according to the formula of Example 7 was poured into a mold as shown in Example 15, and then the mold was set in a hot air oven. Polymerization was effected by heating to raise the temperature from 60° C. to 180° C. for 2 hours to obtain a pale yellow transparent molded product.

EXAMPLE 19

A monomer containing a radical polymerization initiator prepared according to the formula of Example 2 was poured into a mold similar to that in Example 10 except that the polymethyl methacrylate resin molded product was replaced with a polycarbonate resin molded product having a mutual dissolution protecting layer composed of a polymethyl methacrylate resin (RMP-3).

The mold was then set in a hot air oven and polymerization was effected by heating such that the temperature was raised from 60° C. to 170° C. over 3 hours. As a result, a colorless transparent molded product was obtained.

EXAMPLE 20

A monomer containing a radical polymerization initiator prepared according to the formula of Example 4 was poured into a mold as shown in Example 19, and the mold thus charged was set in a hot air oven. Polymerization was carried out at 55° C. for one hour, further at 160° C. for two hours to give a colorless transparent molded product.

EXAMPLE 21

A monomer containing a radical polymerization initiator prepared according to the formula of Example 6 was poured into a mold as shown in Example 19. Then the mold was set in a hot air oven and polymerization was conducted at 60° C. for one hour and further at 160° C. for two hours to give a colorless transparent molded product.

EXAMPLE 22

A monomer containing a radical polymerization initiator prepared according to the formula of Example 7 was poured into a mold as shown in Example 19. The mold was then set in a hot air oven and polymerization was effected by heating to raise the temperature from 60° C. to 180° C. over two hours. As a result, a pale yellow, transparent molded product was obtained.

EXAMPLE 23

To 223 parts of 3-isopropenyl-α,α-dimethylbenzylisocyanate was added 0.56 part of dibutyltin dilaurate, and a urethane forming reaction was effected by adding gradually 144 parts of hydroxyethyl methacrylate to the mixture as obtained above while heating to 60° C. Thus a monomer of the following structural formula was obtained.

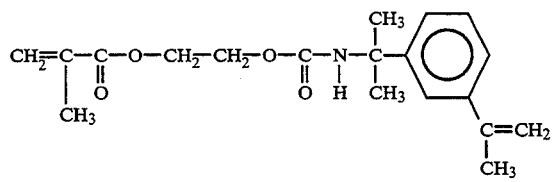

To this monomer was added 33 parts of ethylene glycol bis(3-mercaptopropionate) and then 1.2 part of t-butylperoxy-2-ethylhexanoate, and the mixture was stirred sufficiently, followed by defoaming to form a uniform solution.

The resulting solution was poured into a mold as shown in Example 1 and polymerization was carried out by elevating the temperature from 70° C. to 150° C. over two hours in a hot air oven for polymerization.

Then, the mold was cooled and the molded product was released from the mold, and there was obtained a transparent resin plate having a smooth surface.

EXAMPLE 24

To 201 part of 4-isopropenyl-α,α-dimethylbenzylisocyanate was added 0.5 part of dibutyltin dilaurate, and a urethane forming reaction was effected by adding gradually 214 parts of glycerol-1-acrylate-3-methacrylate to the mixture as obtained above while heating at 60° C., to obtain a monomer of the following structural formula.

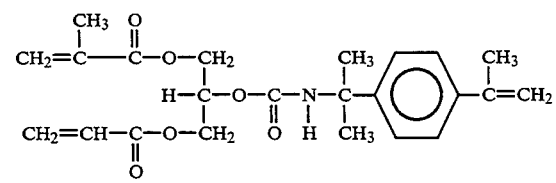

To the monomer were added 19 parts of 1,6-hexanedithiol and then further, 2.1 part of t-butylperoxy-2-ethylhexanoate and the mixture was mixed sufficiently, followed by defoaming to form a uniform solution.

This solution was poured into a mold as shown in Example 1 and polymerization was conducted under the conditions as in Example 23 to give a transparent resin plate having a smooth surface.

EXAMPLE 25

To 134 parts of 3-isopropenyl-α,α-dimethylbenzylisocyanate was added 0.33 part of dibutyltin dilaurate while heating to 60° C., 77 parts of 2-hydroxyethyl acrylate was gradually added to the mixture as obtained above to carry out a urethane forming reaction to give a monomer of the following structural formula,

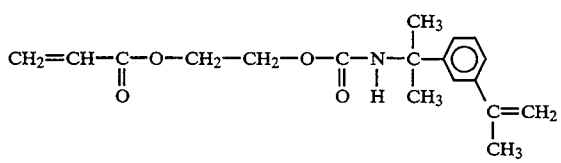

To this monomer were added 41 parts of pentaerythritoltetrakis (3-mercaptopropionate), 94 parts of tris-(acryloyloxyethyl) isocyanurate and 35 parts of styrene, and further 1.9 parts of t-butylperoxy-2-ethylhexanoate. The resulting mixture was sufficiently mixed, defoamed and a uniform solution was obtained.

The resultant solution was poured into a mold as shown in Example 1 and polymerization was carried out under the conditions similar to those in Example 23 to give a transparent resin plate.

EXAMPLE 26

To 167 parts of 3-isopropenyl-α,α-dimethylbenzylisocyanate was added 0.4 part of dibutyltin dilaurate. While heating to 60° C., 27 parts of ethylene glycol was gradually added to the mixture as obtained above to effect a urethane forming reaction and a monomer of the following structural formula was obtained.

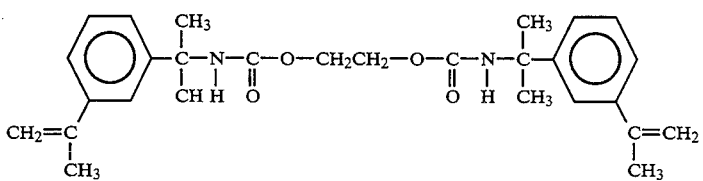

To this monomer were added 51 parts of pentaerythritoltetrakis (3-mercaptopropionate) and 146 parts of pentaerythritol tetraacrylate, and then further 1.9 parts of t-butylperoxy-2-ethyl-hexanoate. The resulting mixture was sufficiently mixed and defoamed to give a uniform solution.

This solution was poured into a mold as shown in Example 1 and polymerization was effected in a manner similar to Example 23 to give a transparent resin plate having a smooth surface.

EXAMPLE 27

To 120 parts of 4-isopropenyl-α,α-dimethylbenzylisocyanate was added 0.3 parts of dibutyltin dilaurate. While heating to 60° C., 24 parts of methanol was gradually added to the mixture as obtained above to effect a urethane forming reaction, and excess methanol was distilled off to obtain a monomer of the following structural formula.

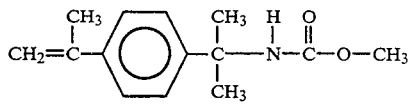

To this monomer were added 54 parts of diethylene glycol bis(2-mercaptoacetate) and 207 parts of trimethylolpropane trimethacrylate, and further 2.0 parts of t-butylperoxy-2-ethylhexanoate. The resulting mixture was sufficiently mixed and defoamed to give a uniform solution.

This solution was poured into a mold as shown in Example 1 and polymerization was effected under the conditions similar to those in Example 23 to give a transparent molded product.

EXAMPLE 28

A monomer containing a radical polymerization initiator as shown in Example 23 was poured into a mold as shown in Example 10. The mold was placed in a hot air oven and the polymerization was effected under the conditions according to Example 23 to give a transparent molded product.

EXAMPLE 29

A monomer containing a radical polymerization initiator as shown in Example 24 was poured into a mold as shown in Example 10. The mold was placed in a hot air oven and the polymerization was effected under the conditions according to Example 24 to give a transparent molded product.

EXAMPLE 30

A monomer containing a radical polymerization initiator as shown in Example 25 was poured into a mold as shown in Example 10. The mold was placed in a hot air oven and the polymerization was effected under the conditions according to Example 25 to give a transparent molded product.

EXAMPLE 31

A monomer containing a radical polymerization initiator as shown in Example 26 was poured into a mold as shown in Example 10. The mold was placed in a hot air oven and the polymerization was effected under the conditions according to Example 26 to give a transparent molded product.

EXAMPLE 32

To 85 parts of a monomer as prepared according to the formula of Example 23 and 120 parts of a monomer as prepared according to the formula of Example 26 were added 47 parts of pentaerythritol tetrakis (3-mercaptopropionate) and 136 parts of pentaerythritol tetraacrylate and then further 2.5 parts of t-butylperoxy-2-ethylhexanoate, and the mixture was mixed sufficiently followed by defoaming.

The resulting monomer was poured into a mold similar to that of Example 1 except that the polymethyl methacrylate resin molded product was replaced with a polycarbonate resin molded product (RMP-2). Then the mold was set in a hot air oven and polymerization was effected such that the temperature was raised from 70° C. to 170° C., and a transparent molded product was obtained.

EXAMPLE 33

A monomer containing a radical polymerization initiator as shown in Example 5 is poured into a mold as shown in Example 10 except that the polymethyl methacrylate resin molded product (RMP-1) is replaced with a polycarbonate resin molded product (RMP-2). The mold is placed in a hot air oven and the polymerization is effected under the conditions according to Example 1 to give a transparent molded product.

EXAMPLE 34

A monomer containing a radical polymerization initiator as shown in Example 23 was poured into a mold as shown in Example 15. The mold was placed in a hot air oven and the polymerization was effected under the conditions according to Example 23 to give a transparent molded product.

EXAMPLE 35

A monomer containing a radical polymerization initiator as shown in Example 25 was poured into a mold as shown in Example 15. The mold was placed in a hot air oven and the polymerization was effected under the conditions according to Example 25 to give a transparent molded product.

EXAMPLE 36

A monomer containing a radical polymerization initiator as shown in Example 27 was poured into a mold as shown in Example 15. The mold was placed in a hot air oven and the polymerization was effected under the conditions according to Example 27 to give a transparent molded product.

EXAMPLE 37

A monomer containing a radical polymerization initiator as shown in Example 24 was poured into a mold as shown in Example 19. The mold was placed in a hot air oven and the polymerization was effected under the conditions according to Example 24 to give a transparent molded product.

EXAMPLE 38

A monomer containing a radical polymerization initiator as shown in Example 26 was poured into a mold as shown in Example 19. The mold was placed in a hot air oven and the polymerization was effected under the conditions according to Example 26 to give a transparent molded product.

EXAMPLE 39

Four hundred and two parts of 3-isopropenyl-α,α-dimethylbenzylisocyanate, 1 part of dibutyltin dilaurate and 200 parts of methanol were mixed and reacted under reflux of methanol with stirring for 30 min.

After completion of the reaction, methanol was distilled off and the product was purified by a chromatograph method to give 396 parts of a colorless liquid monomer of the following structural formula

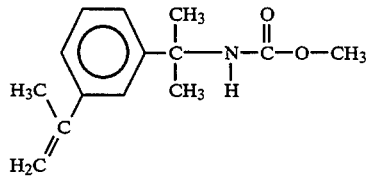

To 233.4 parts of the resulting monomer was added 141.2 parts of tris (acryloyloxyethyl) isocyanurate and mixed sufficiently. Then 3.8 parts of benzoyl peroxide was added to the resulting mixture, and mixed therewith, followed by defoaming.

The resulting solution was poured into a mold for polymerization as shown in Example 1. Then the mold was set in a hot air oven and the temperature was raised from 70° C. to 150° C. over 1.5 hours to effect polymerization. After completion of the polymerization, the mold was cooled and the molded product was released from the mold.

Thus, a transparent resin plate having a smooth surface was obtained.

EXAMPLE 40

35.7 parts of ethylene glycol, 173 parts of toluene, 231.7 parts of 3-isopropenyl-α,α-dimethylbenzylisocyanate, and 1.2 part of dibutyltin dilaurate were mixed and then stirred for one hour at a reaction temperature of 80° C. to effect the reaction.

After completion of the reaction, the resulting reaction fluid was concentrated. The concentrated solution was purified by a chromatograph method and 232 parts of a colorless transparent liquid 1,2-bis(N-(3-isopropenyl-α,α-dimethylbenzyl) carbamoyloxy)ethane was obtained.

To this product were added 176 parts of pentaerythritol tetraacrylate and the mixture was 3 parts of benzoyl peroxide, and sufficiently mixed, followed by defoaming.

The resulting uniform solution was poured into a mold as shown in Example 1. The mold was set in a hot air oven for polymerization and the temperature was raised from 70° C. to 150° C. over 1.5 hours to effect polymerization. Then the mold was cooled and the molded product was released from the mold to obtain a transparent resin plate having a smooth surface.

EXAMPLE 41

Sixty-two parts of ethylene glycol, 300 parts of toluene, 403 parts of 4-isopropenyl-α,α-dimethylbenzylisocyanate, and 2 parts of dibutyltin dilaurate were mixed and the reaction was carried out with stirring for one hour while keeping the reaction temperature at 80° C.

After completion of the reaction, the reaction solution was concentrated. The resulting concentrated solution was purified by chromatograph method to obtain 412 parts of colorless transparent liquid 1,2-bis[N,(4-isopropenyl-α,α-dimethylbenzyl)carbamoyloxy]ethane.

To 232 parts of this product were added 176 parts of pentaerythritol tetraacrylate and 3 parts of benzoyl peroxide, the mixture was mixed sufficiently and defoamed to give a uniform liquid matter. This liquid matter was poured into a mold as shown in Example 1 and polymerization was carried out under the conditions similar to those in Example 38 to give a transparent molded product.

EXAMPLE 42

The procedure of Example 40 was repeated except that 35.7 parts of ethylene glycol was replaced with 61.0 parts of diethylene glycol, and there was obtained 272.9 parts of colorless transparent liquid bis[2-(N-(3-isopropenyl-α,α-dimethylbenzyl) carbamoyloxy)ethyl]ether.

To 177.8 parts of this product were added 233.8 parts of trimethylolpropane trimethacrylate and 2.1 parts of benzoyl peroxide, the mixture was mixed sufficiently, and defoamed to give a uniform liquid matter.

This liquid matter was poured into a mold as shown in Example 10, and then the mold was set in a hot air oven for polymerization and the temperature was raised from 70° C. to 150° C. over 1.5 hours to effect polymerization, and then cooled, followed by releasing the product from the mold. As a result, a transparent resin plate having a smooth surface was obtained.

EXAMPLE 43

The procedure of Example 40 was repeated except that 35.7 parts of ethylene glycol was replaced with 112.9 parts of tricyclo [5,2,1,0$^{2,6}$] decane-4,8-dimethanol, and there was obtained 321.9 parts of colorless transparent liquid 4,8-bis[N-(3-isopropenyl-α,α-dimethylbenzyl) carbamoyloxymethyl]tricyclo [5,2,1,0$^{2,6}$] decane.

To 239.2 parts of this product were added 160 parts of ethyl acrylate and 2.4 parts of benzoyl peroxide, the mixture was mixed sufficiently, and defoamed to give a uniform liquid matter. This liquid matter was poured into a mold as shown in Example 11 and set in a hot air oven for polymerization. The temperature was raised from 70° C. to 150° C. over 1.5 hours to carry out the polymerization and then cooled. Then the product was released from the mold.

As a result, a transparent resin plate having a smooth surface was obtained.

EXAMPLE 44

Forty-two point seven parts of glycerol, 210 parts of toluene, 282.1 parts of 3-isopropenyl-α,α-dimethylbenzylisocyanate, and 1.4 parts of dibutyltin dilaurate were mixed and stirred for one hour to effect the reaction while the reaction temperature was kept at 90° C.

After completion of the reaction, the reaction solution was concentrated. The concentrated solution was purified by chromatograph method to give 296.8 parts of colorless transparent liquid 1,2,3-tris[N-(3-isopropenyl-α,α-dimethylbenzyl)carbamoyloxy]propane.

To 221.9 parts of this product were added 184.8 parts of pentaerythritol tetraacrylate and 2.1 parts of benzoyl peroxide, the mixture was mixed sufficiently and defoamed to give a uniform liquid matter.

The liquid matter was poured into a mold as shown in Example 10. The mold was set in a hot air oven and the temperature was raised from 70° C. to 150° C. over 1.5 hours to effect polymerization. Then, the product was cooled and released from the mold. As a result, a transparent resin plate having a smooth surface.

EXAMPLE 45

A monomer containing a radical polymerization initiator prepared according to the formula of Example 44 was poured into a mold as shown in Example 13, and polymerization was effected under the conditions of Example 44 to give a transparent molded product.

EXAMPLE 46

A monomer containing a radical polymerization initiator prepared according to the formula of Example 39 was poured into a mold as shown in Example 10, and polymerization was effected under the conditions of Example 39 to give a transparent molded product.

EXAMPLE 47

A monomer containing a radical polymerization initiator as shown in Example 40 was poured into a mold as shown in Example 1, and polymerized under the conditions according to Example 40 to give a transparent molded product.

EXAMPLE 48

A monomer containing a radical polymerization initiator as shown in Example 43 was poured into a mold as shown in Example 19, and polymerized under the conditions according to Example 43 to give a transparent molded product.

EXAMPLE 49

A monomer containing a radical polymerization initiator as shown in Example 43 was poured into a mold as shown in Example 13, and polymerized under the conditions according to Example 43 to give a transparent molded product.

EXAMPLE 50

A monomer containing a radical polymerization initiator as shown in Example 43 was poured into a mold as shown in Example 15, and polymerized under the conditions according to Example 43 to give a transparent molded product.

EXAMPLE 51

386.6 Parts of 4-isopropenylphenol, 2300 parts of benzene, and 378.9 parts of triethylamine were mixed, and 300 parts of acrylic acid chloride was dropwise added to the resulting mixture while cooling with ice, followed by stirring for 4 hours at room temperature.

After completion of the reaction, the product was purified by column chromatography to give 450 parts of a colorless liquid ester compound having the following structural formula,

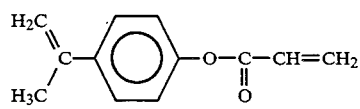

Four hundred parts of this ester compound was mixed with 4.1 parts of benzoyl peroxide, and then defoamed.

The resulting liquid matter was poured into a mold as shown in Example 1. Then the mold was set in a hot air oven for polymerization and the temperature was raised from 60° C. to 160° C. over 2 hours to effect polymerization. Then the mold was cooled and the product was released from the mold to obtain a pale yellow transparent resin plate having a smooth surface.

EXAMPLE 52

375 Parts of 3-isopropenylphenol, 2500 parts of benzene, and 375 parts of triethylamine were mixed, and 350 parts of methacrylic acid chloride was dropwise added to the resulting mixture while cooling with ice, thereto over 60 min. Then the mixture was reacted by stirring at room temperature over 4 hours. The mixture was purified by column chromatography to give 400 parts of a colorless liquid ester compound having the following formula.

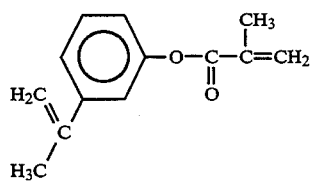

To 400 parts of this ester compound was added 2.5 parts of benzoyl peroxide, mixed and defoamed. The resulting liquid matter was poured into a mold as shown in Example 1 and placed in a hot air oven for polymerization to raise the temperature from 60° C. to 170° C. over 2 hours to effect polymerization. Then, the product was released from the mold to give a transparent resin plate having a smooth surface.

EXAMPLE 53

402.0 Parts of 4-isopropenylphenol was dissolved in 804.0 parts of a 20% aqueous solution of sodium hydroxide and refluxed. To this mixture was dropwise added 448.4 parts of 2-bromoethanol and, after completion of the addition, the resulting mixture was heated under reflux with stirring for 2 hours to effect the reaction.

After completion of the reaction, the reaction fluid was allowed to stand resulting in separation into two layers and the oily layer was separated and washed with hot water. After dehydrating, the oily layer was filtered and subjected to a distillation under reduced pressure to give 380.0 parts of a colorless transparent liquid ether product.

This ether product (380 parts) was mixed with 1900 parts of benzene and 275.7 parts of triethylamine, and while cooling with ice, 218.6 parts of acrylic acid chloride was dropwise added to the mixture over 60 min. followed by stirring at room temperature for 4 hours.

After completion of the reaction, the product was purified by column chromatography to obtain 387.6 parts of a colorless liquid ester compound having the following structural formula.

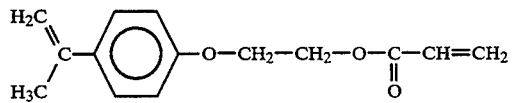

Benzoyl peroxide (3 parts) was mixed with 380.0 parts of the resulting ester compound,.defoamed and poured into a mold as shown in Example 1.

The mold was set in a hot air oven for polymerization, and the temperature was raised from 60° C. to 170° C. over 2 hours to effect polymerization. Then the mold was cooled and the product was released from the mold to give a transparent resin plate having a smooth surface.

EXAMPLE 54

182.0 Parts of propylene oxide, 348.4 parts of 3-isopropenylphenol, 5.2 parts of sodium hydroxide and 650 parts of ethanol were mixed, heated under reflux with stirring to carry out a ring opening reaction.

After completion of the reaction, the reaction fluid was concentrated and purified by extraction and recrystallization to give 421.2 parts of a ring-opened product by the reaction of propylene oxide with 3-isopropenylphenol.

This ring-opened product (378.7 parts) was mixed with 1800 parts of benzene and 258.8 parts of triethylamine, and while cooling with ice, 204.5 parts of acrylic acid chloride was dropwise added to the resulting mixture over 60 min. followed by stirring at room temperature for 4 hours.

After completion of the reaction, the product was purified by column chromatography to give 376.2 parts of a colorless liquid ester compound having the following structural formula.

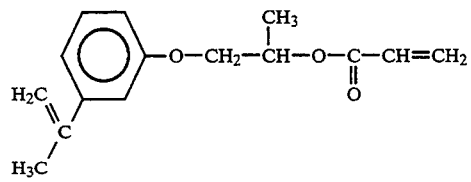

370.0 parts of this ester compound was mixed with 3.8 parts of benzoyl peroxide and defoamed. The resulting liquid matter was poured into a mold as shown in Example 11 and the temperature was raised from 60° C. to 160° C. over 2 hours to effect polymerization in a hot air oven for polymerization.

Then the mold was cooled and the product was released from the mold to obtain a transparent resin plate having a smooth surface.

EXAMPLE 55

To 210.0 parts of 3-isopropenylphenol were added 242.9 parts of 2-isocyanatoethyl methacrylate, 140 parts of toluene, and 2.1 parts of dibutyltin dilaurate and heated to 50° C. with stirring to cause the reaction.

After completion of the reaction, the reaction solution was concentrated. The concentrated solution was purified by chromatograph method to give 394.1 parts of a colorless liquid urethane compound of the following structural formula.

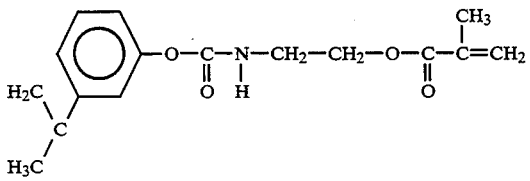

385.0 parts of this urethane compound was mixed with 4.2 parts of benzoyl peroxide and defoamed, and the resulting liquid matter was poured into a mold as shown in Example 11. Then the temperature was raised from 60° C. to 170° C. over 2 hours to effect polymerization and the mold was cooled, and the product was released from the mold to give a pale yellow transparent resin plate having a smooth surface.

EXAMPLE 56

242.4 Parts of the ester compound of Example 53 was mixed with 135.6 part of trimethylolpropane trimethacrylate and 3.6 parts of benzoyl peroxide and defoamed. The resulting liquid matter was poured into a mold of Example 11 and the temperature was raised from 60° C. to 170° C. over 2 hours in a hot air oven to effect polymerization. Then the mold was cooled and the product was released from the mold to give a transparent resin plate having a smooth surface.

EXAMPLE 57

A monomer containing a radical polymerization initiator as shown in Example 51 was poured into a mold as shown in Example 10, and polymerized under the conditions according to Example 51 to give a transparent molded product.

EXAMPLE 58

A monomer containing a radical polymerization initiator as shown in Example 52 was poured into a mold as shown in Example 10, and polymerized under the conditions according to Example 52 to give a transparent molded product.

EXAMPLE 59

A monomer containing a radical polymerization initiator as shown in Example 53 was poured into a mold as shown in Example 10, and polymerized under the conditions according to Example 53 to give a transparent molded product.

EXAMPLE 60

A monomer containing a radical polymerization initiator as shown in Example 54 was poured into a mold as shown in Example 13, and polymerized under the conditions according to Example 54 to give a transparent molded product.

EXAMPLE 61

A monomer containing a radical polymerization initiator as shown in Example 55 was poured into a mold as shown in Example 13, and polymerized under the conditions according to Example 55 to give a transparent molded product.

EXAMPLE 62

A monomer containing a radical polymerization initiator as shown in Example 56 was poured into a mold as shown in Example 13, and polymerized under the conditions according to Example 56 to give a transparent molded product.

EXAMPLE 63

A monomer containing a radical polymerization initiator as shown in Example 51 was poured into a mold as shown in Example 15, and polymerized under the conditions according to Example 51 to give a transparent molded product.

EXAMPLE 64

A monomer containing a radical polymerization initiator as shown in Example 52 was poured into a mold as shown in Example 15, and polymerized under the conditions according to Example 52 to give a transparent molded product.

EXAMPLE 65

A monomer containing a radical polymerization initiator as shown in Example 53 was poured into a mold as shown in Example 15, and polymerized under the conditions according to Example 53 to give a transparent molded product.

EXAMPLE 66

A monomer containing a radical polymerization initiator as shown in Example 51 was poured into a mold as shown in Example 19, and polymerized under the conditions according to Example 51 to give a transparent molded product.

EXAMPLE 67

A monomer containing a radical polymerization initiator as shown in Example 52 was poured into a mold as shown in Example 19, and polymerized under the conditions according to Example 52 to give a transparent molded product.

EXAMPLE 68

A monomer containing a radical polymerization initiator as shown in Example 53 was poured into a mold as shown in Example 19, and polymerized under the conditions according to Example 53 to give a transparent molded product.

EXAMPLE 69

150.2 Parts of 3-isopropenylphenol, 124.4 parts of isophorone diisocyanate, 1.1 part of dibutyltin dilaurate, and 112 parts of toluene were mixed and reacted with stirring for 2 hours while keeping the reaction temperature at 70° C.

After completion of the reaction, the reaction solution was concentrated. The concentrated solution was purified by chromatograph method to give 250.0 parts of a colorless transparent liquid monomer having the following structural formula.

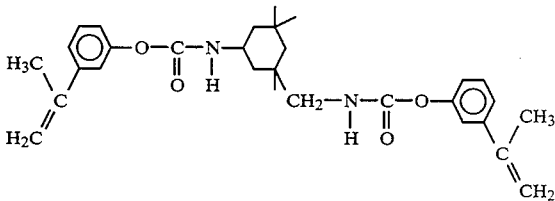

245.4 parts of this monomer was sufficiently mixed with 176.2 parts of pentaerythritol tetraacrylate and then 4.8 parts of benzoyl peroxide was mixed with the resulting mixture, followed by defoaming.

The resulting liquid matter was poured into a mold as shown in Example 11, and the temperature was raised from 70° C. to 170° C. over 1.5 hours to effect polymerization in a hot air oven for polymerization. Then the mold was cooled and the product was released from the mold to give a transparent resin plate having a smooth surface.

EXAMPLE 70

240.7 Parts of 3-isopropenylphenol, 4300 parts of water and 86.2 parts of sodium hydroxide were mixed to form a solution. To the solution was dropwise added 3500 parts of a solution of adipic acid chloride (163.5 parts) in methylene chloride with vigorous stirring. After completion of the addition, the reaction was carried Out at room temperature for 3 hours and under reflux of methylene chloride for 2 hours. The methylene chloride layer was washed with a 5% aqueous solution of sodium hydroxide, dried and methylene chloride was distilled off. The resulting product was recrystallized with ethanol to give a monomer of the following structural formula in a white solid form (251.5 parts).

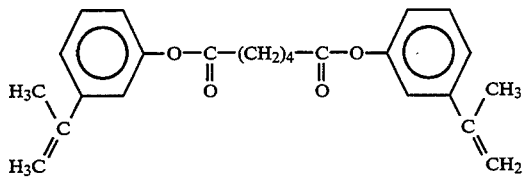

245.7 Parts of this monomer and 131.6 parts of divinylbenzene were sufficiently mixed, and 3.5 parts of benzoyl peroxide was added, mixed and the resulting mixture was defoamed.

The resulting liquid matter was poured into a mold as shown in Example 11 and polymerized under the conditions of Example 69 to give a transparent molded product.

EXAMPLE 71

210.1 Parts of 4-isopropenylphenol was dissolved in a liquid mixture of 470 parts of ethanol, 78 parts of water, and 62.7 parts of sodium hydroxide, heated and refluxed.

266.6 Parts of iodoethane was dropwise added to the above-mentioned liquid matter to cause a reaction under reflux for 3 hours.

After completion of the reaction, the solvent was distilled off and the precipitated matter was filtered. The filtrate was distilled under reduced pressure to give 191.3 parts of a colorless transparent liquid monomer having the following structure.

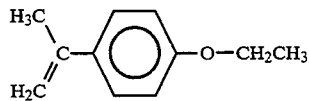

To this product (186.5 parts) was added 202.6 parts of pentaerythritol tetraacrylate, the mixture was mixed sufficiently and further 2.1 parts of benzoyl peroxide was added, mixed and defoamed.

The resulting liquid matter was poured into a mold as shown in Example 1, and polymerization was effected under the conditions of Example 69 to give a transparent molded product.

EXAMPLE 72

A monomer containing a radical polymerization initiator as shown in Example 69 was poured into a mold as shown in Example 13, and polymerized under the conditions according to Example 69 to give a transparent molded product.

EXAMPLE 73

A monomer containing a radical polymerization initiator as shown in Example 70 was poured into a mold as shown in Example 13, and polymerized under the conditions according to Example 69 to give a transparent molded product.

EXAMPLE 74

A monomer containing a radical polymerization initiator as shown in Example 71 was poured into a mold as shown in Example 10, and polymerized under the conditions according to Example 69 to give a transparent molded product.

EXAMPLE 75

A monomer containing a radical polymerization initiator as shown in Example 71 was poured into a mold as shown in Example 15, and polymerized under the conditions according to Example 69 to give a transparent molded product.

EXAMPLE 76

A monomer containing a radical polymerization initiator as shown in Example 71 was poured into a mold as shown in Example 19, and polymerized under the conditions according to Example 69 to give a transparent molded product.

EXAMPLE 77

123.3 parts of 4-isopropenylphenol, 460 parts of toluene, 184.9 parts of 3-isopropenyl-α,α-dimethylbenzylisocyanate, and 2.8 parts of dibutyltin dilaurate were mixed and reacted with stirring for 3 hours while keeping the temperature of the reaction fluid at 100° C.

After completion of the reaction, the reaction fluid was concentrated. The concentrated reaction fluid was purified by chromatograph method to give 192.3 parts of white solid [N-(3-isopropenyl-α,α-dimethylbenzyl)] (4isopropenylphenyl) carbamate.

To 187.5 Parts of this product were added 178.0 parts of neopentylglycol diacrylate and 1.0 part of benzoyl peroxide, and the mixture was sufficiently mixed and defoamed to give a uniform liquid matter.

The resulting liquid matter was poured into a mold as shown in Example 11 and the temperature was raised from 70° C. to 170° C. over 1.5 hours in a hot air oven for polymerization to effect polymerization. Then, the mold was cooled and the product was released from the mold to give a transparent resin plate having a smooth surface.

EXAMPLE 78

The procedure of Example 77 was repeated except that 105.6 parts of 4-isopropenylphenol was replaced with 105.6 parts of 3-isopropenylphenol, and there was obtained 190.0 parts of colorless liquid [N-(3-isopropenyl-α,α(-dimethylbenzyl)](3-isopropenylphenyl) carbamate.

To 187.5 parts of resulting liquid matter were added 197.0 parts of pentaerythritol tetraacrylate and 1.25 part of benzoyl peroxide, the mixutre was mixed sufficiently, and defoamed to give a uniform liquid matter. This liquid matter was poured into a mold as shown in Example 1 and the temperature was raised in a hot air oven for polymerization from 70° C. to 170° C. over 1.5 hours. Then the mold was cooled and the product was released from the mold to give a transparent resin plate having a smooth surface.

EXAMPLE 79

98.1 Parts of 2-(3-isopropenylphenoxy) ethanol, 165 parts of toluene, 110.7 parts of 3-isopropenyl-α,α-dimethylbenzylisocyanate and 1.1 part of dibutyltin dilaurate were mixed and stirred for 2 hours to effect a reaction while keeping the temperature of the reaction fluid at 80° C.

After completion of the reaction, the reaction fluid was concentrated. The concentrated reaction fluid was purified by chromatograph method to give 200.0 parts of colorless transparent liquid N-(3-isopropenyl-α,α-dimethylbenzyl) [2-(3-isopropenylphenoxy) ethyl]carbamate.

To this product (196.2 parts) were added 182.0 parts of pentaerythritol tetraacrylate and 1.2 part of benzoyl peroxide, and the mixture sufficiently mixed and deformed to give a uniform liquid matter.

The resulting liquid matter was poured into a mold as shown in Example 11 and polymerization was effected under the conditions of Example 77 to give a transparent molded product.

EXAMPLE 80

To 221.6 parts of N-(3-isopropenyl-α,α-dimethylbenzyl) [2-(3-isopropenylphenoxy) ethyl] carbamate as obtained following the procedure of Example 79 were added 151.9 parts of divinylbenzene and 1.1 part of benzoyl peroxide, and the mixture was mixed sufficiently and defoamed to give a uniform liquid matter. The resulting liquid matter was poured into a mold as shown in Example 11 and polymerized under the conditions of Example 77 to obtain a colorless transparent molded product.

EXAMPLE 81

117.4 Parts of 2-(3-isopropenylphenoxy)-1-methylethanol, 183.5 parts of toluene, 122.9 parts of 3-isopropenyl-α,α-dimethylbenzylisocyanate and 0.66 parts dibutyltin dilaurate were mixed and reacted with stirring for 2 hours while keeping the temperature of the reaction fluid at 80° C. After completion of the reaction, the reaction fluid was concentrated and purified by chromatograph method to give 222.0 parts of colorless transparent liquid N-(3-isopropenyl-α,α-dimethylbenzene) [2-(3-isopropenylphenoxy)-1-methylethyl]carbamate.

To 216.5 parts of this product were added 163.3 parts of trimethylolpropane trimethacrylate and 0.99 part of benzoyl peroxide, and the mixture was mixed sufficiently and defoamed to give a uniform liquid matter, which was poured into a mold as shown in Example 11 and polymerization was effected under the conditions of Example 77 to obtain a colorless transparent molded product.

EXAMPLE 82

A monomer containing a radical polymerization initiator as shown in Example 77 was poured into a mold as shown in Example 10, and polymerized under the conditions according to Example 77 to give a transparent molded product.

EXAMPLE 83

A monomer containing a radical polymerization initiator as shown in Example 78 was poured into a mold as shown in Example 10, and polymerized under the conditions according to Example 77 to give a transparent molded product.

EXAMPLE 84

A monomer containing a radical polymerization initiator as shown in Example 79 was poured into a mold as shown in Example 13, and polymerized under the conditions according to Example 77 to give a transparent molded product.

EXAMPLE 85

A monomer containing a radical polymerization initiator as shown in Example 80 was poured into a mold as shown in Example 13, and polymerized under the conditions according to Example 77 to give a transparent molded product.

EXAMPLE 86

A monomer containing a radical polymerization initiator as shown in Example 81 was poured into a mold as shown in Example 13, and polymerized under the conditions according to Example 77 to give a transparent molded product.

EXAMPLE 87

A monomer containing a radical polymerization initiator as shown in Example 79 was poured into a mold as shown in Example 15, and polymerized under the conditions according to Example 77 to give a transparent molded product.

EXAMPLE 88

A monomer containing a radical polymerization initiator as shown in Example 80 was poured into a mold as shown in Example 15, and polymerized under the conditions according to Example 77 to give a transparent molded product.

EXAMPLE 89

A monomer containing a radical polymerization initiator as shown in Example 81 was poured into a mold as shown in Example 15, and polymerized under the conditions according to Example 77 to give a transparent molded product.

EXAMPLE 90

A monomer containing a radical polymerization initiator as shown in Example 79 was poured into a mold as shown in Example 19, and polymerized under the conditions according to Example 77 to give a transparent molded product.

EXAMPLE 91

A monomer containing a radical polymerization initiator as shown in Example 80 was poured into a mold as shown in Example 19, and polymerized under the conditions according to Example 77 to give a transparent molded product.

EXAMPLE 92

To 241.4 parts of 3-isopropenyl-α,α-dimethylbenzylisocyanate was added 0.24 parts of dibutyltin dilaurate, and 209.0 parts of diethylene glycol monomethacrylate was gradually added to the mixture while keeping the temperature at 40° C. by heating, so as to carry out a urethane forming reaction.

After completion of the reaction, the product was purified by column chromatography to give 391.9 parts of a colorless liquid monomer of the following structural formula.

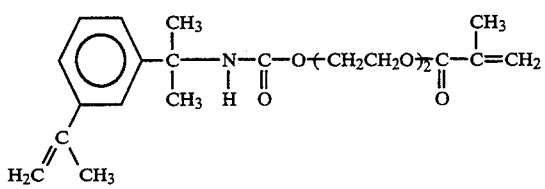

To 370 parts of this product was added 0.4 part of t-butylperoxy-2-ethylhexanoate, and then the monomer was polymerized following the procedure of Example 1.

EXAMPLE 93

A monomer containing a radical polymerization initiator prepared according to the formula of Example 7 was poured into a mold for polymerization as shown in Example 1 except that the polymethyl methacrylate molded product (RMP-1) was replaced with a polycarbonate resin molded product having a acrylic photo-curable resin (PHOTOLEC RW101, trade name, manufactured by Sekisui Fine Chemical K.K.) as a mutual dissolution protecting layer (the acrylic photo-curable resin was coated on the surface of the polycarbonate molded product by a dipping method and the coating layer thus formed was cured by UV), The mold thus charged with the monomer was set in a hot air oven and polymerization was effected under the same conditions as in Example 7.

EXAMPLE 94

To 400 parts of a monomer prepared according to the formula as shown in Example 7 was added 55.4 parts of pentaerythritoltetrakis (3-mercaptopropionate). To the resulting mixture was added 0.46 parts of t-butylperoxy-2-ethylhexanoate and the mixtures was mixed sufficiently, followed by defoaming.

The resulting monomer was poured into a mold as shown in Example 93 and then, polymerization was carried out under the conditions of Example 7.

EXAMPLE 95

To 150.0 parts of 3-isopropenyl-α,α-dimethylbenzylisocyanate and 15.3 parts of ethylene glycol was added 0.08 part of dibutyltin dilaurate as a reaction catalyst and a urethane forming reaction was effected for 1 hour while keeping the reaction temperature at 40° C.

To the reaction fluid was gradually added 92.3 parts of diethylene glycol monomethacrylate and a urethane forming reaction was carried out for 2 hours while keeping the reaction temperature at 50° C.

Further, 131.3 parts of pentaerythritol tetraacrylate was added to the resulting reaction fluid and mixed sufficiently. To the resulting acrylate mixture of the urethane compound was added 0.39 parts of t-butylperoxy-2-ethylhexanoate as a radical polymerization initiator, and the mixture was mixed sufficiently, followed by defoaming.

The resulting monomer was poured into a mold as shown in Example 93 and then, polymerization was effected and the conditions as in Example 7.

EXAMPLE 96

A monomer containing a radical polymerization initiator prepared according to the formula as shown in Example 95 was poured into a mold as shown in Example 1 except that the polymethyl methacrylate resin molded product (RMP-1) was replaced with a polycarbonate resin molded product having a polymethyl methacrylate resin as a mutual dissolution protecting layer (RMP-3), and then the mold was set in a hot air oven to effect polymerization for 3 hours by raising the temperature from 60° C. to 170° C.

EXAMPLE 97

A monomer containing a radical polymerization initiator prepared according to the formula as shown in Example 94 was poured into a mold as shown in Example 1 except that the polymethyl methacrylate resin molded product (RMP-1) was replaced with a polycarbonate resin molded product having a polymethyl methacrylate resin as a mutual dissolution protecting layer (RMP-3), and then the mold was set in a hot air oven to effect polymerization for 3 hours by raising the temperature from 60° C. to 70° C.

The laminated transparent plastic materials, namely the molded products obtained in Example 1–97 were evaluated for various characteristics. The results are shown in Table 1 (infra).

EXAMPLE 98

A monomer containing a radical polymerization initiator as shown in Example 32 is poured into a mold as shown in Example 1 except that the polymethyl methacrylate resin molded product (RMP-1) is replaced with a polyvinyl chloride resin molded product (RMP-4). The mold is placed in a hot air oven and the polymerization is effected under the conditions according to Example 32 to give a satisfactory result.

EXAMPLE 99

A monomer containing a radical polymerization initiator as shown in Example 32 is poured into a mold as shown in Example 10 except that the polymethyl methacrylate resin molded product (RMP-1) is replaced with a polyvinyl chloride resin molded product (RMP-4). The mold is placed in a hot air oven and the polymerization is effected under the conditions according to Example 32, to give a satisfactory result.

EXAMPLE 100

The procedure of Example 40 is repeated except that the polymethyl methacrylate resin molded product (RMP-1) is replaced with a polyvinyl chloride resin molded product (RMP-4), and a satisfactory result is obtained.

EXAMPLE 101

A monomer containing a radical polymerization initiator as shown in Example 53 is poured into a mold as shown in Example 10 except that the polymethyl methacrylate resin molded product (RMP-1) is replaced with a polyvinyl chloride resin molded product (RMP-4). The mold is placed in a hot air oven and the polymerization is effected under the conditions according to Example 53 to give a satisfactory result.

EXAMPLE 102

The polymerization of Example 5 is repeated except that a monomer containing a radical polymerization initiator prepared according to the formula of Example 5 is used and the polymethyl methacrylate resin molded product (RMP-1) is replaced with an epoxy resin molded product (RMP-5), and a satisfactory result is obtained.

EXAMPLE 103

A monomer containing a radical polymerization initiator as shown in Example 51 is poured into a mold as shown in Example 102, and polymerized under the conditions according to Example 51 to give a satisfactory result.

EXAMPLE 104

A monomer containing a radical polymerization initiator as shown in Example 52 is poured into a mold as shown in Example 102, and polymerized under the conditions according to Example 52 to give a satisfactory result.

EXAMPLE 105

A monomer containing a radical polymerization initiator as shown in Example 69 is poured into a mold as shown in Example 102, and polymerized under the conditions, according to Example 69 to give a satisfactory result.

EXAMPLE 106

A monomer containing a radical polymerization initiator as shown in Example 70 is poured into a mold as shown in Example 102, and polymerized under the conditions according to Example 69 to give a satisfactory result.

EXAMPLE 107

A monomer containing a radical polymerization initiator as shown in Example 77 is poured into a mold as shown in Example 102, and polymerized under the conditions according to Example 77 to give a satisfactory result.

EXAMPLE 108

The procedure of Example 53 is repeated except that the polymethyl methacrylate resin molded product (RMP-1) is replaced with a polyester resin molded product (RMP-6), and a satisfactory result is obtained.

EXAMPLE 109

The procedure of Example 39 is repeated except that the polymethyl methacrylate resin molded product (RMP-1) is replaced with a diallyl phthalate resin molded product (RMP-7), and a satisfactory result is obtained.

EXAMPLE 110

The procedure of Example 39 is repeated except that the polymethyl methacrylate resin molded product (RMP-1) is replaced with a polyurethane resin molded product (RMP-8), and a satisfactory result is obtained.

EXAMPLE 111

The procedure of Example 51 is repeated except that the polymethyl methacrylate resin molded product (RMP-1) is replaced with a polyacetal resin molded product (RMP-9), and a satisfactory result is obtained.

EXAMPLE 112

A monomer containing a radical polymerization initiator prepared according to the formula of Example 3 is poured into a mold of Example 1 except that the polymethyl methacrylate resin molded product (RMP-1) is replaced with an unsaturated polyester resin molded product (RMP-10).

The mold thus charged with the monomer is set in a hot air oven and polymerization is effected by raising the temperature from 60° C. to 170° C. over 3 hours, and a satisfactory result is obtained.

EXAMPLE 113

A monomer containing a radical polymerization initiator as shown in Example 32 is poured into a mold as shown in Example 1 except that the polymethyl methacrylate resin molded product (RMP-1) is replaced with an unsaturated polyester resin molded product (RMP-10). The mold is placed in a hot air oven and polymerization is effected under the conditions according to Example 32 and a satisfactory result is obtained.

EXAMPLE 114

A monomer containing a radical polymerization initiator as shown in Example 55 is poured into a mold as shown in Example 10 except that the polymethyl methacrylate resin molded product (RMP-1) is replaced with an unsaturated polyester resin molded product (RMP-10). The mold is placed in a hot air oven and the polymerization is effected under the conditions according to Example 55. A satisfactory result is obtained.

EXAMPLE 115

A monomer containing a radical polymerization initiator as shown in Example 69 is poured into a mold as shown in Example 112, and polymerized under the conditions according to Example 69. A satisfactory result is obtained.

EXAMPLE 116

A monomer containing a radical polymerization initiator as shown in Example 69 is poured into a mold as shown in Example 112, and polymerized under the conditions according to Example 69. A satisfactory result is obtained.

EXAMPLE 117

A monomer containing a radical polymerization initiator as shown in Example 70 is poured into a mold as shown in Example 112, and polymerized under the conditions according to Example 69. A satisfactory result is obtained.

EXAMPLE 118

A monomer containing a radical polymerization initiator as shown in Example 77 is poured into a mold as shown in Example 114, and polymerized under the conditions according to Example 77. A satisfactory result is obtained.

EXAMPLE 119

A monomer containing a radical polymerization initiator as shown in Example 78 is poured into a mold as shown in Example 114, and polymerized under the conditions according to Example 77. A satisfactory result is obtained.

EXAMPLE 120

A monomer containing a radical polymerization initiator prepared according to the formula as shown in Example 7 is poured into a space between two planar glass plates (each being 5 mm thick, 400 mm in side) with a gasket of 0.5 mm thick and 10 mm wide of a mold for polymerization.

The mold is set in a hot air oven and polymerization is effected for 3 hours by heating from 60° C. to 170° C. to produce a high hardness transparent resin molded product of 1 mm thick and about 380 mm in side length.

The same polymerization procedure is effected again to produce another molded product and as a result, two molded products are obtained.

The resulting two sheets of the high hardness transparent resin molded product are adhered to both surfaces of a polymethyl methacrylate resin molded product (RMP-1) of 3 mm thick and 380 mm in side length by using an epoxy resin adhesive applied to the both surfaces.

The resulting integrated product is set in an autoclave to defoam at 70° C. under reduced pressure and then pressurize to 5 kgf/cm followed by heating at the same temperature for 2 hours. Then, the product is cooled while the pressure is returned to ordinary pressure, and thereby a laminated transparent plastic material is obtained.

EXAMPLE 121

By using a mold for polymerization as shown in Example 120, polymerization of a monomer according to Example 3 is effected to obtain a high hardness transparent resin molded product.

Then, the laminating procedure of Example 120 is repeated except that the polymethyl methacrylate resin molded product is replaced with a polycarbonate resin molded product (RMP-2), and a laminated transparent plastic material is obtained.

EXAMPLE 122

Polymerization of a monomer according to Example 25 is effected by using a mold for polymerization according to Example 120 to obtain a high hardness transparent resin molded product. Then the laminating according to Example 120 is effected to obtain a laminated transparent plastic material.

EXAMPLE 123

Polymerization of a monomer according to Example 39 is effected by using a mold for polymerization according to Example 120 to obtain a high hardness transparent resin molded product. Then the laminating according to Example 121 is effected to obtain a laminated transparent plastic material.

EXAMPLE 124

By using the mold for polymerization as shown in Example 120, polymerization of monomer according to Example 53 is carried out to obtain a high hardness transparent resin molded product. Then the laminating as shown in Example 120 is effected except that the epoxy resin adhesive is replaced with an unsaturated polyester resin adhesive and the operation conditions in the autoclave, i.e. 70° C. and 5 kgf/cm$^2$, are replaced with 90° C. and 8 kgf/cm, respectively, and a laminated transparent plastic material is obtained.

EXAMPLE 125

By using the mold for polymerization according to Example 120, there is effected polymerization of a monomer according to Example 56 to obtain a high hardness transparent resin molded product.

Then, the laminating procedure of Example 124 is repeated except that the polymethyl methacrylate resin molded product is replaced with a polycarbonate resin molded product (RMP-2). As a result, a laminated transparent plastic material is obtained.

EXAMPLE 126

By using the mold for polymerization according to Example 120, there is effected polymerization of a monomer according to Example 77 to obtain a high hardness transparent resin molded product. Then, the laminating procedure of Example 125 is repeated to obtain a laminated transparent plastic material.

EXAMPLE 127

By using the mold for polymerization as shown in Example 120, polymerization of a monomer according to Example 71 is effected to obtain a high hardness transparent resin molded product.

The laminating procedure of Example 124 is repeated except that the polymethyl methacrylate resin molded product is replaced with a polyvinyl chloride resin molded product (RMP-4) and the unsaturated polyester resin adhesive is replaced with a polyvinyl chloride resin adhesive. As a result, a laminated transparent plastic material is obtained.

EXAMPLE 128

Polymerization of a monomer as shown in Example 80 is effected by using a mold for polymerization according to Example 120 to obtain a high hardness transparent resin molded product. The laminating procedure of Example 127 is effected to obtain a laminated transparent plastic material.

EXAMPLE 129

By using a mold as shown in Example 120, polymerization of a monomer of Example 70 is effected to obtain a high hardness transparent resin molded product.

Then the laminating procedure of Example 124 is repeated except that the polymethyl methacrylate resin molded product is replaced with a polyurethane resin molded product (RMP-8), and a laminated transparent plastic material is obtained.

EXAMPLE 130

By using a mold for polymerization as shown in Example 120, polymerization of a monomer according to Example 32 is effected to obtain a high hardness transparent resin molded product. The laminating procedure of Example 120 is repeated except that the polymethyl methacrylate resin molded product is replaced with an unsaturated polyester resin molded product (RMP-10), and a laminated transparent plastic material is obtained.

EXAMPLE 131

By using a mold for polymerization as shown in Example 120, polymerization of a monomer according to Example 44 is carried out to obtain a high hardness transparent resin molded product. The laminating procedure of Example 130 is carried out to obtain a laminated transparent plastic material.

TABLE 1

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 91 | 91 | 91 | 91 | 91 | 91 | 91 | 91 | 92 | 91 | 91 |
| Pencil hardness | 7H | 7H | 9H | 7H | 7H | 9H | 9H | 6H | 7H | 9H | 9H |
| Vickers hardness (kgf/mm$^2$) | 32.1 | 32.2 | 36.6 | 32.4 | 32.0 | 35.8 | 35.8 | 28.9 | 31.8 | 35.7 | 35.4 |
| Rockwell M scale hardness | 121 | 122 | 127 | 121 | 122 | 124 | 126 | 118 | 120 | 125 | 127 |
| Impact resistance (kgf cm/cm$^2$) | 10.7 | 11.2 | 9.6 | 11.4 | 10.9 | 9.4 | 10.2 | 10.4 | 11.1 | — | 7.6 with notch |
| Bending modulus of elasticity (kgf/mm$^2$) | 400 | 405 | 410 | 412 | 394 | 421 | 427 | 390 | 383 | — | 352 |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 91 | 89 | 89 | 89 | 89 | 88 | 88 | 89 | 89 | 88 | 89 |
| Pencil hardness | 9H | 9H | 9H | 7H | 7H | 9H | 9H | 7H | 7H | 9H | 9H |
| Vickers hardness (kgf/mm$^2$) | 36.0 | 36.9 | 35.6 | 32.3 | 32.8 | 36.1 | 36.4 | 31.5 | 32.4 | 35.9 | 36.1 |
| Rockwell M scale hardness | 128 | 126 | 124 | 120 | 120 | 124 | 123 | 119 | 120 | 125 | 127 |
| Impact resistance (kgf cm/cm$^2$) | 8.0 with notch | — | — | 7.9 with notch | 9.3 with notch | 8.9 with notch | 8.3 with notch | — | — | — | — |
| Bending modulus of elasticity (kgf/mm$^2$) | 353 | — | — | 353 | 361 | 366 | 357 | — | — | — | — |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 91 | 91 | 91 | 91 | 91 | 91 | 91 | 91 | 91 | 89 | 89 |
| Pencil hardness | 5H | 6H | 5H | 6H | 5H | 5H | 6H | 5H | 6H | 7H | 7H |
| Vickers hardness (kgf/mm$^2$) | 28.3 | 29.7 | 27.6 | 28.9 | 28.6 | 28.2 | 30.0 | 28.9 | 29.7 | 31.9 | 31.4 |
| Rockwell M scale hardness | 116 | 119 | 116 | 118 | 117 | 116 | 119 | 116 | 118 | 120 | 120 |
| Impact resistance (kgf cm/cm$^2$) | 11.6 | 11.0 | 11.8 | 11.0 | 10.7 | — | — | — | — | 7.7 with notch | — |
| Bending modulus of elasticity (kgf/mm$^2$) | 398 | 386 | 392 | 385 | 379 | — | — | — | — | 354 | — |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 34 | Example 35 | Example 36 | Example 37 | Example 38 | Example 39 | Example 40 | Example 41 | Example 42 | Example 43 | Example 44 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 89 | 89 | 89 | 89 | 89 | 91 | 91 | 91 | 89 | 89 | 91 |
| Pencil hardness | 5H | 5H | 5H | 6H | 5H | 5H | 9H | 9H | 5H | 5H | 9H |
| Vickers hardness (kgf/mm$^2$) | 28.7 | 27.6 | 28.0 | 29.8 | 28.4 | 27.9 | 36.4 | 36.2 | 28.7 | 28.1 | 36.7 |
| Rockwell M | 116 | 115 | 115 | 118 | 116 | 115 | 124 | 124 | 117 | 116 | 124 |

TABLE 1-continued

| | Example 34 | Example 35 | Example 36 | Example 37 | Example 38 | Example 39 | Example 40 | Example 41 | Example 42 | Example 43 | Example 44 |
|---|---|---|---|---|---|---|---|---|---|---|---|
| scale hardness | | | | | | | | | | | |
| Impact resistance (kgf cm/cm$^2$) | 7.3 with notch | 7.9 with notch | 8.2 with notch | 11.3 | — | 10.7 | 11.2 | 9.2 | — | 8.0 with notch | — |
| Bending modulus of elasticity (kgf/mm$^2$) | 354 | 352 | 353 | 401 | — | 403 | 398 | 410 | — | 352 | — |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 45 | Example 46 | Example 47 | Example 48 | Example 49 | Example 50 | Example 51 | Example 52 | Example 53 | Example 54 | Example 55 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 89 | 91 | 91 | 89 | 89 | 89 | 91 | 91 | 91 | 89 | 89 |
| Pencil hardness | 9H | 5H | 9H | 5H | 5H | 5H | 5H | 9H | 9H | 7H | 5H |
| Vickers hardness (kgf/mm$^2$) | 36.2 | 28.9 | 35.9 | 29.1 | 28.7 | 29.7 | 30.4 | 36.5 | 36.7 | 33.4 | 28.9 |
| Rockwell M scale hardness | 124 | 117 | 124 | 117 | 117 | 117 | 119 | 124 | 124 | 122 | 118 |
| Impact resistance (kgf cm/cm$^2$) | — | — | 12.2 | — | — | 7.6 with notch | 12.2 | 10.4 | 10.4 | 6.9 with notch | 7.4 with notch |
| Bending modulus of elasticity (kgf/mm$^2$) | — | — | 396 | — | — | 351 | 400 | 410 | 401 | 353 | 352 |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 56 | Example 57 | Example 58 | Example 59 | Example 60 | Example 61 | Example 62 | Example 63 | Example 64 | Example 65 | Example 66 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 89 | 91 | 91 | 91 | 89 | 89 | 89 | 91 | 89 | 90 | 91 |
| Pencil hardness | 5H | 5H | 9H | 9H | 7H | 5H | 5H | 5H | 9H | 9H | 5H |
| Vickers hardness (kgf/mm$^2$) | 28.3 | 30.7 | 36.4 | 36.4 | 33.4 | 28.8 | 28.6 | 30.7 | 35.9 | 36.9 | 28.4 |
| Rockwell M scale hardness | 119 | 121 | 124 | 125 | 121 | 118 | 118 | 119 | 124 | 126 | 116 |
| Impact resistance (kgf cm/cm$^2$) | 6.7 with notch | — | — | — | — | — | — | 7.5 with notch | 8.0 with notch | 6.9 with notch | — |
| Bending modulus of elasticity (kgf/mm$^2$) | 354 | — | — | — | — | — | — | 353 | 352 | 355 | — |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example 67 | Example 68 | Example 69 | Example 70 | Example 71 | Example 72 | Example 73 | Example 74 | Example 75 | Example 76 | Example 77 |
|---|---|---|---|---|---|---|---|---|---|---|---|
| Appearance | ◯ | ◯ | ◯ | ◯ | ◯ | ◯ | ◯ | ◯ | ◯ | ◯ | ◯ |
| Total visible light transmittance % | 89 | 89 | 89 | 89 | 91 | 89 | 89 | 91 | 89 | 89 | 91 |
| Pencil hardness | 9H | 9H | 7H | 6H | 7H | 7H | 5H | 7H | 7H | 7H | 5H |
| Vickers hardness (kgf/mm$^2$) | 36.2 | 35.9 | 32.4 | 30.9 | 32.4 | 33.0 | 30.7 | 32.7 | 32.6 | 31.9 | 30.0 |
| Rockwell M scale hardness | 125 | 125 | 121 | 119 | 122 | 123 | 119 | 122 | 122 | 121 | 118 |
| Impact resistance (kgf cm/cm$^2$) | — | — | 8.0 with notch | 6.8 with notch | 10.7 | — | — | — | 7.2 with notch | — | 11.2 |
| Bending modulus of elasticity (kgf/mm$^2$) | — | — | 353 | 355 | 379 | — | — | — | 351 | — | 384 |
| Heat resistance | ◯ | ◯ | ◯ | ◯ | ◯ | ◯ | ◯ | ◯ | ◯ | ◯ | ◯ |
| Chemical resistance | ◯ | ◯ | ◯ | ◯ | ◯ | ◯ | ◯ | ◯ | ◯ | ◯ | ◯ |
| Workability | ◯ | ◯ | ◯ | ◯ | ◯ | ◯ | ◯ | ◯ | ◯ | ◯ | ◯ |

| | Example | Example | Example | Example | Example | Example | Example | Example | Example | Example | Example |
|---|---|---|---|---|---|---|---|---|---|---|---|

TABLE 1-continued

| | 78 | 79 | 80 | 81 | 82 | 83 | 84 | 85 | 86 | 87 | 88 |
|---|---|---|---|---|---|---|---|---|---|---|---|
| Appearance | ○ | ○ | ○ | ○ | ○ | ○ | ○ | ○ | ○ | ○ | ○ |
| Total visible light transmittance % | 91 | 89 | 89 | 89 | 91 | 91 | 89 | 89 | 89 | 89 | 89 |
| Pencil hardness | 9H | 9H | 6H | 5H | 5H | 9H | 9H | 5H | 5H | 9H | 5H |
| Vickers hardness (kgf/mm$^2$) | 36.7 | 36.3 | 31.0 | 28.7 | 28.5 | 36.5 | 36.7 | 28.2 | 27.9 | 35.9 | 29.2 |
| Rockwell M scale hardness | 124 | 123 | 119 | 117 | 116 | 125 | 124 | 116 | 116 | 123 | 117 |
| Impact resistance (kgf cm/cm$^2$) | 9.6 | 9.2 | 6.8 with notch | 7.2 with notch | — | — | — | — | — | 6.9 with notch | 6.9 with notch |
| Bending modulus of elasticity (kgf/mm$^2$) | 400 | 408 | 353 | 354 | — | — | — | — | — | 353 | 351 |
| Heat resistance | ○ | ○ | ○ | ○ | ○ | ○ | ○ | ○ | ○ | ○ | ○ |
| Chemical resistance | ○ | ○ | ○ | ○ | ○ | ○ | ○ | ○ | ○ | ○ | ○ |
| Workability | ○ | ○ | ○ | ○ | ○ | ○ | ○ | ○ | ○ | ○ | ○ |

| | Example 89 | Example 90 | Example 91 | Example 92 | Example 93 | Example 94 | Example 95 | Example 96 | Example 97 |
|---|---|---|---|---|---|---|---|---|---|
| Appearance | ○ | ○ | ○ | ○ | ○ | ○ | ○ | ○ | ○ |
| Total visible light transmittance % | 89 | 89 | 89 | 89 | 90 | 90 | 90 | 90 | 90 |
| Pencil hardness | 5H | 9H | 5H | 5H | 9H | 6H | 9H | 9H | 6H |
| Vickers hardness (kgf/mm$^2$) | 29.0 | 36.6 | 28.7 | 28.5 | 35.3 | 29.6 | 35.6 | 24.7 | 29.9 |
| Rockwell M scale hardness | 117 | 124 | 116 | 116 | 126 | 118 | 127 | 125 | 120 |
| Impact resistance (kgf cm/cm$^2$) | 7.2 with notch | — | — | 9.9 | 7.9 with notch | 8.6 with notch | 8.2 with notch | 8.4 with notch | 8.1 with notch |
| Bending modulus of elasticity (kgf/mm$^2$) | 354 | — | — | 389 | 357 | 359 | 363 | 368 | 362 |
| Heat resistance | ○ | ○ | ○ | ○ | ○ | ○ | ○ | ○ | ○ |
| Chemical resistance | ○ | ○ | ○ | ○ | ○ | ○ | ○ | ○ | ○ |
| Workability | ○ | ○ | ○ | ○ | ○ | ○ | ○ | ○ | ○ |

COMPARATIVE EXAMPLE 1

To 400 parts of diethylene glycol diallylcarbonate was added 1.2 part of benzoyl peroxide, and the mixture was mixed and defoamed. The resulting liquid matter was poured into a mold for polymerization as shown in Example 1.

The mold was placed in a hot air oven for polymerization, and the polymerization was intended to carry out by raising the temperature from 50° C. to 170° C. over 3 hours, but when the temperature reached about 70° C., a vigorous polymerization occurred and the polymer was released from the glass mold and yellow color.

When the polymerization was carried out by raising the temperature from 50° C. to 170° C. over 8 hours, there was obtained a resin plate which was not released during the polymerization.

However, the pencil hardness of the resulting resin plate was 4H, the impact resistance 2 0 kgf cm/cm$^2$, and the bending modulus of elasticity 252 kgf/mm$^2$.

COMPARATIVE EXAMPLE 2

To 120.0 parts of methyl methacrylate was added 112.8 parts of xylene diisocyanate, and then 0.06 parts of dibutyltin dilaurate. Then while the resulting mixture was heated to 60° C., 156.6 parts of hydroxyethyl methacrylate was gradually added to the mixture, and there was obtained a viscous methyl methacrylate mixture of a urethane compound which gave substantially no absorption of isocyanate group in the infrared absorption spectrum.

To the resulting mixture was added 3.6 parts of benzoyl peroxide, and the mixture was mixed, defoamed and poured into a mold for polymerization as shown in Example 11.

The mold was placed in a hot air oven and it was intended to raise the temperature from 45° C. to 160° C. over 3 hours, but at about 65° C. a vigorous polymerization occurred and the polymer product was released from the glass mold.

COMPARATIVE EXAMPLE 3

The polymerization procedure of Example 25 was repeated except that pentaerythritol tetrakis (3-mercaptopropionate) was not added, and there was obtained a transparent resin plate having a smooth surface. Though the pencil hardness was 5H, the impact resistance was 6.1 kgf cm/cm$^2$.

COMPARATIVE EXAMPLE 4

To a monomer prepared by the formula as shown in Example 2 was added t-butylperoxy-2-ethylhexanoate to effect polymerization by raising the temperature from 60° C. to 170° C. for 3 hours to obtain a transparent resin plate.

The pencil hardness of the plate was 7H, but the impact resistance was 6.1 kgf cm/cm² and the bending modulus of elasticity was 410 kgf/mm².

COMPARATIVE EXAMPLE 5

The procedure of Example 15 was repeated except that the polymethyl methacrylate resin was not used as a mutual dissolution protecting layer. During the intended heating polymerization from 60° C. to 170° C. over 3 hours, the interface between the polycarbonate resin layer and the resin layer prepared from the monomer as shown in Example 15 became opaque at about 100° C.

EXAMPLE 132

A urethane forming reaction was carried out by adding 0.1 part of dibutyltin dilaurate to 100.6 parts of 3-isopropenyl-α,α-dimethylbenzylisocyanate and heating the resulting mixture to 40° C. (the inner temperature) while 87.1 parts of diethylene glycol mono-methacrylate was gradually added thereto.

After completion of the reaction, the product was purified by column chromatography to*obtain 163.3 parts of a colorless liquid monomer of the following structural formula,

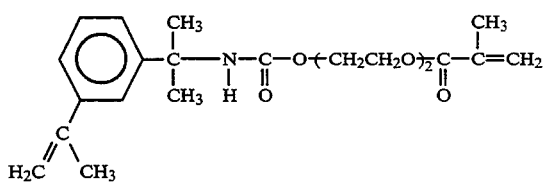

Analysis for C₂₁H₂₉NO₅:

|  | C | H | N |
|---|---|---|---|
| Found (%) | 67.03 | 7.54 | 3.92 |
| Calc. (%) | 67.18 | 7.78 | 3.73 |

NMR (δ/CDCl₃)
δ =

1.68 (s, 6H, 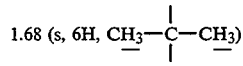)

1.95 (s, 3H, 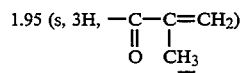)

2.15 (s, 3H, 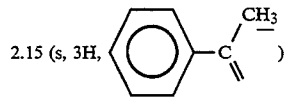)

3.65 (s, 4H, 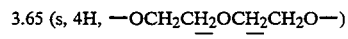)

4.25 (s, 4H, 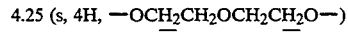)

5.07 (s, 1H, 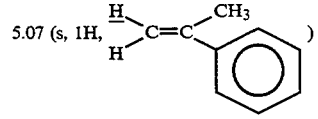)

5.19 (s, 1H, 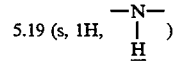)

-continued

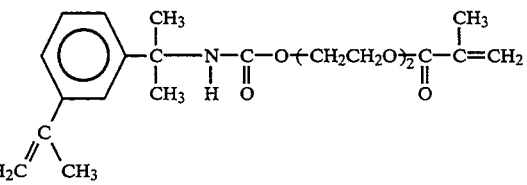

Analysis for C₂₁H₂₉NO₅:

| C | H | N |
|---|---|---|

5.33 (s, 1H, 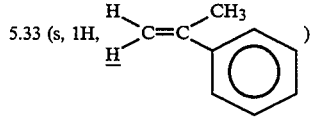)

5.56 (s, 1H, 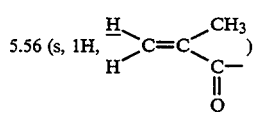)

6.12 (s, 1H, 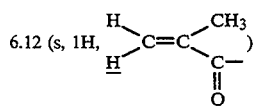)

7.31 (s, 3H, 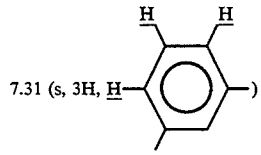)

7.48 (s, 1H, 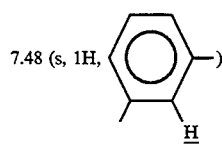)

EXAMPLE 133

The procedure of Example 132 was repeated except that 100.6 parts of 3-isopropenyl-α,α-dimethylbenzylisocyanate was replaced with 100.6 parts of 4-isopropenyl-α,α-dimethylbenzylisocyanate, and a colorless liquid monomer of the following structral formula (165.4 parts) was obtained.

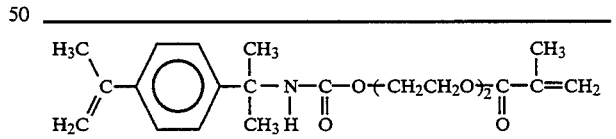

Analysis for C₂₁H₂₉NO₅:

|  | C | H | N |
|---|---|---|---|
| Found (%) | 67.26 | 7.81 | 3.92 |
| Calc. (%) | 67.18 | 7.78 | 3.73 |

NMR (δ/CDCl₃)
δ =

1.68 (s, 6H, 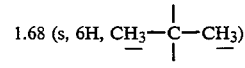)

1.94 (s, 3H, 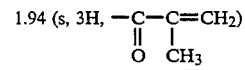)

-continued

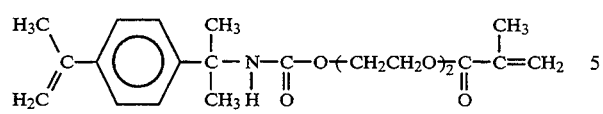

Analysis for C₂₁H₂₉NO₅:

| | C | H | N |
|---|---|---|---|

2.13 (s, 3H, 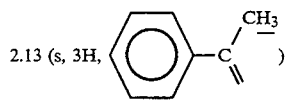 )

3.65 (s, 4H, —OCH₂CH₂OCH₂CH₂O—)

4.25 (s, 4H, —OCH₂CH₂OCH₂CH₂O—)

5.08 (s, 1H, 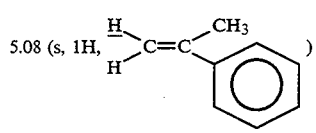 )

5.19 (s, 1H, —N— / H )

5.33, (s, 1H, 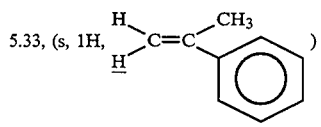 )

5.58 (s, 1H,  )

6.14 (s, 1H,  )

7.39 (s, 3H, 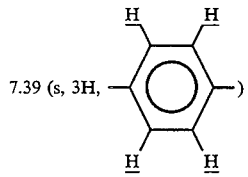 )

EXAMPLE 134

The procedure of Example 132 was repeated except that 87.1 parts of diethylene glycol monomethacrylate was replaced with 80.1 parts of diethylene glycol monoacrylate, and 153.6 parts of a colorless liquid monomer of the following structural formula was obtained.

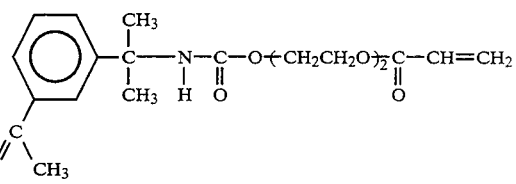

Analysis for C₂₀H₂₇NO₅:

| | C | H | N |
|---|---|---|---|
| Found (%) | 66.51 | 7.74 | 3.87 |
| Calc. (%) | 66.46 | 7.53 | 3.88 |

NMR (δ/CDCl₃)
δ =

1.68 (s, 6H, 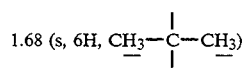 )

2.22 (s, 3H, 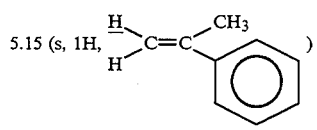 )

3.66 (s, 4H, —OCH₂CH₂OCH₂CH₂O—)

4.26 (s, 4H, —OCH₂CH₂OCH₂CH₂O—)

5.15 (s, 1H, 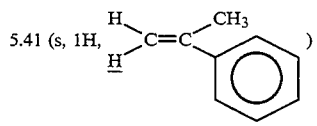 )

5.27 (s, 1H —N— / H )

5.41 (s, 1H,  )

5.96 (m, 1H, 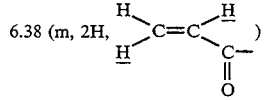 )

6.38 (m, 2H, )

7.42 (s, 3H,  )

7.58 (s, 1H, )

EXAMPLE 135

The procedure of Example 134 was repeated except that 100.6 parts of 3-isopropenyl-α,α-dimethylbenzylisocyanate was replaced with 100.6 parts of 4-isopropenyl-α,α-di-methylbenzylisocyanate, and 152.9 parts of a colorless liquid monomer of the following structural formula was obtained.

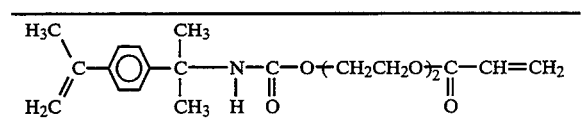

Analysis for $C_{20}H_{27}NO_5$:

|  | C | H | N |
|---|---|---|---|
| Found (%) | 66.48 | 7.65 | 3.97 |
| Calc. (%) | 66.46 | 7.53 | 3.88 |

NMR (δ/CDCl₃)

δ =

1.68 (s, 6H, CH₃—C—CH₃)

2.21 (s, 3H, [phenyl-C(CH₃)=CH₂])

3.66 (s, 4H, —OCH₂CH₂OCH₂CH₂O—)

4.26 (s, 4H, —OCH₂CH₂OCH₂CH₂O—)

5.16 (s, 1H, H,H C=C CH₃,phenyl)

5.27 (s, 1H, —N—H)

5.41 (s, 1H, H,H C=C CH₃,phenyl)

5.96 (m, 1H, H,H C=C H,C(=O))

6.38 (m, 2H, H,H C=C H,C(=O))

7.46 (s, 4H, phenyl)

EXAMPLE 136

The procedure of Example 132 was repeated except that 87.1 parts of diethylene glycol monomethacrylate was replaced with 101.1 parts of dipropylene glycol monomethacrylate, and 173.5 parts of a colorless liquid monomer of the following structural formula was obtained.

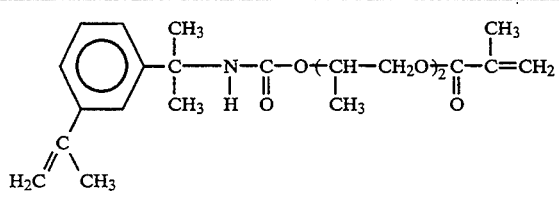

Analysis for $C_{23}H_{33}NO_5$:

|  | C | H | N |
|---|---|---|---|
| Found (%) | 68.63 | 8.13 | 3.68 |
| Calc. (%) | 68.46 | 8.24 | 3.47 |

NMR (δ/CDCl₃)

δ = 1.19 (d, 6H, —OCHCH₂O—, CH₃)

1.67 (s, 6H, CH₃—C—CH₃)

1.94 (s, 3H, —C(=O)—C(CH₃)=CH₂)

2.14 (s, 3H, phenyl-C(CH₃)=CH₂)

3.10–4.18 (m, 5H, —N(H)—C(=O)—OCHCH₂OCHCH₂O—, CH₃, CH₃)

4.70–5.24 (m, 3H, —N(H)—C(=O)—O—CHCH₂—, CH₃)

5.33 (s, 1H, H,H C=C CH₃,phenyl)

5.56 (s, 1H, H,H C=C CH₃,C(=O))

6.11 (s, 1H, H,H C=C CH₃,C(=O))

7.30 (s, 3H, phenyl-H)

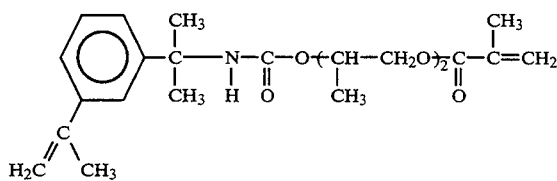

Analysis for $C_{23}H_{33}NO_5$:

| | C | H | N |
|---|---|---|---|

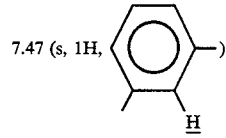
7.47 (s, 1H, ...)

EXAMPLE 137

The procedure of Example 136 was repeated except that 100.6 parts of 3-isopropenyl-α,α-dimethylbenzylisocyanate was replaced with 100.6 parts of 4-isopropenyl-α,α-dimethylbenzylisocyanate, and 171.9 parts of a colorless liquid monomer of a colorless liquid monomer of the following structural formula was obtained.

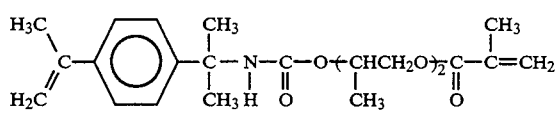

Analysis for $C_{23}H_{33}NO_5$:

| | C | H | N |
|---|---|---|---|
| Found (%) | 68.54 | 8.28 | 3.63 |
| Calc. (%) | 68.46 | 8.24 | 3.47 |

NMR (δ/CDCl$_3$)

= 1.19 (d, 6H, —OCHCH$_2$O—)
           |
          CH$_3$ 1.67 (s, 6H, CH$_3$—C—CH$_3$)

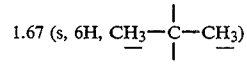
1.94 (s, 3H, —C—C=CH$_2$)

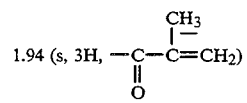
2.13 (s, 3H, ...)

3.10–4.18 (m, 5H, —NCOCHCH$_2$OCHCH$_2$O—)
               HO  CH$_3$   CH$_3$ 4.70–5.24 (m, 3H, —N—C—O—CHCH$_2$,)
                 H  O    CH$_3$

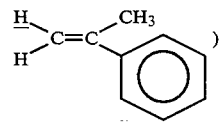

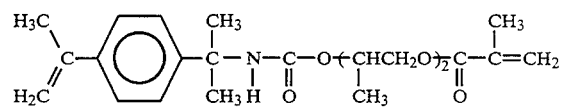

Analysis for $C_{23}H_{33}NO_5$:

| | C | H | N |
|---|---|---|---|

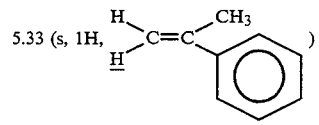
5.33 (s, 1H, ...)

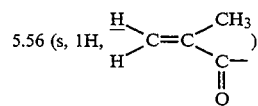
5.56 (s, 1H, ...)

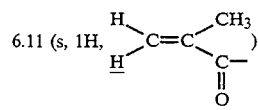
6.11 (s, 1H, ...)

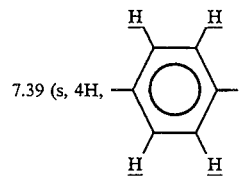
7.39 (s, 4H, ...)

EXAMPLE 138

The procedure of Example 132 was repeated except that 87.1 parts of diethylene glycol monomethacrylate was replaced with 94.1 parts of dipropylene glycol monoacrylate, and 177.2 parts of a colorless liquid monomer of the following structural formula was obtained.

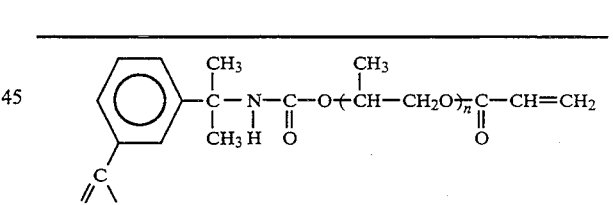

Analysis for $C_{22}H_{31}NO_5$:

| | C | H | N |
|---|---|---|---|
| Found (%) | 67.92 | 8.16 | 3.53 |
| Calc. (%) | 67.84 | 8.02 | 3.60 |

NMR (δ/CDCl$_3$)

= 1.17 (d, 6H, —OCHCH$_2$O—)
           |
          CH$_3$ 1.65 (s, 6H, CH$_3$—C—CH$_3$)

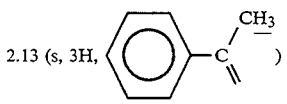
2.13 (s, 3H, ...)

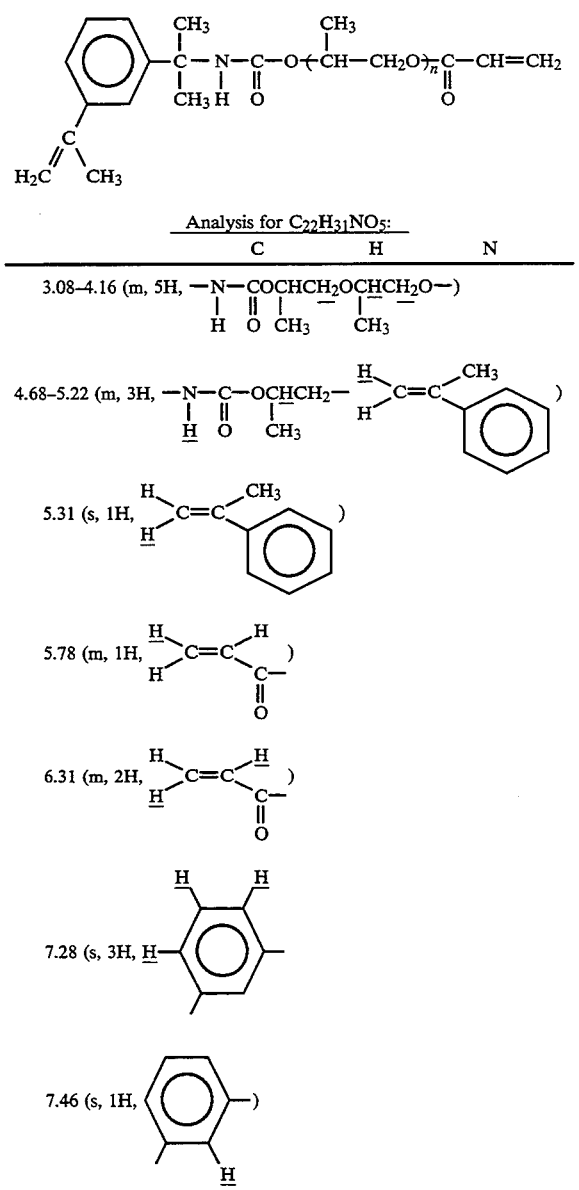

EXAMPLE 139

The procedure of Example 138 was repeated except that 100.6 parts of 3-isopropenyl-α,α-dimethylbenzylisocyanate was replaced with 100.6 parts of 4-isopropenyl-α,α-dimethylbenzylisocyanate, and 168.2 parts of a colorless liquid monomer of the following structural formula.

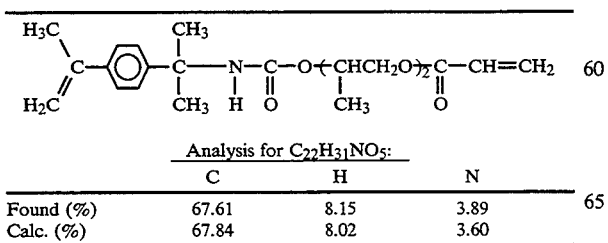

Analysis for $C_{22}H_{31}NO_5$:

| | C | H | N |
|---|---|---|---|
| Found (%) | 67.61 | 8.15 | 3.89 |
| Calc. (%) | 67.84 | 8.02 | 3.60 |

NMR (δ/CDCl₃)

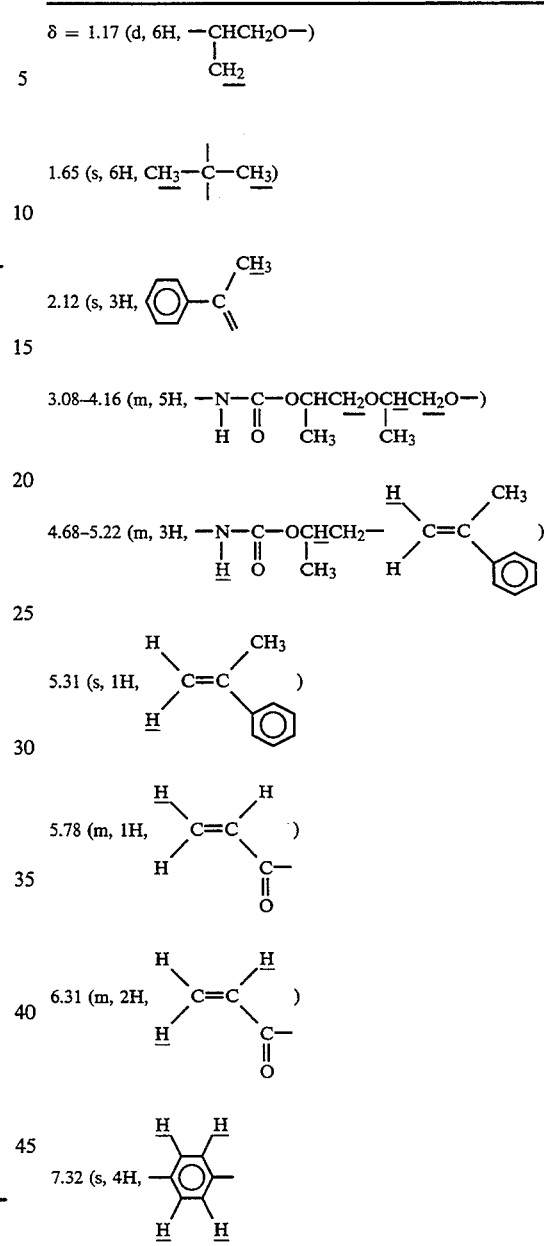

EXAMPLE 140

The procedure of Example 132 was repeated except that 87.1 parts of diethylene glycol monomethacrylate was replaced with 143.0 parts of polyethylene glycol monomethacrylate of the following structural formula,

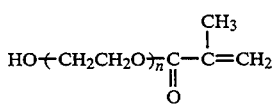

where n=3–6, average value of n=4.54, and 209.5 parts of a colorless liquid monomer of the following structural formula was obtained.

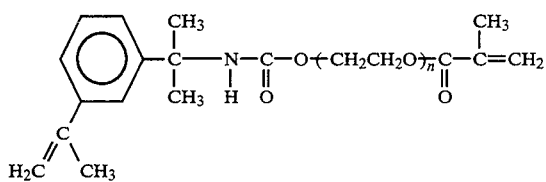

(n=3–6, average value of n=4.54) Analysis for $C_{26.08}H_{39.16}NO_{7.54}$:

| Analysis for $C_{26.08}H_{39.16}NO_{7.54}$: | | | |
|---|---|---|---|
| | C | H | N |
| Found (%) | 64.20 | 8.27 | 2.95 |
| Calc. (%) | 64.27 | 8.10 | 2.87 |

NMR (δ/CDCl₃)

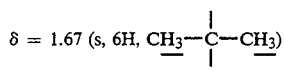

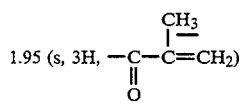

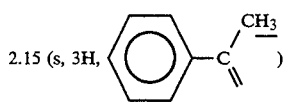

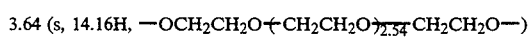

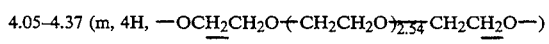

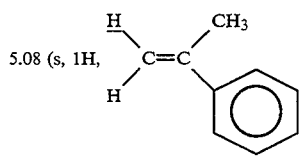

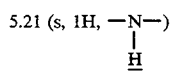

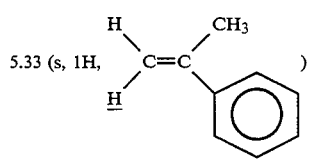

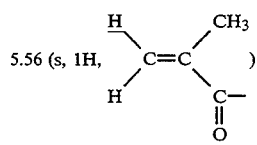

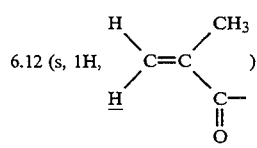

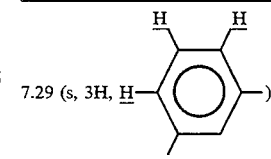

7.29 (s, 3H, <u>H</u>—)

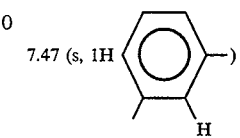

7.47 (s, 1H, —<u>H</u>)

EXAMPLE 141

The procedure of Example 140 was repeated except that 100.6 parts of 3-isopropenyl-α,α-dimethylbenzylisocyanate was replaced with 100.6 parts of 4-isopropenyl-α,α-dimethylbenzylisocyanate, and 205.9 parts of a colorless liquid monomer of the following structural formula was obtained.

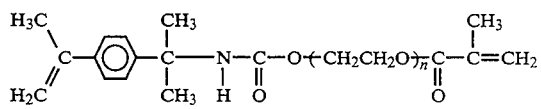

(n=3–6, average value of n=4.54)

| Analysis for $C_{26.08}H_{39.16}NO_{7.54}$: | | | |
|---|---|---|---|
| | C | H | N |
| Found (%) | 64.51 | 8.03 | 2.65 |
| Calc. (%) | 64.27 | 8.10 | 2.87 |

NMR (δ/CDCl₃)

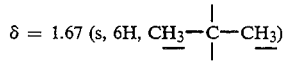

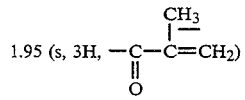

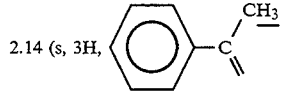

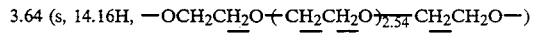

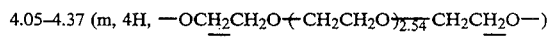

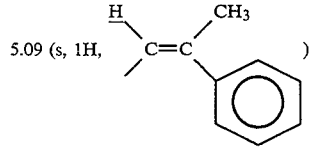

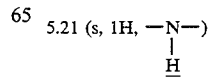

5.33 (s, 1H, 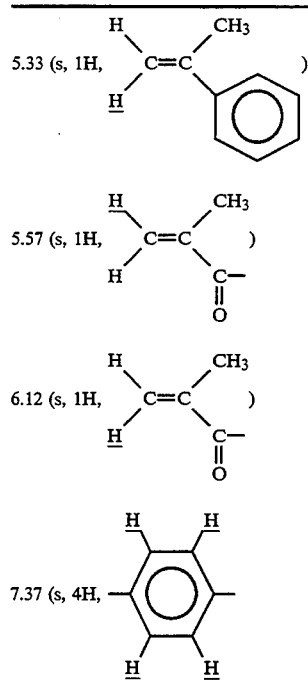)

5.57 (s, 1H, )

6.12 (s, 1H, )

7.37 (s, 4H, )

EXAMPLE 142

The procedure of Example 132 was repeated except that 87.1 parts of diethylene glycol monomethacrylate was replaced with 210.9 parts of polyethylene glycol monomethacrylate of the following structural formula,

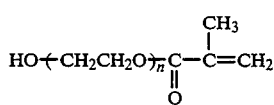

$HO(CH_2CH_2O)_{\overline{n}}C(CH_3)(=O)C=CH_2$ (n=7–10, average value of n=7.62)

288.1 Parts of a colorless liquid monomer of the following structural formula was obtained.

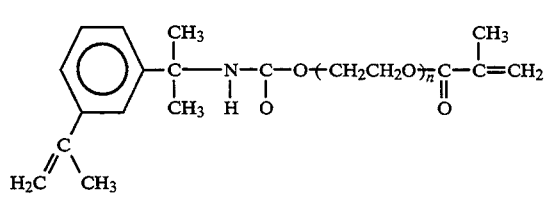

(n=7–10, average value of n=7.62)

| Analysis for $C_{32.24}H_{51.48}NO_{10.62}$: | | | |
|---|---|---|---|
| | C | H | N |
| Found (%) | 62.08 | 8.43 | 2.47 |
| Calc. (%) | 62.15 | 8.33 | 2.25 |

NMR (δ/CDCl₃)

δ = 1.67 (s, 6H, CH₃—C—CH₃) 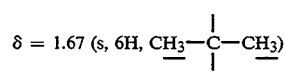

1.95 (s, 3H, —C(CH₃)(=O)—C=CH₂)

2.15 (s, 3H, 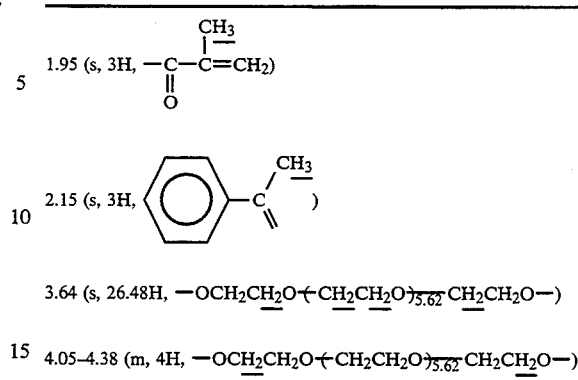)

3.64 (s, 26.48H, —OCH₂CH₂O(CH₂CH₂O)₅.₆₂CH₂CH₂O—)

4.05–4.38 (m, 4H, —OCH₂CH₂O(CH₂CH₂O)₅.₆₂CH₂CH₂O—)

5.08 (s, 1H, 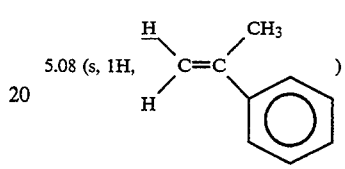)

5.21 (s, 1H, —N—)
         |
         H 5.33 (s, 1H, 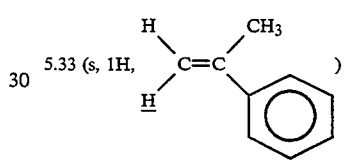)

5.56 (s, 1H, 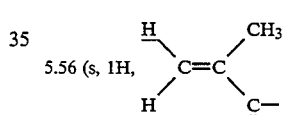)

6.12 (s, 1H, 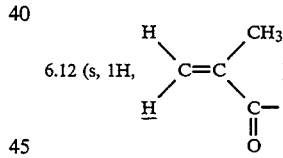)

7.30 (s, 3H, 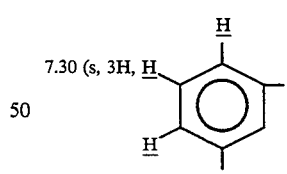)

7.47 (s, 1H, 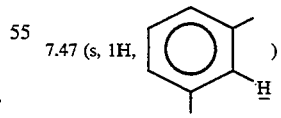)

EXAMPLE 143

The procedure of Example 142 was repeated except that 100.6 parts of 3-isopropenyl-α,α-dimethylbenzylisocyanate was replaced with 100.6 parts of 4-isopropenyl-α,α-dimethylbenzylisocyanate, and 285.9 parts of a colorless liquid monomer of the following structural formula was obtained.

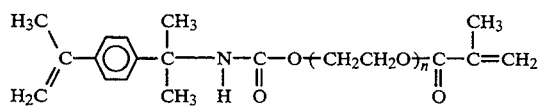

(n=7–10, average value of n=7.62)

Analysis for $C_{32.24}H_{51.48}NO_{10.62}$:

|  | C | H | N |
|---|---|---|---|
| Found (%) | 61.98 | 8.52 | 2.49 |
| Calc. (%) | 62.15 | 8.33 | 2.25 |

NMR (δ/CDCl$_3$)

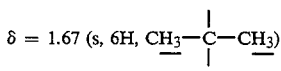

δ = 1.67 (s, 6H, $CH_3-\underset{|}{\overset{|}{C}}-CH_3$)

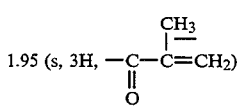

1.95 (s, 3H, $-\underset{\underset{O}{\|}}{C}-\overset{\overset{CH_3}{|}}{C}=CH_2$)

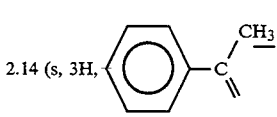

2.14 (s, 3H, ...)

3.64 (s, 26.48H, $-OCH_2CH_2O(CH_2CH_2O)_{5.62}CH_2CH_2O-$)

4.05–4.38 (m, 4H, $-OCH_2CH_2O(CH_2CH_2O)_{5.62}CH_2CH_2O-$)

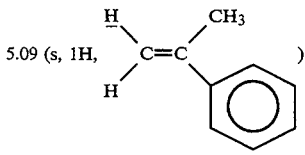

5.09 (s, 1H, ...)

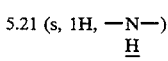

5.21 (s, 1H, $-\underset{\underset{H}{|}}{N}-$)

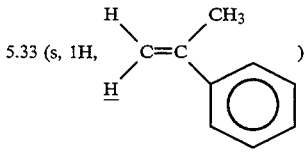

5.33 (s, 1H, ...)

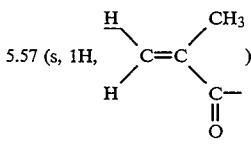

5.57 (s, 1H, ...)

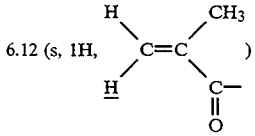

6.12 (s, 1H, ...)

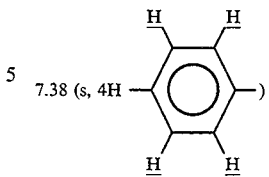

7.38 (s, 4H, ...)

EXAMPLE 144

The procedure of Example 132 was repeated except that 87.1 parts of diethylene glycol monomethacrylate was replaced with 137.1 parts of polyethylene glycol monoacrylate of the following structural formula, $$HO(CH_2CH_2O)_n\underset{\underset{O}{\|}}{C}-CH=CH_2$$

(n=3–6, average value of n=4.59)

208.6 Parts of a colorless liquid monomer of the following structural formula was obtained.

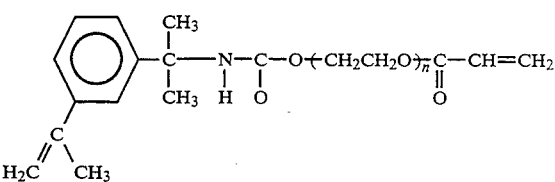

(n=3–6, average value of n=4.59)

Analysis for $C_{25.18}H_{37.36}NO_{7.59}$:

|  | C | H | N |
|---|---|---|---|
| Found (%) | 63.85 | 7.73 | 3.04 |
| Calc. (%) | 63.60 | 7.92 | 2.95 |

NMR (δ/CDCl$_3$)

δ = 1.67 (s, 6H, $CH_3-\underset{|}{\overset{|}{C}}-CH_3$)

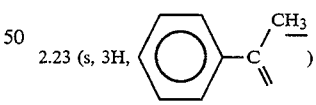

2.23 (s, 3H, ...)

3.65 (s, 14.36H, $-OCH_2CH_2O(CH_2CH_2O)_{2.59}CH_2CH_2O-$)

4.05–4.37 (m, 4H, $-OCH_2CH_2O(CH_2CH_2O)_{2.59}CH_2CH_2O-$)

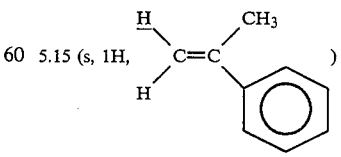

5.15 (s, 1H, ...)

5.27 (s, 1H, $-\underset{\underset{H}{|}}{N}-$)

5.41 (s, 1H, 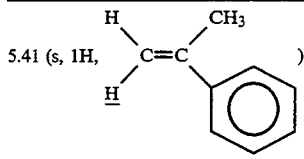 )

5.96 (m, 1H, 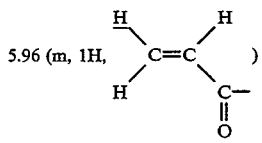 )

6.38 (m, 2H, 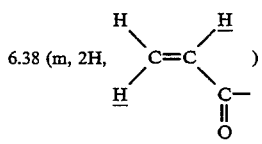 )

7.41 (s, 3H, 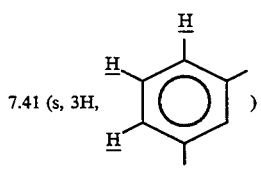 )

7.58 (s, 1H, 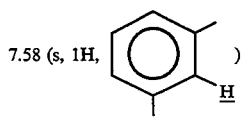 )

EXAMPLE 145

The procedure of Example 144 was repeated except that 100.6 parts of 3-isopropenyl-α,α-dimethylbenzylisocyanate was replaced with 100.6 parts of 4-isopropenyl-α,α-dimethylbenzylisocyanate, and 210.6 parts of a colorless liquid monomer of the following structural formula was obtained.

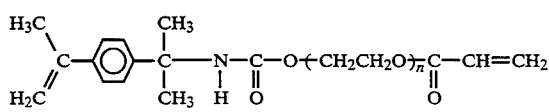

(n=3-6, average value of n=4.59)

| Analysis for $C_{25.18}H_{37.36}NO_{7.59}$: | | | |
|---|---|---|---|
| | C | H | N |
| Found (%) | 63.87 | 7.78 | 2.76 |
| Calc. (%) | 63.60 | 7.92 | 2.95 |

NMR (δ/CDCl$_3$)

δ = 1.67 (s, 6H, CH$_3$—C—CH$_3$)

2.22 (s. 3H, 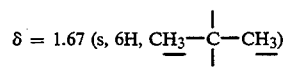 )

3.65 (s, 14.36H, —OCH$_2$CH$_2$O(CH$_2$CH$_2$O)$_{2.59}$CH$_2$CH$_2$O—)

4.05–4.37 (m, 4H, —OCH$_2$CH$_2$O(CH$_2$CH$_2$O)$_{2.59}$CH$_2$CH$_2$O—)

5.16 (s, 1H, 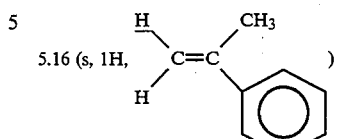 )

5.27 (s, 1H, —N—)
            H 5.41 (s, 1H, 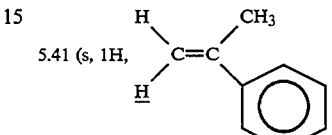 )

5.96 (m, 1H, 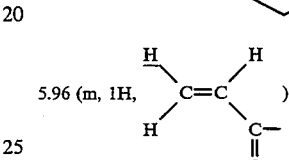 )

6.38 (m, 2H, 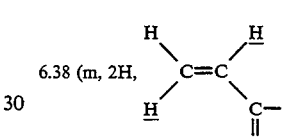 )

7.44 (s, 4H 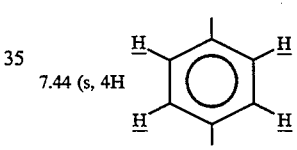 )

EXAMPLE 146

The procedure of Example 132 was repeated except that 87.1 parts of diethylene glycol monomethacrylate was replaced with 204.5 parts of polyethylene glycol monoacrylate of the following structural formula,

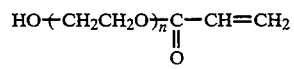

(n=7–10, average value of n=7.65).

282.9 Parts of a colorless liquid monomer of the following structural formula was obtained.

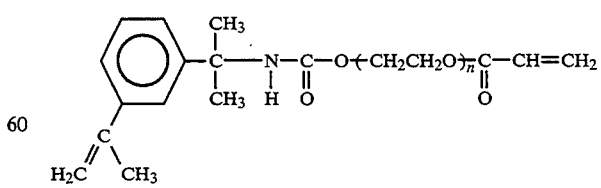

(n=7–10, average value of n=7.65)

| Analysis for $C_{31.30}H_{49.60}NO_{10.63}$: | | |
|---|---|---|
| C | H | N |

| | -continued | | |
|---|---|---|---|
| Found (%) | 61.68 | 8.37 | 2.16 |
| Calc. (%) | 61.63 | 8.20 | 2.30 |

NMR (δ/CDCl₃)

δ = 1.67 (s, 6H, CH₃—C—CH₃) 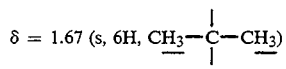

2.23 (s, 3H,  )

3.65 (s, 26.60H, —OCH₂CH₂O$\left(\text{CH}_2\text{CH}_2\text{O}\right)_{\overline{5.65}}$CH₂CH₂O—)

4.05–4.37 (m, 4H, —OC$\underline{\text{H}}_2$CH₂O$\left(\text{CH}_2\text{CH}_2\text{O}\right)_{\overline{5.65}}$CH₂C$\underline{\text{H}}_2$O—)

5.15 (s, 1H, 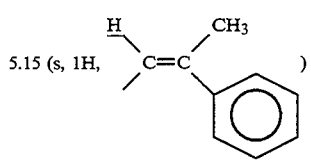 )

5.27 (s, 1H, —N—)
         |
         H
         —

5.41 (s, 1H, 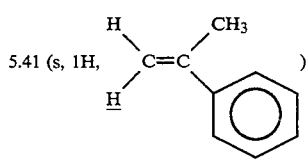 )

5.96 (m, 1H, 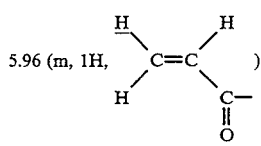 )

6.38 (m, 2H, 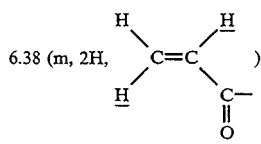 )

7.41 (s, 3H, 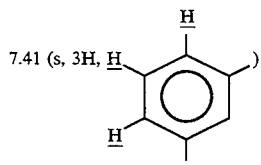 )

7.58 (s, 1H, 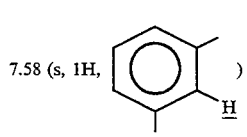 )

EXAMPLE 147

The procedure of Example 146 was repeated except that 100.6 parts of 3- isopropenyl-α,α-dimethylbenzylisocyanate was replaced with 100.6 parts of 4-isopropenyl-α,α-dimethylbenzylisocyanate, and 285.2 parts of a colorless liquid monomer of the following structural formula was obtained.

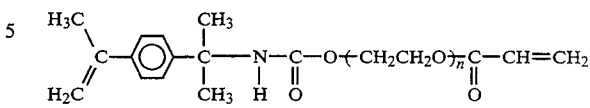

(n=7–10, average value of n=7.65)

| Analysis for $C_{31.30}H_{49.60}NO_{10.63}$: | | |
|---|---|---|
| C | H | N |
| Found (%) 61.75 | 8.39 | 2.47 |
| Calc. (%) 61.63 | 8.20 | 2.30 |

NMR (δ/CDCl₃)

δ = 1.67 (s, 6H, CH₃—C—CH₃) 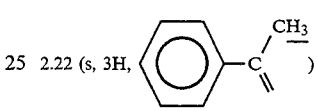

2.22 (s, 3H, 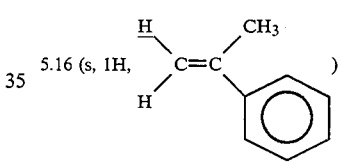 )

3.65 (s, 26.60H, —OCH₃CH₂O$\left(\text{CH}_2\text{CH}_2\text{O}\right)_{\overline{5.65}}$CH₂CH₂O—)

4.05–4.37 (m, 4H, —OC$\underline{\text{H}}_2$CH₂O$\left(\text{CH}_2\text{CH}_2\text{O}\right)_{\overline{5.65}}$CH₂CH₂O—

5.16 (s, 1H, 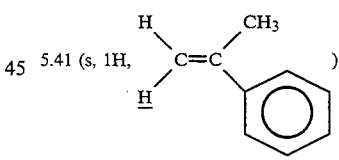 )

5.27 (s, 1H, —N—)
         |
         H
         —

5.41 (s, 1H, 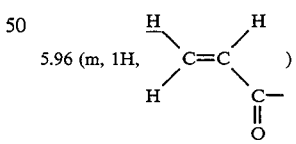 )

5.96 (m, 1H, 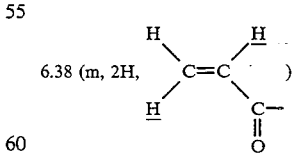 )

6.38 (m, 2H, 
\c=c/
H   C—
    ‖
    O
)

7.45 (s, 4H, 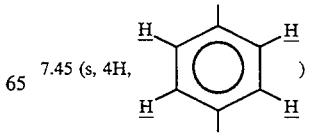 )

EXAMPLE 148

The procedure of Example 132 was repeated except that 87.1 parts of diethylene glycol monomethacrylate was replaced with 177.5 parts of polypropylene glycol monomethacrylate of the following structural formula,

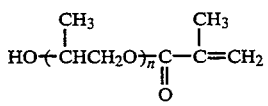

(n=3–6, average value of n=4.63)

259.7 Parts of a colorless liquid monomer of the following structural formula was obtained.

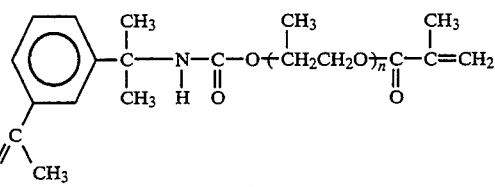

(n=3–6, average value of n=4.63)

| | Analysis for $C_{30.89}H_{48.87}NO_{7.63}$: | | |
|---|---|---|---|
| | C | H | N |
| Found (%) | 66.47 | 8.91 | 2.67 |
| Calc. (%) | 66.69 | 8.85 | 2.52 |

NMR (δ/CDCl$_3$)

δ = 1.19 (d, 13.89H, 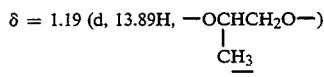 )

1.67 (s, 6H, 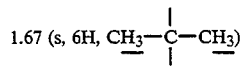 )

1.94 (s, 3H, 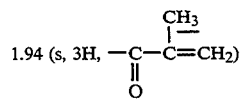 )

2.14 (s, 3H,  )

3.10–4.18 (m, 12.89H, 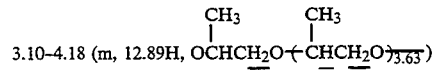 )

4.70–5.24 (m, 3H, 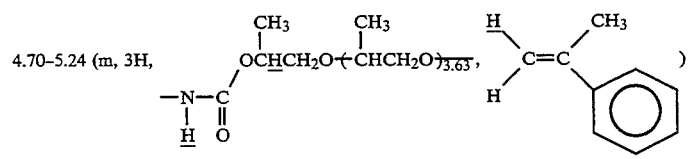 )

5.33 (s, 1H, 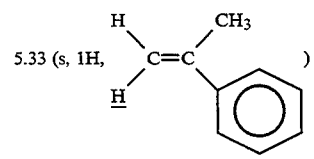 )

5.56 (s, 1H, 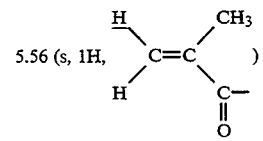 )

6.11 (s, 1H, 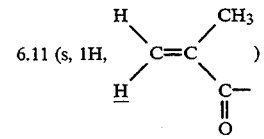 )

| | |
|---|---|
| 7.30 (s, 3H, 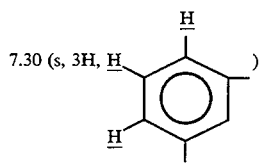) | |
| 7.47 (s, 1H, 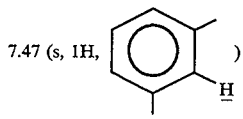) | |

EXAMPLE 149

The procedure of Example 148 was repeated except that 100.6 parts of 3-isopropenyl-α,α-dimethylbenzylisocyanate was replaced with 100.6 parts of 4-isopropenyl-α,α-dimethylbenzylisocyanate, and 253.9 parts of a colorless liquid monomer of the following structural formula was obtained.

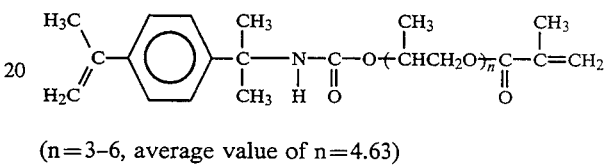

(n=3–6, average value of n=4.63)

| | Analysis for $C_{30.89}H_{48.87}NO_{7.63}$: | | |
|---|---|---|---|
| | C | H | N |
| Found (%) | 66.75 | 8.94 | 2.38 |
| Calc. (%) | 66.69 | 8.85 | 2.52 |

NMR (δ/CDCl₃)

δ = 1.19 (d, 13.89H, 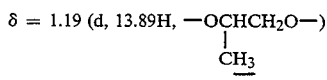)

1.67 (s, 6H, 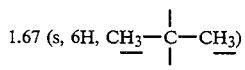)

1.94 (s, 3H, 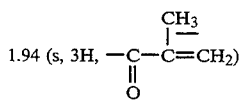)

2.12 (s, 3H, )

3.10–4.18 (m, 12.89H, 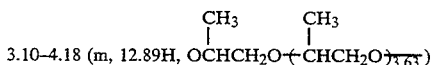)

4.70–5.24 (m, 3H, 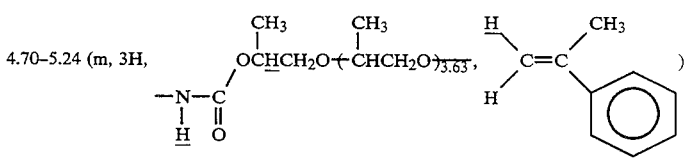)

5.33 (s, 1H, 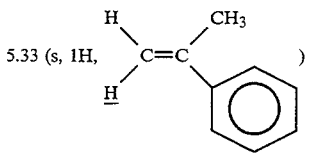)

-continued 5.56 (s, 1H, 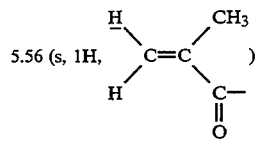)

6.11 (s, 1H, 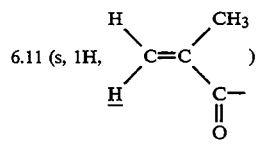)

7.38 (s, 4H, 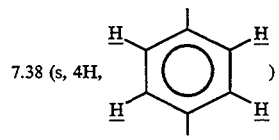)

EXAMPLE 150

The procedure of Example 132 was repeated except that 87.1 parts of diethylene glycol monomethacrylate was replaced with 263.7 parts of polypropylene glycol monomethacrylate of the following structural formula,

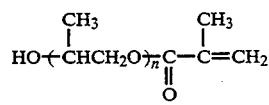

(n=7–10, average value of n=7.60)

330.8 Parts of a colorless liquid monomer of the following structural formula was obtained.

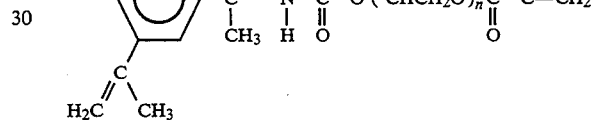

(n=7–10, average value of n=7.60)

|  | Analysis for $C_{39.80}H_{66.60}NO_{10.60}$: | | |
|---|---|---|---|
|  | C | H | N |
| Found (%) | 65.78 | 9.08 | 1.96 |
| Calc. (%) | 65.60 | 9.21 | 1.92 |

NMR (δ/CDCl$_3$)

δ = 1.19 (d, 22.80H, 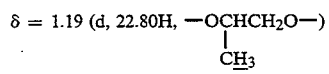)

1.67 (s, 6H, 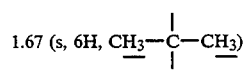)

1.94 (s, 3H, 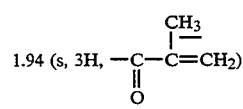)

2.14 (s, 3H, 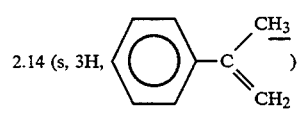)

3.09–4.18 (m, 21.80H, 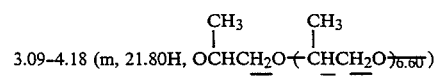)

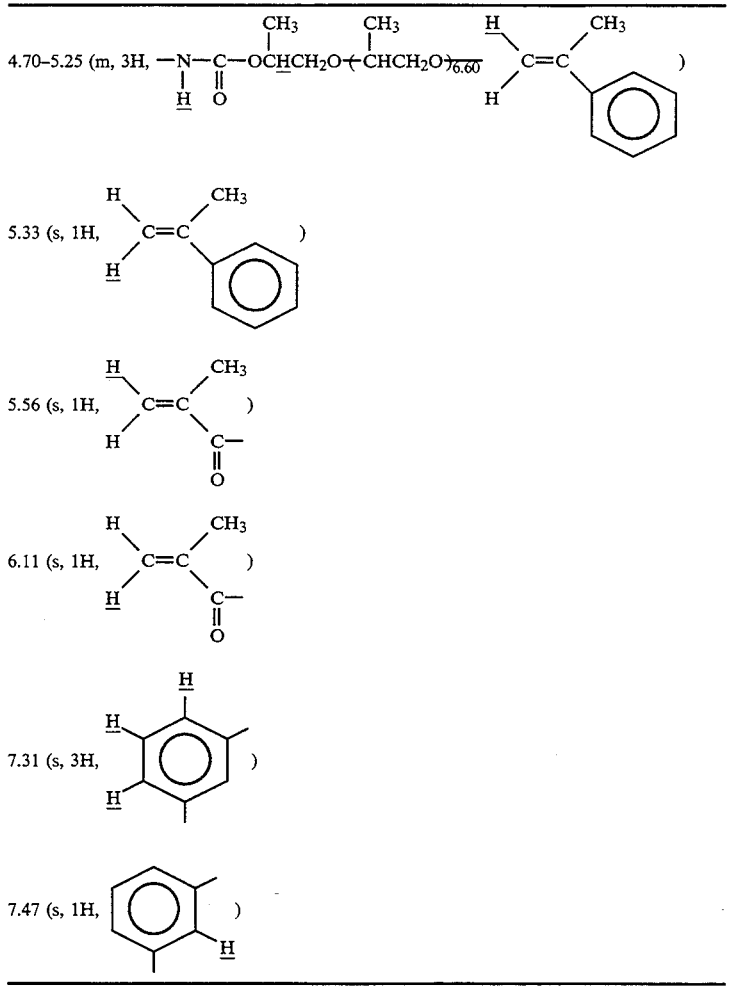
EXAMPLE 151
The procedure of Example 150 was repeated except that 100.6 parts of 3-isopropenyl-α,α-dimethylbenzylisocyanate was replaced with 100.6 parts of 4-isopropenyl-α,α-dimethylbenzylisocyanate, and 327.6 parts of a colorless liquid monomer of the following structural formula was obtained.
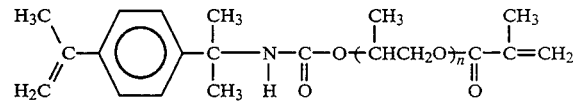
(n=7–10, average value of n=7.60)
| | Analysis for $C_{39.80}H_{66.60}NO_{10.60}$: | | |
|---|---|---|---|
| | C | H | N |
| Found (%) | 65.47 | 9.35 | 2.09 |
| Calc. (%) | 65.60 | 9.21 | 1.92 |
NMR (δ/CDCl$_3$)
δ = 1.19 (d, 22.80H, 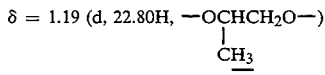)
1.67 (s, 6H, 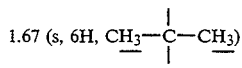)
1.94 (s, 3H, 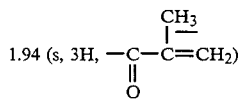)

2.12 (s, 3H, 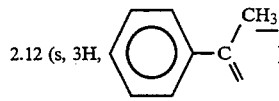 )

3.09–4.18 (m, 21.80H, 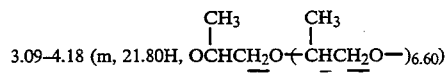 )

4.70–5.25 (m, 3H, 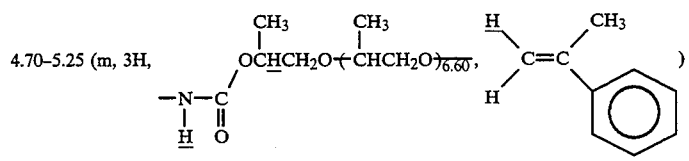 )

5.33 (s, 1H, 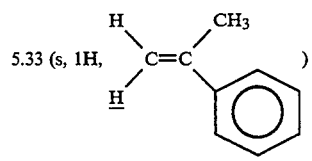 )

5.57 (s, 1H, 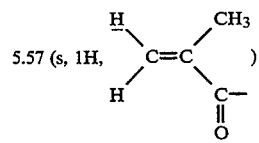 )

6.11 (s, 1H, 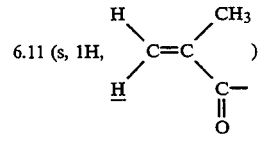 )

7.39 (s, 4H, 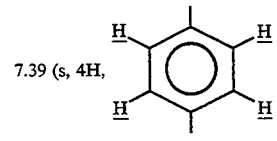 )

EXAMPLE 152

The procedure of Example 132 was repeated except that 87.1 parts of diethylene glycol monomethacrylate was replaced with 172.8 parts of polypropylene glycol monoacrylate of the following structural formula,

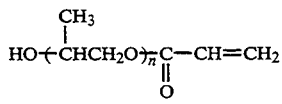

($n = 3-6$, average value of $n = 4.71$)

239.4 Parts of a colorless liquid monomer of the following structural formula was obtained.

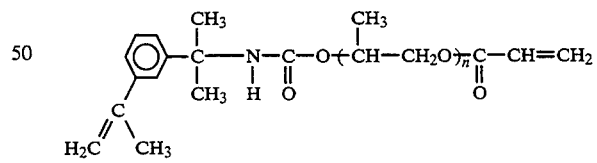

($n = 3-6$, average value of $n = 4.71$)

| Analysis for $C_{30.13}H_{47.26}NO_{7.71}$: | | | |
|---|---|---|---|
| | C | H | N |
| Found (%) | 66.32 | 8.75 | 2.43 |
| Calc. (%) | 66.17 | 8.71 | 2.56 |

NMR ($\delta$/CDCl$_3$)

$\delta$ = 1.19 (d, 14.13H, 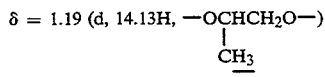 )

1.67 (s, 6H, 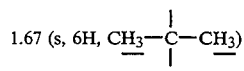)

2.23 (s, 3H, )

3.09–4.17 (m, 13.13H, 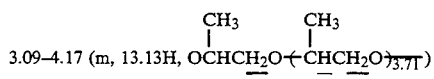)

4.68–5.23 (m, 3H, 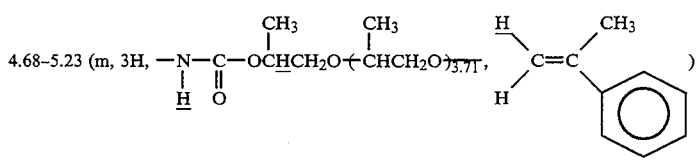)

5.41 (s, 1H, 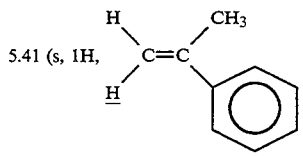)

5.96 (m, 1H, 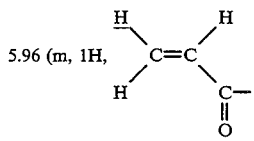)

6.37 (m, 2H, 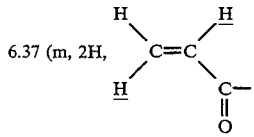)

7.41 (s, 3H, 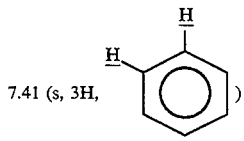)

7.58 (s, 1H, 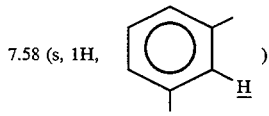)

EXAMPLE 153

The procedure of Example 152 was repeated except that 100.6 parts of 3-isopropenyl-α,α-dimethylbenzylisocyanate was replaced with 100.6 parts of 4-isopropenyl-α,α-dimethylbenzylisocyanate, and 246.5 parts of a colorless liquid monomer of the following structural formula was obtained.

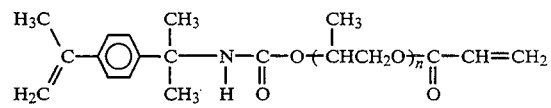

(n=3–6, average value of n=4.71)

| Analysis for $C_{30.13}H_{47.26}NO_{7.71}$: | | |
|---|---|---|
| C | H | N |
| Found | 66.37 | 8.65 | 2.69 |
| Calc. (%) | 66.17 | 8.71 | 2.56 |

NMR (δ/CDCl₃)

-continued

δ = 1.19 (d, 14.13H, —OCHCH₂O—) 
　　　　　　　　　　　|
　　　　　　　　　　CH₃

1.67 (s, 6H, CH₃—C—CH₃)

2.23 (s, 3H, 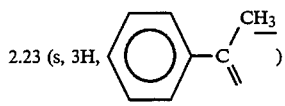 )

3.09–4.17 (m, 13.13H, OCHCH₂O(CHCH₂O)₃.₇₁ )

4.68–5.23 (m, 3H, 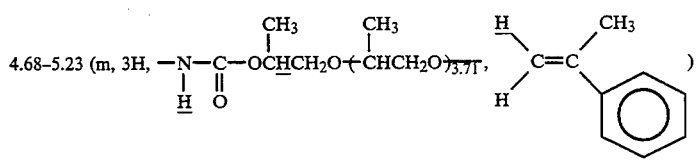 )

5.41 (s, 1H, 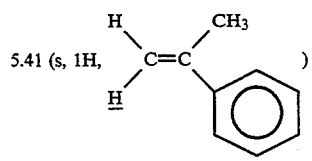 )

5.96 (m, 1H, 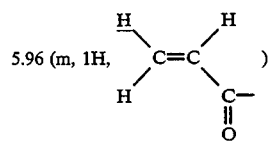 )

6.41 (m, 2H, 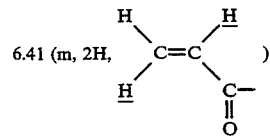 )

7.33 (s, 4H, 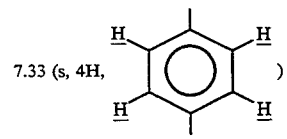 )

EXAMPLE 154

The procedure of Example 132 was repeated except that 87.1 parts of diethylene glycol monomethacrylate was replaced with 258.5 parts of polypropylene glycol monoacrylate of the following structural formula,

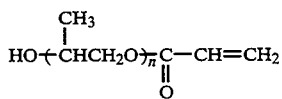

(n=7–10, average value of n=7.66)

333.2 Parts of a colorless liquid monomer of the following structural formula was obtained.

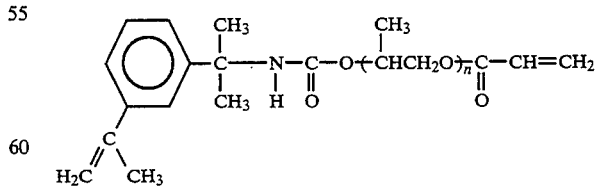

n=7–10, average value of n=7.66)

| Analysis for $C_{38.98}H_{64.96}NO_{10.66}$: | | | |
|---|---|---|---|
| | C | H | N |
| Found (%) | 65.35 | 9.16 | 1.98 |

-continued
| Calc. (%) | 65.19 | 9.12 | 1.95 |
|---|---|---|---|
NMR (δ/CDCl₃)
δ = 1.19 (d, 22.98H, 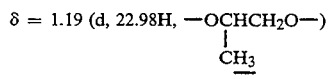)
1.67 (s, 6H, 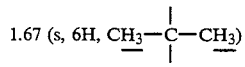)
2.23 (s, 3H, )
3.09-4.17 (m, 21.98H, 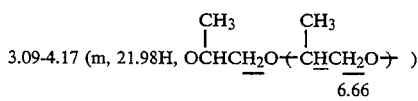)
4.68-5.23 (m, 3H, 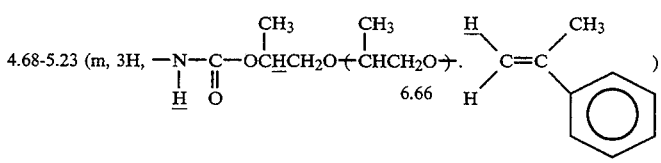)
5.41 (s, 1H, 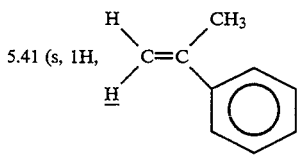)
5.96 (m, 1H, 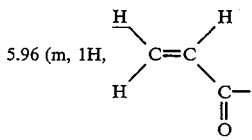)
6.37 (m, 2H, 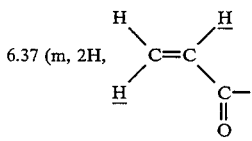)
7.41 (s, 3H, 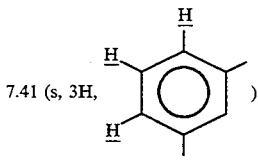)
7.58 (S, 1H, 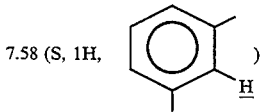)
EXAMPLE 155
The procedure of Example 154 was repeated except that 100.6 parts of 3-isopropenyl-α,α-dimethylbenzylisocyanate was replaced with 100.6 parts of 4-isopropenyl-α,α-dimethylbenzylisocyanate, and 327.9 parts of a colorless liquid monomer of the following structural formula was obtained.
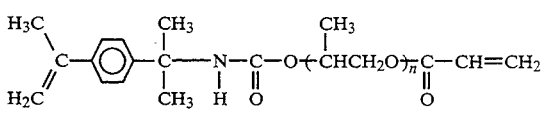
(n=7-10, average value of n=7.66)

| Analysis for $C_{38.98}H_{64.96}NO_{10.66}$: | | | |
|---|---|---|---|
| | C | H | N |
| Found (%) | 65.02 | 9.35 | 2.07 |
| Calc. (%) | 65.19 | 9.12 | 1.95 |

NMR (δ/CDCl₃)

δ = 1.19 (d, 22.98H, —OCHCH₂O—) 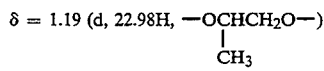
    |
    CH₃

1.67 (S, 6H, CH₃—C—CH₃ ) 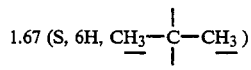

2.22 (s, 3H,  )

3.09-4.17 (m, 21.98H, 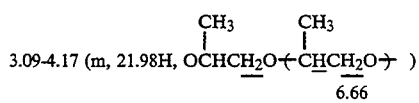 )

4.68-5.23 (m, 3H, 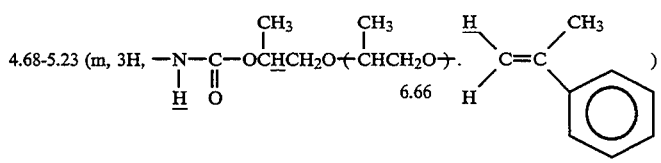 )

5.41 (s, 1H, 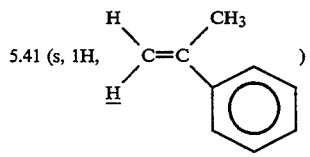 )

5.96 (m, 1H, 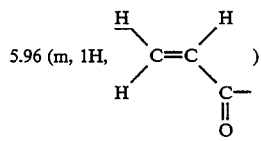 )

6.37 (m, 1H, 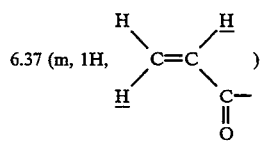 )

7.33 (S, 4H, 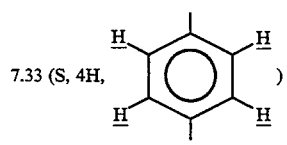 )

What is claimed is:

1. A polymerizable monomer of the formula (23),

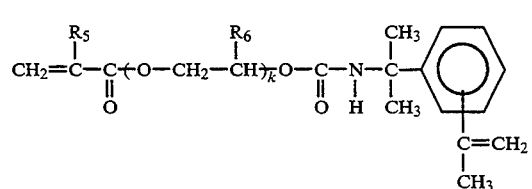 (23)

where $R_5$ and $R_6$ are similar or dissimilar and are selected from group consisting of hydrogen and methyl, k is an integer of 2–10, and the isopropenyl substituent on the aromatic ring is in the p-position or m-position.

2. The polymerizable monomer of claim 1 wherein $R_6$ is hydrogen and k is 2.

3. The polymerizable monomer of claim 1 wherein $R_6$ is methyl and k is 2.

4. The polymerizable monomer of claim 1 wherein $R_6$ is hydrogen and k is 3–6.

5. The polymerizable monomer of claim 1 wherein $R_6$ is methyl and k is 3–6.

6. The polymerizable monomer of claim 1 wherein $R_6$ is hydrogen and k is 7–10.

7. The polymerizable monomer of claim 1 wherein $R_6$ is methyl and k is 7–10.

* * * * *